United States Patent
Johnson et al.

(10) Patent No.: US 12,458,043 B2
(45) Date of Patent: Nov. 4, 2025

(54) BACILLUS COMBINATION FOR ADMINISTRATION TO ANIMALS

(71) Applicant: OmniGen Research, LLC, Corvallis, OR (US)

(72) Inventors: A. Bruce Johnson, Teaneck, NJ (US); Kenneth W. Bafundo, Teaneck, NJ (US)

(73) Assignee: OmniGen Research, LLC, Corvallis, OR (US)

( * ) Notice: Subject to any disclaimer, the term of this patent is extended or adjusted under 35 U.S.C. 154(b) by 229 days.

(21) Appl. No.: 18/299,499

(22) Filed: Apr. 12, 2023

(65) Prior Publication Data

US 2023/0240326 A1    Aug. 3, 2023

Related U.S. Application Data

(60) Division of application No. 16/930,577, filed on Jul. 16, 2020, now Pat. No. 11,653,674, which is a continuation of application No. PCT/US2019/014938, filed on Jan. 24, 2019.

(60) Provisional application No. 62/621,196, filed on Jan. 24, 2018.

(51) Int. Cl.
| | |
|---|---|
| A23K 10/18 | (2016.01) |
| A23K 10/30 | (2016.01) |
| A23K 50/75 | (2016.01) |
| A23L 33/135 | (2016.01) |

(52) U.S. Cl.
CPC .............. *A23K 10/18* (2016.05); *A23K 10/30* (2016.05); *A23K 50/75* (2016.05); *A23L 33/135* (2016.08)

(58) Field of Classification Search
CPC ................................ A23K 10/15; A23K 50/75
See application file for complete search history.

(56) References Cited

U.S. PATENT DOCUMENTS

| | | |
|---|---|---|
| 8,021,654 B2 | 9/2011 | Rehberger et al. |
| 8,414,878 B2 | 4/2013 | Osipova et al. |
| 8,420,138 B2 | 4/2013 | Knap et al. |
| 8,506,951 B2 | 8/2013 | Rehberger et al. |
| 8,722,058 B2 | 5/2014 | Rehberger et al. |
| 9,005,601 B2 | 4/2015 | Hargis et al. |
| 9,139,458 B2 | 9/2015 | Angel |
| 9,205,116 B2 | 12/2015 | Terhune et al. |
| 9,237,763 B2 | 1/2016 | Armentrout |
| 9,410,213 B2 | 8/2016 | Matheny et al. |
| 9,457,054 B2 | 10/2016 | Schmidt et al. |
| 9,615,583 B2 | 4/2017 | Kloepper et al. |
| 9,828,581 B2 | 11/2017 | Zhang |
| 9,908,799 B2 | 3/2018 | Greenwald et al. |
| 9,932,543 B2 | 4/2018 | Hashman et al. |
| 9,999,648 B2 | 6/2018 | Calabotta et al. |
| 2004/0037918 A1 | 2/2004 | Glinsky |
| 2009/0297664 A1 | 12/2009 | Forte et al. |
| 2011/0287157 A1 | 11/2011 | Watson |
| 2015/0157670 A1 | 6/2015 | Kriz et al. |
| 2015/0250842 A1 | 9/2015 | Calabotta et al. |
| 2015/0290140 A1 | 10/2015 | Singh et al. |
| 2015/0366216 A1 | 12/2015 | Pedersen et al. |
| 2016/0286833 A1* | 10/2016 | Yasuda ................. A23K 10/18 |
| 2017/0020179 A1 | 1/2017 | Klassen et al. |
| 2017/0079308 A1 | 3/2017 | King et al. |
| 2017/0106027 A1 | 4/2017 | Tonda et al. |
| 2017/0121198 A1 | 5/2017 | Showell et al. |
| 2017/0165303 A1 | 6/2017 | Olmstead |
| 2017/0246222 A1 | 8/2017 | Lewis et al. |
| 2023/0310521 A1* | 10/2023 | Johnson ............... A61K 36/185 |
| | | 424/93.462 |

FOREIGN PATENT DOCUMENTS

| | | |
|---|---|---|
| AU | 2016297403 | 12/2018 |
| CN | 103045498 | 4/2013 |
| CN | 105062916 | 11/2013 |
| CN | 104735999 | 6/2015 |
| CN | 105132307 | 12/2015 |
| CN | 106666178 | 5/2017 |
| JP | 2015205896 | 11/2015 |
| KR | 20170021002 | 2/2017 |
| WO | WO 2014/020141 | 2/2014 |
| WO | WO 2015/179840 | 11/2015 |
| WO | WO 2016/054338 | 4/2016 |
| WO | WO 2016/163388 | 10/2016 |
| WO | WO 2017/012569 | 1/2017 |
| WO | WO 2017/012571 | 1/2017 |
| WO | WO 2017/083196 | 5/2017 |

(Continued)

OTHER PUBLICATIONS

Substantive Examination Report from PH Application No. Jan. 2020/551120 dated Jul. 7, 2023 (7 pages).

Lan et al., "Effects of probiotic supplementation in different nutrient density diets on growth performance, nutrient digestibility, blood profiles, fecal microflora and noxious gas emission in weaning pig," *Journal of the Science of Food and Agriculture* 97:1335-1341, 2017 published online Jul. 27, 2016.

Notification of First Office Action dated Jan. 13, 2023 from related Chinese Application No. 201980013774.9 w/English translation (19 pages).

(Continued)

*Primary Examiner* — Brian Gangle
*Assistant Examiner* — Lakia J Jackson-Tongue
(74) *Attorney, Agent, or Firm* — Klarquist Sparkman, LLP

(57) ABSTRACT

Embodiments of a composition comprising three or four *Bacillus* species selected from *Bacillus amyloliquefaciens*, *Bacillus subtilis*, *Bacillus licheniformis* and *Bacillus coagulans* are disclosed. The composition may further comprise, or be used in combination with, feed and/or feed supplements, including feed supplements comprising *yucca, quillaja*, silica, mineral clay, glucan, mannans, or combinations thereof. Also disclosed is a method of administering the composition and/or combination to animals, such as poultry.

20 Claims, 19 Drawing Sheets

(56) References Cited

FOREIGN PATENT DOCUMENTS

| | | |
|---|---|---|
| WO | WO 2017/083196 A1 * | 5/2017 |
| WO | WO 2017/176872 | 10/2017 |
| WO | WO 2018/049243 | 3/2018 |
| WO | WO 2018/148563 | 8/2018 |

OTHER PUBLICATIONS

Written Opinion of the International Searching Authority and International Search Report issued for PCT/US2019/014938 on Jun. 24, 2019 (17 pages).

Xiyan, "The effect of Bacillus preparation on performance and immunity of broiler," *China Feed* 11:37-39, Jun. 5, 2009 with English Abstract.

* cited by examiner

| Data | T1 | T2 | T3 | T4 | T5 | T6 | T7 | T8 |
|---|---|---|---|---|---|---|---|---|
| Average Body Wt. (g) Day 0 | 46.13 | 46.36 | 46.27 | 46.33 | 46.33 | 46.03 | 46.08 | 46.00 |
| Significance (P<0.05) | a | a | a | a | a | a | a | a |
| Average Body Wt. (g) Day 10 | 268.00 | 248.37 | 254.50 | 260.61 | 263.60 | 254.48 | 270.37 | 260.87 |
| Significance (P<0.05) | a | d | cd | bc | ab | cd | a | bc |
| Feed Conversion Corrected Day 0-10 | 1.086 | 1.115 | 1.111 | 1.081 | 1.068 | 1.093 | 1.054 | 1.082 |
| Significance (P<0.05) | bc | d | cd | b | ab | bcd | a | b |
| Mortality % Day 0-10 | 1.76 | 3.69 | 2.88 | 1.60 | 1.44 | 2.72 | 1.28 | 1.92 |
| Significance (P<0.05) | ab | d | cd | a | a | bcd | a | abc |
| Average Body Wt. Gain (g) Day 0-10 | 221.87 | 202.01 | 208.23 | 214.28 | 217.27 | 208.45 | 224.29 | 214.87 |
| Significance (P<0.05) | ab | e | de | cd | bc | de | a | bcd |
| Average Body Wt. (g) Day 21 | 888.30 | 853.12 | 869.19 | 878.65 | 883.30 | 867.22 | 895.30 | 875.82 |
| Significance (P<0.05) | ab | d | c | bc | ab | c | a | bc |
| Feed Conversion Corrected Day 0-21 | 1.372 | 1.401 | 1.388 | 1.361 | 1.355 | 1.375 | 1.338 | 1.352 |
| Significance (P<0.05) | bcd | d | cd | abc | ab | bcd | a | ab |
| Mortality % Day 0-21 | 2.244 | 5.288 | 3.846 | 1.923 | 2.083 | 3.686 | 1.603 | 2.564 |
| Significance (P<0.05) | a | c | b | a | a | b | a | ab |
| Average Body Wt. Gain (g) Day 0-21 | 842.17 | 806.76 | 822.91 | 832.32 | 836.96 | 821.19 | 849.21 | 829.82 |
| Significance (P<0.05) | ab | d | c | bc | ab | c | a | bc |
| Body Weight Coefficient of Variation (period) | 10.98 | 14.99 | 11.06 | 10.98 | 10.28 | 11.19 | 11.10 | 10.94 |
| Significance (P<0.05) | b | c | b | b | a | b | b | b |
| Lesion Scores Day 21 | 1.042 | 2.125 | 1.375 | 1.146 | 0.854 | 1.396 | 0.250 | 1.375 |
| Significance (P<0.05) | bc | e | d | cd | b | d | a | d |
| Average Body Wt. (g) Day 42 | 2651.302 | 2575.083 | 2589.927 | 2634.402 | 2672.351 | 2603.780 | 2684.210 | 2617.893 |
| Significance (P<0.05) | ab | e | de | bc | a | cde | a | bcd |
| Feed Conversion Corrected Day 0-42 | 1.831 | 1.884 | 1.862 | 1.835 | 1.829 | 1.843 | 1.823 | 1.853 |
| Significance (P<0.05) | ab | d | cd | ab | ab | abc | a | bc |
| Mortality % Day 0-42 | 2.604 | 6.250 | 4.340 | 2.083 | 2.257 | 4.340 | 1.736 | 2.951 |
| Significance (P<0.05) | a | c | b | a | a | b | a | ab |
| Average Body Wt. Gain (g) Day 0-42 | 2605.172 | 2528.722 | 2543.654 | 2588.067 | 2626.016 | 2557.751 | 2638.127 | 2571.893 |
| Significance (P<0.05) | ab | c | c | ab | a | bc | a | bc |
| Body Weight Coefficient of Variation (period) | 10.276 | 12.726 | 10.287 | 10.322 | 10.466 | 10.226 | 10.262 | 10.129 |
| Significance (P<0.05) | a | b | a | a | a | a | a | a |
| Average Body Wt. Gain (g) Day 22-42 | 1763.004 | 1721.960 | 1720.740 | 1755.751 | 1789.051 | 1736.558 | 1788.914 | 1742.069 |
| Significance (P<0.05) | ab | c | c | ab | a | bc | a | bc |
| Feed Conversion Corrected Day 22-42 | 2.042 | 2.104 | 2.080 | 2.051 | 2.042 | 2.056 | 2.045 | 2.083 |
| Significance (P<0.05) | a | d | bcd | ab | a | abc | a | cd |
| Mortality % Day 22-42 | 0.361 | 0.962 | 0.494 | 0.160 | 0.174 | 0.654 | 0.134 | 0.387 |
| Significance (P<0.05) | ab | c | ab | a | a | bc | a | ab |
| Lesion Scores Day 42 | 0.483 | 1.283 | 0.842 | 0.625 | 0.458 | 0.875 | 0.275 | 0.783 |
| Significance (P<0.05) | bc | f | e | cd | b | e | a | de |
| E. coli (log10) Day 21 | 6.011 | 6.693 | 6.006 | 6.010 | 5.800 | 5.984 | 5.447 | 6.016 |
| Significance (P<0.05) | b | c | b | b | ab | b | a | b |
| E. coli (log10) Day 42 | 6.035 | 6.272 | 6.019 | 6.028 | 5.983 | 6.074 | 5.861 | 5.980 |
| Significance (P<0.05) | a | b | a | a | a | ab | a | a |
| APC (log10) Day 21 | 7.936 | 8.569 | 8.619 | 7.924 | 7.976 | 7.993 | 7.408 | 7.705 |
| Significance (P<0.05) | ab | c | c | ab | b | b | a | ab |
| APC (log10) Day 42 | 7.953 | 8.255 | 7.977 | 7.975 | 8.055 | 7.888 | 7.624 | 8.099 |
| Significance (P<0.05) | ab | b | ab | ab | b | ab | a | b |
| Salmonella Incidence (%) Day 21 | 58.333 | 75.000 | 54.167 | 60.417 | 50.000 | 45.833 | 33.333 | 58.333 |
| Significance (P<0.05) | bc | c | abc | bc | ab | ab | a | bc |
| Salmonella Incidence (%) Day 42 | 41.667 | 65.833 | 48.333 | 50.000 | 47.500 | 49.167 | 33.333 | 50.000 |
| Significance (P<0.05) | ab | c | b | b | b | b | a | b |
| Clostridium perfringens (log10 per g) 21 days. | 3.510 | 3.880 | 3.403 | 3.577 | 3.226 | 3.388 | 2.740 | 3.308 |
| Significance (P<0.05) | bc | c | bc | bc | ab | bc | a | abc |
| Clostridium perfringens (log10 per g) 42 days. | 3.539 | 3.801 | 3.299 | 3.429 | 3.411 | 3.463 | 2.819 | 3.484 |
| Significance (P<0.05) | ab | c | ab | bc | bc | bc | a | bc |
| Oocyst Count per g of wet fecal Day 21 | 3009 | 257550 | 88471 | 59554 | 31926 | 76969 | 31977 | 56411 |
| Significance (P<0.05) | a | e | d | c | b | cd | b | bc |
| Oocyst Count per g of wet fecal Day 42 | 8618 | 305996 | 97416 | 64825 | 43759 | 80335 | 53090 | 115414 |
| Significance (P<0.05) | a | g | ef | cd | b | de | bc | f |

NOTE: "Significance P<0.05)" refers to means within a row without a common superscript are significantly different (P<0.05) as determined by Least Significant Difference.

FIG. 1

| Data | T1 | T2 | T3 | T4 | T5 | T6 | T7 | T8 | T9 | T10 | T11 |
|---|---|---|---|---|---|---|---|---|---|---|---|
| Average Body Wt. (g) Day 0 | 50.88 | 50.95 | 51.29 | 51.04 | 50.82 | 50.85 | 51.07 | 50.68 | 50.74 | 50.88 | 51.13 |
| Significance (P<0.05) | a | a | a | a | a | a | a | a | a | a | a |
| Average Body Wt. (g) Day 14 | 387.92 | 361.45 | 384.36 | 382.11 | 381.13 | 381.98 | 378.22 | 379.98 | 379.85 | 376.60 | 375.91 |
| Significance (P<0.05) | a | c | ab | ab | ab | ab | b | ab | ab | b | b |
| Feed Conversion Corrected Day 0-14 | 1.128 | 1.193 | 1.126 | 1.112 | 1.152 | 1.155 | 1.167 | 1.160 | 1.168 | 1.169 | 1.154 |
| Significance (P<0.05) | abc | e | ab | a | bcd | cd | de | d | de | de | cd |
| Mortality % Day 0-14 | 0.32 | 2.72 | 0.32 | 0.32 | 0.64 | 1.12 | 0.96 | 0.80 | 0.80 | 1.12 | 1.28 |
| Significance (P<0.05) | a | c | a | a | ab | ab | ab | ab | ab | ab | b |
| Average Body Wt. Gain (g) Day 0-14 | 337.03 | 310.50 | 333.07 | 331.07 | 330.32 | 331.13 | 327.15 | 329.30 | 329.11 | 325.73 | 324.78 |
| Significance (P<0.05) | a | c | ab | ab | ab | ab | b | ab | ab | b | b |
| Average Body Wt. (g) Day 21 | 922.91 | 874.19 | 915.92 | 915.23 | 909.77 | 900.18 | 897.24 | 913.72 | 911.31 | 908.55 | 891.37 |
| Significance (P<0.05) | a | f | ab | ab | abcd | cde | de | ab | abc | bcd | e |
| Feed Conversion Corrected Day 0-21 | 1.363 | 1.421 | 1.367 | 1.374 | 1.365 | 1.398 | 1.391 | 1.361 | 1.388 | 1.386 | 1.399 |
| Significance (P<0.05) | a | f | ab | abc | a | bcd | bcd | a | abc | abc | e |
| Mortality % Day 0-21 | 0.481 | 4.006 | 0.801 | 0.801 | 0.962 | 1.763 | 0.962 | 1.122 | 1.282 | 2.083 | 2.083 |
| Significance (P<0.05) | a | d | ab | ab | ab | bc | ab | abc | abc | c | c |
| Average Body Wt. Gain (g) Day 0-21 | 872.03 | 823.24 | 864.63 | 864.19 | 858.96 | 849.33 | 846.17 | 863.04 | 860.56 | 857.67 | 840.24 |
| Significance (P<0.05) | a | f | ab | ab | abcd | cde | de | ab | abc | bcd | e |
| Body Weight Coefficient of Variation (period) | 8.28 | 16.27 | 10.01 | 9.55 | 11.11 | 13.04 | 12.37 | 11.15 | 11.16 | 15.72 | 15.86 |
| Significance (P<0.05) | a | f | b | bcd | c | d | d | c | c | e | e |
| Lesion Scores Day 21 | 0.479 | 1.563 | 0.438 | 0.354 | 0.958 | 1.063 | 0.979 | 1.104 | 0.854 | 1.333 | 1.271 |
| Significance (P<0.05) | a | d | a | a | b | bc | b | bc | b | cd | c |
| Average Body Wt. (g) Day 42 | 2540.31 | 2451.17 | 2535.54 | 2504.78 | 2504.50 | 2482.00 | 2503.75 | 2513.43 | 2519.48 | 2512.66 | 2514.91 |
| Significance (P<0.05) | a | d | ab | abc | abc | cd | bc | abc | abc | abc | abc |
| Feed Conversion Corrected Day 0-42 | 1.763 | 1.902 | 1.781 | 1.809 | 1.806 | 1.843 | 1.837 | 1.824 | 1.829 | 1.820 | 1.828 |
| Significance (P<0.05) | a | d | ab | bcd | bc | e | de | cde | cde | cde | cde |
| Mortality % Day 0-42 | 0.521 | 5.035 | 0.868 | 0.868 | 1.042 | 2.083 | 1.215 | 1.215 | 1.736 | 2.778 | 2.951 |
| Significance (P<0.05) | a | f | ab | ab | abc | cde | abc | abc | bcd | de | e |
| Average Body Wt. Gain (g) Day 0-42 | 2489.42 | 2400.22 | 2484.25 | 2453.74 | 2453.68 | 2431.15 | 2449.69 | 2462.75 | 2468.74 | 2461.79 | 2463.78 |
| Significance (P<0.05) | a | d | ab | abc | abc | cde | bc | abc | abc | abc | abc |
| Body Weight Coefficient of Variation (period) | 8.431 | 15.567 | 9.678 | 9.622 | 11.119 | 12.760 | 12.749 | 11.290 | 11.615 | 15.219 | 15.791 |
| Significance (P<0.05) | a | e | b | b | b | d | d | c | c | e | e |
| Average Body Wt. Gain (g) Day 22-42 | 1617.40 | 1576.98 | 1619.61 | 1589.55 | 1594.72 | 1581.82 | 1603.51 | 1599.71 | 1608.18 | 1604.12 | 1623.53 |
| Significance (P<0.05) | ab | c | ab | ab | abc | bc | abc | abc | abc | abc | a |
| Feed Conversion Corrected Day 22-42 | 1.998 | 2.180 | 2.021 | 2.067 | 2.064 | 2.103 | 2.094 | 2.096 | 2.087 | 2.075 | 2.072 |
| Significance (P<0.05) | a | c | b | b | b | b | b | b | b | b | b |
| Mortality % Day 22-42 | 0.040 | 1.028 | 0.067 | 0.067 | 0.080 | 0.321 | 0.254 | 0.093 | 0.454 | 0.694 | 0.868 |
| Significance (P<0.05) | a | d | a | a | a | ab | ab | a | abc | bcd | cd |

FIG. 2

| Data | T1 | T2 | T3 | T4 | T5 | T6 | T7 | T8 | T9 | T10 | T11 |
|---|---|---|---|---|---|---|---|---|---|---|---|
| Lesion Scores Day 42 | 0.358 | 1.575 | 0.717 | 0.783 | 1.000 | 1.075 | 1.025 | 1.083 | 0.992 | 1.258 | 1.392 |
| Significance ($P<0.05$) | a | g | b | bc | cd | de | d | de | cd | ef | fg |
| E. coli (log10) Day 21 | 5.384 | 6.717 | 5.410 | 5.268 | 6.100 | 6.044 | 6.039 | 6.037 | 6.016 | 6.062 | 6.085 |
| Significance ($P<0.05$) | a | c | a | a | b | b | b | b | b | b | b |
| E. coli (log10) Day 42 | 5.452 | 6.799 | 5.464 | 5.352 | 5.682 | 6.003 | 6.052 | 6.037 | 6.045 | 6.132 | 6.101 |
| Significance ($P<0.05$) | a | d | a | a | b | c | c | c | c | c | c |
| APC (log10) Day 21 | 7.479 | 9.332 | 7.677 | 7.679 | 8.504 | 8.144 | 8.201 | 8.254 | 8.423 | 8.096 | 8.273 |
| Significance ($P<0.05$) | a | d | ab | ab | c | c | c | c | c | bc | c |
| APC (log10) Day 42 | 7.645 | 8.751 | 7.710 | 7.705 | 8.392 | 8.508 | 8.137 | 8.159 | 8.122 | 8.298 | 8.314 |
| Significance ($P<0.05$) | a | c | a | a | bc | cd | b | b | b | bc | bc |
| Salmonella Incidence (%) Day 21 | 22.917 | 87.500 | 37.500 | 31.250 | 52.083 | 54.167 | 47.917 | 50.000 | 52.083 | 66.750 | 75.000 |
| Significance ($P<0.05$) | a | e | abc | ab | cd | cd | bc | bcd | cd | de | e |
| Salmonella Incidence (%) Day 42 | 10.000 | 68.667 | 30.833 | 34.167 | 45.333 | 40.833 | 50.000 | 41.667 | 50.000 | 33.333 | 35.000 |
| Significance ($P<0.05$) | a | e | b | ab | bc | bc | c | bc | c | bc | b |
| Clostridium perfringens (log10 per g) 21 days | 3.415 | 4.746 | 3.715 | 3.375 | 4.083 | 3.896 | 3.918 | 4.083 | 3.823 | 3.807 | 3.888 |
| Significance ($P<0.05$) | a | d | b | a | c | bc | bc | c | bc | bc | bc |
| Clostridium perfringens (log10 per g) 42 days | 3.754 | 4.927 | 4.051 | 4.012 | 4.527 | 4.504 | 4.643 | 4.882 | 4.597 | 4.827 | 4.849 |
| Significance ($P<0.05$) | a | d | b | b | c | c | c | c | c | c | c |

FIG. 3

| Data | T1 | T2 | T3 | T4 | T5 | T6 | T7 | T8 | T9 | T10 | T11 |
|---|---|---|---|---|---|---|---|---|---|---|---|
| Average Body Wt. (g) Day 0 | 39.22 | 39.59 | 39.51 | 39.61 | 39.44 | 39.84 | 39.32 | 39.78 | 39.45 | 39.21 | 39.61 |
| Significance (P<0.05) | b | a | a | a | a | a | a | a | a | a | a |
| Days 0-14 | | | | | | | | | | | |
| Average Body Wt. (g) | 460.99 | 418.09 | 457.38 | 462.86 | 466.52 | 461.56 | 465.24 | 457.00 | 461.88 | 455.22 | 462.45 |
| Significance (P<0.05) | ab | c | b | ab | a | ab | ab | b | ab | b | ab |
| Feed Conversion Corrected | 1.091 | 1.131 | 1.111 | 1.105 | 1.079 | 1.129 | 1.102 | 1.121 | 1.104 | 1.134 | 1.106 |
| Significance (P<0.05) | ab | d | bcd | abcd | a | cd | abcd | bcd | abcd | d | abcd |
| Mortality % | 0.17 | 3.32 | 0.87 | 0.87 | 0.87 | 0.96 | 1.44 | 0.96 | 0.96 | 1.44 | 0.48 |
| Significance (P<0.05) | a | c | ab | ab | ab | ab | b | ab | ab | b | ab |
| Average Body Wt. Gain (g) | 421.77 | 378.51 | 417.87 | 423.25 | 427.08 | 421.72 | 425.92 | 417.22 | 422.43 | 416.00 | 422.85 |
| Significance (P<0.05) | ab | c | b | ab | a | ab | ab | b | b | ab | b |
| Body Weight Coefficient of Variation (period) | 8.61 | 20.35 | 16.01 | 14.35 | 8.49 | 15.74 | 16.30 | 15.58 | 15.60 | 15.77 | 15.75 |
| Significance (P<0.05) | a | c | bc | b | a | bc | bc | bc | bc | bc | bc |
| Feed Consumption (g per bird per day) | 32.87 | 30.74 | 33.19 | 33.47 | 32.96 | 34.09 | 33.63 | 33.45 | 33.37 | 33.79 | 35.43 |
| Significance (P<0.05) | a | b | a | a | a | a | a | a | a | a | a |
| Average g gained/day for each period | 32.93 | 29.86 | 32.67 | 33.06 | 33.32 | 32.97 | 33.23 | 32.64 | 32.99 | 32.52 | 33.03 |
| Significance (P<0.05) | ab | c | ab | ab | a | ab | ab | ab | ab | b | ab |
| European Production Efficiency Factor (EPEF) | 301.32 | 253.11 | 291.10 | 296.03 | 305.59 | 288.33 | 295.93 | 288.02 | 295.47 | 281.70 | 297.29 |
| Significance (P<0.05) | ab | f | cde | abcd | a | cde | abcde | cde | abcde | e | abcd |

FIG. 4

| Data | T12 | T13 | T14 | T15 |
|---|---|---|---|---|
| Average Body Wt. (g) Day 0 | 39.20 | 39.54 | 39.94 | 39.27 |
| Significance (P<0.05) | a | a | a | a |
| Days 0-14 | | | | |
| Average Body Wt. (g) | 455.07 | 466.66 | 454.96 | 466.61 |
| Significance (P<0.05) | b | ab | b | ab |
| Feed Conversion Corrected | 1.128 | 1.092 | 1.128 | 1.096 |
| Significance (P<0.05) | bcd | abc | bcd | abcd |
| Mortality % | 1.44 | 0.96 | 1.44 | 1.44 |
| Significance (P<0.05) | b | ab | b | b |
| Average Body Wt. Gain (g) | 415.87 | 427.12 | 415.02 | 427.34 |
| Significance (P<0.05) | b | ab | b | ab |
| Body Weight Coefficient of Variation (period) | 15.77 | 14.91 | 15.57 | 14.93 |
| Significance (P<0.05) | bc | bc | bc | bc |
| Feed Consumption (g per bird per day) | 33.61 | 33.40 | 33.51 | 33.51 |
| Significance (P<0.05) | a | a | a | a |
| Average g gained/day for each period | 32.50 | 33.33 | 32.50 | 33.33 |
| Significance (P<0.05) | b | ab | b | ab |
| European Production Efficiency Factor (EPEF) | 282.87 | 301.47 | 283.14 | 298.90 |
| Significance (P<0.05) | de | abc | de | abc |

FIG. 5

| Days 0-21 | T1 | T2 | T3 | T4 | T5 | T6 | T7 | T8 | T9 | T10 | T11 |
|---|---|---|---|---|---|---|---|---|---|---|---|
| Average Body Wt. (g) | 860.4 | 760.9 | 849.1 | 868.3 | 870.1 | 843.3 | 860.9 | 840.5 | 852.7 | 834.7 | 852.0 |
| Significance (P<0.05) | abc | d | bc | ab | a | bc | abc | bc | abc | c | bc |
| Feed Conversion Corrected | 1.324 | 1.387 | 1.362 | 1.343 | 1.317 | 1.373 | 1.336 | 1.368 | 1.333 | 1.375 | 1.359 |
| Significance (P<0.05) | ab | cd | abcd | abc | a | bcd | abc | abcd | abc | bcd | d |
| Mortality % | 0.52 | 5.24 | 1.22 | 1.40 | 1.22 | 1.92 | 1.92 | 0.96 | 1.44 | 1.92 | 0.96 |
| Significance (P<0.05) | a | b | a | a | a | a | a | a | a | a | a |
| Average Body Wt. Gain (g) | 821.1 | 747.3 | 809.6 | 828.7 | 830.6 | 803.5 | 821.6 | 800.7 | 813.3 | 795.5 | 812.4 |
| Significance (P<0.05) | abc | d | bc | ab | a | bc | abc | bc | abc | c | bc |
| Body Weight Coefficient of Variation (period) | 14.14 | 15.63 | 14.17 | 13.61 | 8.55 | 15.95 | 15.92 | 15.61 | 15.49 | 15.31 | 16.18 |
| Significance (P<0.05) | bc | d | bc | b | a | d | d | d | cd | cd | b |
| Feed Consumption (g per bird per day) | 51.92 | 50.46 | 52.34 | 53.18 | 52.31 | 53.09 | 52.57 | 51.82 | 51.92 | 52.36 | 52.60 |
| Significance (P<0.05) | ab | b | ab | a | a | a | ab | ab | ab | a | a |
| Average g gained/day for each period | 40.97 | 37.47 | 40.44 | 41.25 | 41.43 | 40.16 | 41.00 | 40.02 | 40.61 | 39.75 | 40.57 |
| Significance (P<0.05) | abc | d | abc | ab | a | abc | abc | bc | ab | c | abc |
| European Production Efficiency Factor (EPEF) | 307.02 | 249.70 | 294.24 | 301.01 | 308.43 | 284.16 | 299.99 | 291.10 | 293.36 | 281.92 | 285.51 |
| Significance (P<0.05) | a | f | bcd | ab | a | bc | abc | bcde | abc | e | de |

| Days 0-35 | T1 | T2 | T3 | T4 | T5 | T6 | T7 | T8 | T9 | T10 | T11 |
|---|---|---|---|---|---|---|---|---|---|---|---|
| Average Body Wt. (g) | 2110.3 | 1911.7 | 2041.5 | 2054.5 | 2084.9 | 2044.6 | 2080.2 | 2013.6 | 2041.3 | 2011.0 | 2038.8 |
| Significance (P<0.05) | a | e | d | bc | ab | bcd | abc | d | bcd | d | cd |
| Feed Conversion Corrected | 1.534 | 1.611 | 1.573 | 1.563 | 1.506 | 1.568 | 1.526 | 1.552 | 1.531 | 1.552 | 1.549 |
| Significance (P<0.05) | abc | c | bc | abc | ab | abc | ab | abc | ab | abc | abc |
| Mortality % | 0.759 | 6.816 | 1.515 | 1.894 | 1.705 | 2.083 | 2.604 | 1.042 | 1.563 | 2.604 | 1.042 |
| Significance (P<0.05) | a | b | a | a | a | a | a | a | a | a | a |
| Average Body Wt. Gain (g) | 2071.1 | 1872.1 | 2002.0 | 2014.9 | 2055.5 | 2004.8 | 2020.9 | 1973.9 | 2001.9 | 1971.7 | 1999.2 |
| Significance (P<0.05) | a | e | c | abc | ab | abc | abc | c | abc | c | bc |
| Body Weight Coefficient of Variation (period) | 13.726 | 15.743 | 14.547 | 14.871 | 9.697 | 16.752 | 17.331 | 15.729 | 15.833 | 16.365 | 17.013 |
| Significance (P<0.05) | b | cde | bc | cd | a | de | e | cde | cde | de | de |
| Feed Consumption (g per bird per day) | 94.022 | 91.106 | 93.362 | 92.877 | 91.308 | 93.326 | 91.823 | 90.846 | 90.899 | 91.440 | 91.624 |
| Significance (P<0.05) | a | ab | ab | ab | ab | ab | a | ab | ab | ab | ab |
| Average g gained/day for each period | 60.295 | 54.620 | 59.329 | 58.760 | 59.355 | 58.417 | 58.864 | 57.533 | 59.303 | 57.456 | 57.901 |
| Significance (P<0.05) | a | d | c | c | ab | c | abc | c | abc | c | bc |
| European Production Efficiency Factor (EPEF) | 376.238 | 297.858 | 353.716 | 356.527 | 375.736 | 350.785 | 359.853 | 354.215 | 361.371 | 344.309 | 356.837 |
| Significance (P<0.05) | a | c | b | b | a | b | ab | b | ab | b | ab |

FIG. 6

| Days 0-21 | T12 | T13 | T14 | T15 |
|---|---|---|---|---|
| Average Body Wt. (g) | 834.7 | 856.7 | 833.6 | 856.7 |
| Significance (P<0.05) | c | abc | c | abc |
| Feed Conversion Corrected | 1.386 | 1.363 | 1.370 | 1.361 |
| Significance (P<0.05) | cd | abcd | bcd | abcd |
| Mortality % | 1.44 | 1.44 | 1.92 | 1.92 |
| Significance (P<0.05) | a | a | a | a |
| Average Body Wt. Gain (g) | 795.5 | 817.2 | 793.7 | 817.4 |
| Significance (P<0.05) | c | abc | c | abc |
| Body Weight Coefficient of Variation (period) | 16.16 | 15.70 | 15.58 | 15.12 |
| Significance (P<0.05) | d | cd | cd | cd |
| Feed Consumption (g per bird per day) | 52.61 | 53.35 | 52.13 | 52.61 |
| Significance (P<0.05) | ab | a | ab | a |
| Average g gained/day for each period | 39.75 | 40.86 | 39.70 | 40.79 |
| Significance (P<0.05) | c | abc | c | abc |
| European Production Efficiency Factor (EPEF) | 282.48 | 293.30 | 282.46 | 294.50 |
| Significance (P<0.05) | e | bcde | e | bcde |

| Days 0-35 | T12 | T13 | T14 | T15 |
|---|---|---|---|---|
| Average Body Wt. (g) | 2010.6 | 2039.2 | 2011.5 | 2054.3 |
| Significance (P<0.05) | d | bcd | d | abc |
| Feed Conversion Corrected | 1.545 | 1.520 | 1.556 | 1.529 |
| Significance (P<0.05) | abc | ab | abc | ac |
| Mortality % | 1.563 | 2.083 | 2.083 | 2.083 |
| Significance (P<0.05) | a | a | a | a |
| Average Body Wt. Gain (g) | 1971.4 | 1999.6 | 1971.5 | 2015.1 |
| Significance (P<0.05) | c | bc | c | abc |
| Body Weight Coefficient of Variation (period) | 16.624 | 16.051 | 16.027 | 15.802 |
| Significance (P<0.05) | de | cde | de | cde |
| Feed Consumption (g per bird per day) | 90.154 | 90.384 | 91.080 | 91.263 |
| Significance (P<0.05) | b | ab | ab | ab |
| Average g gained/day for each period | 57.447 | 58.262 | 57.471 | 58.695 |
| Significance (P<0.05) | c | bc | c | abc |
| European Production Efficiency Factor (EPEF) | 352.933 | 359.862 | 347.315 | 361.853 |
| Significance (P<0.05) | b | ab | b | ab |

FIG. 7

| Days 0-42 | T1 | T2 | T3 | T4 | T5 | T6 | T7 | T8 | T9 | T10 | T11 |
|---|---|---|---|---|---|---|---|---|---|---|---|
| Average Body Wt. (g) | 2855.8 | 2546.1 | 2825.9 | 2852.9 | 2880.9 | 2801.6 | 2857.0 | 2780.6 | 2840.4 | 2798.4 | 2837.5 |
| Significance (P<0.05) | ab | c | ab | ab | a | ab | ab | b | ab | ab | ab |
| Feed Conversion Corrected | 1.786 | 1.893 | 1.840 | 1.817 | 1.794 | 1.841 | 1.823 | 1.845 | 1.825 | 1.857 | 1.830 |
| Significance (P<0.05) | a | c | bc | abc | ab | abc | abc | abc | abc | bc | abc |
| Mortality % | 0.947 | 7.197 | 1.705 | 2.083 | 2.083 | 2.604 | 2.604 | 1.042 | 1.563 | 2.604 | 0.521 |
| Significance (P<0.05) | a | b | a | a | a | a | a | a | a | a | a |
| Average Body Wt. Gain (g) | 2816.6 | 2506.5 | 2786.4 | 2823.3 | 2841.5 | 2761.8 | 2817.6 | 2740.9 | 2801.0 | 2759.2 | 2797.9 |
| Significance (P<0.05) | ab | c | ab | ab | a | ab | ab | b | ab | ab | ab |
| Body Weight Coefficient of Variation (period) | 14.250 | 15.879 | 14.501 | 13.644 | 8.202 | 15.048 | 15.539 | 16.321 | 16.138 | 16.173 | 15.573 |
| Significance (P<0.05) | bc | d | bc | b | a | cd | cd | d | d | d | cd |
| Feed Consumption (g per bird per day) | 123.060 | 118.076 | 125.433 | 125.677 | 124.964 | 124.913 | 125.816 | 123.433 | 124.986 | 125.568 | 124.928 |
| Significance (P<0.05) | a | b | a | a | a | a | a | ab | a | a | a |
| Average g gained/day for each period | 67.996 | 60.621 | 67.284 | 68.163 | 68.593 | 66.705 | 68.023 | 66.206 | 67.529 | 66.629 | 67.560 |
| Significance (P<0.05) | ab | c | ab | ab | a | b | ab | b | ab | ab | ab |
| European Production Efficiency Factor (EPEF) | 366.959 | 283.441 | 349.534 | 355.958 | 363.228 | 341.496 | 352.572 | 346.048 | 354.600 | 339.052 | 357.939 |
| Significance (P<0.05) | a | d | bc | abc | ab | bc | abc | bc | abc | bc | abc |

| Days 15-22 | T1 | T2 | T3 | T4 | T5 | T6 | T7 | T8 | T9 | T10 | T11 |
|---|---|---|---|---|---|---|---|---|---|---|---|
| Average Body Wt. (g) | 399.366 | 368.833 | 391.761 | 403.446 | 403.526 | 381.765 | 395.693 | 383.508 | 390.850 | 379.482 | 379.094 |
| Significance (P<0.05) | a | b | a | a | a | ab | a | ab | a | ab | ab |
| Feed Conversion Corrected | 1.470 | 1.452 | 1.477 | 1.505 | 1.463 | 1.601 | 1.500 | 1.509 | 1.474 | 1.549 | 1.600 |
| Significance (P<0.05) | cd | d | bc | abcd | d | a | abcd | abcd | cd | abcd | a |
| Mortality % | 0.350 | 1.923 | 0.350 | 0.524 | 0.350 | 0.962 | 0.481 | 0.000 | 0.431 | 0.481 | 0.000 |
| Significance (P<0.05) | a | b | a | a | a | ab | a | a | a | a | a |
| Average Body Wt. Gain (g) | 399.366 | 368.833 | 391.761 | 403.446 | 403.526 | 381.765 | 395.693 | 383.508 | 390.850 | 379.482 | 389.596 |
| Significance (P<0.05) | a | b | a | a | a | ab | a | ab | a | ab | ab |
| Feed Consumption (g per bird per day) | 83.964 | 75.970 | 84.689 | 87.086 | 84.620 | 86.432 | 84.872 | 83.639 | 83.256 | 84.245 | 87.574 |
| Significance (P<0.05) | a | c | a | a | a | a | a | a | a | a | a |
| Average g gained/day for each period | 57.052 | 52.690 | 55.966 | 57.635 | 57.647 | 54.538 | 56.528 | 54.787 | 55.836 | 55.836 | 55.636 |
| Significance (P<0.05) | a | b | a | a | a | ab | a | ab | a | ab | ab |

FIG. 8

| Days 0-42 | T12 | T13 | T14 | T15 |
|---|---|---|---|---|
| Average Body Wt. (g) | 2798.3 | 2837.7 | 2797.7 | 2837.1 |
| Significance (P<0.05) | ab | ab | ab | ab |
| Feed Conversion Corrected | 1.859 | 1.830 | 1.865 | 1.839 |
| Significance (P<0.05) | bc | abc | bc | abc |
| Mortality % | 1.563 | 2.083 | 2.604 | 2.083 |
| Significance (P<0.05) | a | a | a | a |
| Average Body Wt. Gain (g) | 2759.1 | 2798.1 | 2757.9 | 2797.8 |
| Significance (P<0.05) | ab | ab | ab | ab |
| Body Weight Coefficient of Variation (period) | 16.318 | 15.358 | 16.225 | 16.264 |
| Significance (P<0.05) | d | cd | d | c |
| Feed Consumption (g per bird per day) | 125.247 | 125.415 | 126.267 | 125.778 |
| Significance (P<0.05) | a | a | a | a |
| Average g gained/day for each period | 66.627 | 67.564 | 66.612 | 67.549 |
| Significance (P<0.05) | ab | ab | ab | ab |
| European Production Efficiency Factor (EPEF) | 343.527 | 351.018 | 337.467 | 349.950 |
| Significance (P<0.05) | bc | abc | c | abc |

| Days 15-22 | T12 | T13 | T14 | T15 |
|---|---|---|---|---|
| Average Body Wt. (g) | 379.681 | 386.080 | 376.643 | 390.049 |
| Significance (P<0.05) | ab | a | ab | ab |
| Feed Conversion Corrected | 1.572 | 1.586 | 1.541 | 1.508 |
| Significance (P<0.05) | abc | ab | abcd | abcd |
| Mortality % | 0.000 | 0.481 | 0.481 | 0.481 |
| Significance (P<0.05) | a | a | a | a |
| Average Body Wt. Gain (g) | 379.681 | 386.080 | 376.643 | 390.049 |
| Significance (P<0.05) | ab | a | ab | a |
| Feed Consumption (g per bird per day) | 85.344 | 87.570 | 83.554 | 85.600 |
| Significance (P<0.05) | a | a | a | a |
| Average g gained/day for each period | 54.240 | 55.726 | 54.092 | 55.721 |
| Significance (P<0.05) | ab | a | ab | a |

FIG. 9

| Days 22-35 | T1 | T2 | T3 | T4 | T5 | T6 | T7 | T8 | T9 | T10 | T11 |
|---|---|---|---|---|---|---|---|---|---|---|---|
| Average Body Wt. (g) | 1250.0 | 1124.6 | 1192.4 | 1188.2 | 1224.9 | 1201.3 | 1199.3 | 1173.1 | 1188.6 | 1176.3 | 1197.2 |
| Significance (P<0.05) | a | c | b | b | ab | ab | ab | bc | ab | b | ab |
| Feed Conversion Corrected | 1.684 | 1.786 | 1.727 | 1.711 | 1.650 | 1.702 | 1.664 | 1.665 | 1.681 | 1.694 | 1.660 |
| Significance (P<0.05) | bc | a | ab | abc | bc | bc | bc | bc | bc | bc | bc |
| Mortality % | 0.233 | 1.573 | 0.291 | 0.495 | 0.481 | 0.180 | 0.681 | 0.060 | 0.120 | 0.681 | 0.040 |
| Significance (P<0.05) | a | b | a | a | a | a | a | a | a | a | a |
| Average Body Wt. Gain (g) | 1250.0 | 1124.6 | 1192.4 | 1188.2 | 1224.9 | 1201.3 | 1199.3 | 1173.1 | 1188.6 | 1176.3 | 1196.7 |
| Significance (P<0.05) | a | c | b | b | ab | ab | ab | bc | ab | b | ab |
| Feed Consumption (g per bird per day) | 150.476 | 144.368 | 146.068 | 145.318 | 144.079 | 146.896 | 143.519 | 142.097 | 142.274 | 142.800 | 142.855 |
| Significance (P<0.05) | a | ab | ab | ab | ab | ab | ab | ab | ab | ab | ab |
| Average g gained/day for each period | 89.263 | 80.341 | 85.170 | 84.870 | 87.490 | 85.806 | 85.664 | 83.795 | 84.898 | 84.018 | 85.517 |
| Significance (P<0.05) | a | c | ab | b | ab | ab | ab | bc | ab | b | ab |

| Days 36-42 | T1 | T2 | T3 | T4 | T5 | T6 | T7 | T8 | T9 | T10 | T11 |
|---|---|---|---|---|---|---|---|---|---|---|---|
| Average Body Wt. (g) | 745.5 | 634.4 | 764.4 | 808.4 | 766.0 | 757.0 | 798.7 | 767.0 | 799.1 | 767.5 | 798.7 |
| Significance (P<0.05) | b | c | ab | a | ab | ab | ab | a | ab | ab | ab |
| Feed Conversion Corrected | 2.519 | 2.818 | 2.544 | 2.514 | 2.583 | 2.634 | 2.608 | 2.630 | 2.606 | 2.605 | 2.527 |
| Significance (P<0.05) | a | b | a | a | a | ab | ab | ab | ab | ab | a |
| Mortality % | 0.189 | 0.379 | 0.189 | 0.189 | 0.379 | 0.521 | 0.000 | 0.060 | 0.060 | 0.060 | 0.060 |
| Significance (P<0.05) | a | a | a | a | a | a | a | a | a | a | a |
| Average Body Wt. Gain (g) | 745.5 | 634.4 | 764.4 | 808.4 | 766.0 | 757.0 | 798.7 | 767.0 | 799.1 | 767.5 | 798.7 |
| Significance (P<0.05) | b | c | ab | a | ab | ab | ab | a | ab | ab | ab |
| Feed Consumption (g per bird per day) | 267.268 | 251.012 | 264.894 | 286.772 | 268.861 | 280.327 | 295.783 | 287.523 | 286.439 | 296.211 | 291.154 |
| Significance (P<0.05) | ab | b | ab | a | a | ab | ab | ab | ab | ab | ab |
| Average g gained/day for each period | 106.498 | 90.628 | 112.056 | 115.482 | 112.284 | 108.142 | 113.826 | 109.571 | 114.158 | 112.495 | 114.103 |
| Significance (P<0.05) | b | c | ab | a | a | ab | ab | ab | ab | ab | ab |

| Lesion Scores | T1 | T2 | T3 | T4 | T5 | T6 | T7 | T8 | T9 | T10 | T11 |
|---|---|---|---|---|---|---|---|---|---|---|---|
| Lesion Scores Day 21 | 0.265 | 1.795 | 0.273 | 0.500 | 0.364 | 0.250 | 0.563 | 0.188 | 0.500 | 0.188 | 0.313 |
| Significance (P<0.05) | ab | c | ab | ab | ab | ab | ab | ab | ab | ab | ab |
| Lesion Scores Day 42 | 0.319 | 1.709 | 0.416 | 0.464 | 0.427 | 0.350 | 0.350 | 0.425 | 0.500 | 0.500 | 0.500 |
| Significance (P<0.05) | a | c | a | a | a | a | a | a | a | a | a |

FIG. 10

| Days 22-35 | T12 | T13 | T14 | T15 |
|---|---|---|---|---|
| Average Body Wt. (g) | 1175.9 | 1182.4 | 1177.9 | 1197.7 |
| Significance (P<0.05) | b | b | b | ab |
| Feed Conversion Corrected | 1.662 | 1.646 | 1.695 | 1.844 |
| Significance (P<0.05) | bc | c | bc | c |
| Mortality % | 0.120 | 0.641 | 0.160 | 0.160 |
| Significance (P<0.05) | a | a | a | a |
| Average Body Wt. Gain (g) | 1175.9 | 1182.4 | 1177.9 | 1197.7 |
| Significance (P<0.05) | b | b | b | ab |
| Feed Consumption (g per bird per day) | 139.779 | 138.684 | 142.840 | 142.192 |
| Significance (P<0.05) | b | b | ab | ab |
| Average g gained/day for each period | 83.992 | 84.460 | 84.135 | 85.548 |
| Significance (P<0.05) | b | b | b | ab |

| Days 36-42 | | | | |
|---|---|---|---|---|
| Average Body Wt. (g) | 767.7 | 796.5 | 786.2 | 782.7 |
| Significance (P<0.05) | ab | ab | ab | ab |
| Feed Conversion Corrected | 2.676 | 2.639 | 2.697 | 2.873 |
| Significance (P<0.05) | ab | ab | ab | ab |
| Mortality % | 0.000 | 0.000 | 0.521 | 0.800 |
| Significance (P<0.05) | a | a | a | a |
| Average Body Wt. Gain (g) | 767.7 | 796.5 | 786.2 | 782.7 |
| Significance (P<0.05) | ab | ab | ab | ab |
| Feed Consumption (g per bird per day) | 330.715 | 300.570 | 299.718 | 298.349 |
| Significance (P<0.05) | a | a | a | a |
| Average g gained/day for each period | 112.527 | 114.073 | 112.316 | 111.820 |
| Significance (P<0.05) | ab | ab | ab | ab |

| Lesion Scores | | | | |
|---|---|---|---|---|
| Lesion Scores Day 21 | 0.888 | 0.563 | 0.250 | 0.125 |
| Significance (P<0.05) | b | ab | ab | a |
| Lesion Scores Day 42 | 0.475 | 0.550 | 0.475 | 0.575 |
| Significance (P<0.05) | ab | b | ab | b |

FIG. 11

| Intestinal Bacteria Data | T1 | T2 | T3 | T4 | T5 | T6 | T7 | T8 | T9 | T10 | T11 |
|---|---|---|---|---|---|---|---|---|---|---|---|
| E. coli (log10) Day 21 | 4.919 | 7.029 | 5.957 | 5.532 | 4.825 | 6.058 | 5.791 | 6.111 | 5.890 | 6.146 | 5.503 |
| Significance (P<0.05) | a | f | de | c | a | de | cd | de | cd | de | bc |
| E. coli (log10) Day 42 | 5.147 | 6.773 | 5.745 | 5.436 | 5.108 | 6.270 | 6.008 | 6.149 | 5.724 | 6.518 | 5.744 |
| Significance (P<0.05) | a | f | c | d | a | ef | cde | def | bc | f | bc |
| APC (log10) Day 21 | 6.804 | 6.365 | 5.950 | 6.213 | 5.988 | 5.934 | 5.972 | 5.900 | 5.906 | 6.094 | 6.094 |
| Significance (P<0.05) | a | b | a | ab | a | b | b | b | b | ab | ab |
| APC (log10) Day 42 | 6.446 | 6.230 | 6.063 | 6.075 | 6.322 | 6.071 | 5.777 | 6.051 | 5.955 | 5.952 | 6.136 |
| Significance (P<0.05) | e | bcde | abc | abcd | cde | abcde | a | abcd | abc | abc | abcde |
| Salmonella Incidence (%) Day 21 | 6.818 | 72.727 | 29.545 | 36.364 | 20.455 | 56.250 | 43.750 | 43.750 | 31.250 | 37.500 | 18.750 |
| Significance (P<0.05) | a | e | abcd | bcd | ab | de | bcd | bcd | abcd | bcd | abc |
| Salmonella Incidence (%) Day 42 | 3.636 | 83.636 | 47.273 | 41.818 | 39.091 | 52.500 | 35.000 | 50.000 | 42.500 | 70.000 | 42.500 |
| Significance (P<0.05) | a | e | bcd | b | b | bcd | b | c | bcd | cde | b |
| Clostridium perfringens (log10) Day 21 | 4.640 | 6.758 | 5.542 | 5.776 | 5.101 | 5.853 | 5.133 | 5.872 | 5.811 | 5.855 | 4.955 |
| Significance (P<0.05) | a | e | b | b | b | c | b | c | c | c | ab |
| Clostridium perfringens (log10) Day 42 | 4.749 | 6.739 | 5.732 | 5.787 | 5.125 | 5.663 | 5.842 | 5.665 | 5.811 | 5.802 | 5.852 |
| Significance (P<0.05) | a | d | c | c | b | c | c | c | c | c | c |

| Processing Data | T1 | T2 | T3 | T4 | T5 | T6 | T7 | T8 | T9 | T10 | T11 |
|---|---|---|---|---|---|---|---|---|---|---|---|
| Carcass Yield (NOT chilled) Day 42 | 71.569 | 67.652 | 68.394 | 70.325 | 71.604 | 70.361 | 71.922 | 70.244 | 71.190 | 70.956 | 72.131 |
| Significance (P<0.05) | bc | a | ab | bc | bc | bc | bc | bc | bc | bc | bc |
| Carcass Yield (CHILLED) Day 42 | 72.943 | 69.046 | 69.781 | 71.742 | 73.804 | 71.767 | 73.400 | 71.806 | 72.585 | 72.308 | 73.540 |
| Significance (P<0.05) | cd | a | ab | bc | cd | bcd | cd | bc | cd | cd | cd |
| Breast Yield (% live weight) Day 42 | 16.462 | 14.494 | 15.476 | 15.874 | 16.524 | 15.594 | 16.514 | 15.473 | 16.482 | 15.550 | 16.617 |
| Significance (P<0.05) | d | a | b | c | d | b | d | b | d | b | d |
| Breast Yield (% pre-chill weight) Day 42 | 23.194 | 21.597 | 22.803 | 22.733 | 23.262 | 22.271 | 23.149 | 22.186 | 23.345 | 22.110 | 23.208 |
| Significance (P<0.05) | ef | a | cdef | cdef | f | abcd | def | abcd | f | abc | ef |
| Breast Yield (% post-chill weight) Day 42 | 22.752 | 21.153 | 22.344 | 22.283 | 22.809 | 21.633 | 22.677 | 21.760 | 22.890 | 21.692 | 22.755 |
| Significance (P<0.05) | e | d | bcde | bcde | e | abcd | cde | abc | e | abc | de |

NOTE: "Significance P<0.05" refers to means within a row without a common superscript are significantly different (P<0.05) as determined by Least Significant Difference.

FIG. 12

| Intestinal Bacteria Data | T12 | T13 | T14 | T15 |
|---|---|---|---|---|
| E. coli (log10) Day 21 | 6.313 | 5.866 | 6.502 | 5.083 |
| Significance (P<0.05) | de | cd | e | ab |
| E. coli (log10) Day 42 | 6.229 | 5.826 | 6.399 | 5.919 |
| Significance (P<0.05) | ef | cd | f | cde |
| APC (log10) Day 21 | 5.849 | 5.942 | 6.296 | 6.058 |
| Significance (P<0.05) | a | a | ab | ab |
| APC (log10) Day 42 | 6.386 | 6.029 | 5.882 | 6.112 |
| Significance (P<0.05) | de | abcd | ab | abcde |
| Salmonella Incidence (%) Day 21 | 56.250 | 6.250 | 50.000 | 25.000 |
| Significance (P<0.05) | de | a | cde | abc |
| Salmonella Incidence (%) Day 42 | 72.500 | 40.000 | 42.500 | 32.500 |
| Significance (P<0.05) | de | b | b | b |
| Clostridium perfringens (log10) Day 21 | 5.708 | 4.934 | 5.673 | 5.037 |
| Significance (P<0.05) | c | ab | c | ab |
| Clostridium perfringens (log10) Day 42 | 5.751 | 5.070 | 5.700 | 5.118 |
| Significance (P<0.05) | c | b | c | b |

| Processing Data | T12 | T13 | T14 | T15 |
|---|---|---|---|---|
| Carcass Yield (NOT chilled) Day 42 | 71.432 | 72.976 | 69.462 | 70.963 |
| Significance (P<0.05) | bc | c | abc | bc |
| Carcass Yield (CHILLED) Day 42 | 72.822 | 74.437 | 70.914 | 72.317 |
| Significance (P<0.05) | cd | d | abc | cd |
| Breast Yield (% live weight) Day 42 | 15.621 | 16.479 | 15.502 | 16.465 |
| Significance (P<0.05) | b | d | b | d |
| Breast Yield (% pre-chill weight) Day 42 | 22.027 | 22.707 | 22.519 | 23.256 |
| Significance (P<0.05) | ab | bcdef | bcde | f |
| Breast Yield (% post-chill weight) Day 42 | 21.601 | 22.260 | 22.056 | 22.918 |
| Significance (P<0.05) | ab | bcde | bcde | e |

NOTE: "Significance P<0.05" refers to means within a row without a common superscript are significantly different (P<0.05) as determined by Least Significant Difference.

FIG. 13

| | Pathogens | Salmonella Heidelberg | E.Coli O157 | Enterococcus cecorum | Clostridium perfringens |
|---|---|---|---|---|---|
| | Original Pathogen levels | 8.5 | 12 | 9.1 | 0.79 |
| Bacillus coagulans | Provia 6086 | 9 | 16 | 4.6 | 0.66 |
| | Pathogen Growth | 6% | 33% | -49% | -16% |
| Bacillus licheniformis | Osprey | 5.1 | 14 | 9.5 | 0.7 |
| | Pathogen Growth | -40% | 17% | 4% | -11% |
| Bacillus coagulans | Unique Biotech | 10 | 9.9 | 12 | 0.45 |
| | Pathogen Growth | 18% | -18% | 32% | -43% |
| Bacillus subtilis | Calsporin | 4.9 | 4.1 | 5.4 | 0.27 |
| | Pathogen Growth | -42% | -66% | -41% | -66% |
| Bacillus subtilis | Galipro | 3.7 | 4.5 | 1.4 | 0.19 |
| | Pathogen Growth | -56% | -63% | -85% | -76% |
| Bacillus licheniformis | Vland BL | 2.5 | 3.6 | 1.5 | 0.87 |
| | Pathogen Growth | -71% | -70% | -84% | 10% |
| Bacillus subtilis | Vland BS | 3.6 | 2.3 | 2.2 | 0.92 |
| | Pathogen Growth | -58% | -81% | -76% | 16% |
| Lactobacillus animalis 51 | NPC LA 51 | 4.2 | 4.5 | 3.7 | 0.71 |
| | Pathogen Growth | -51% | -63% | -59% | -10% |

FIG. 18

|  | Pathogens | Salmonella Heidelberg | E.Coli O157 | Enterococcus cecorum | Clostridium perfringens |
|---|---|---|---|---|---|
|  | Original Pathogen levels | 6.1 | 15 | 11 | 1.1 |
| LR-01 | Provia 6086 | 3.4 | 6.3 | 5 | 0.6 |
|  | Pathogen Growth | -44% | -58% | -55% | -45% |
| LR-02 | Osprey | 5.9 | 10 | 7.2 | 0.66 |
|  | Pathogen Growth | -3% | -33% | -35% | -40% |
| LR-03 | Unique Biotech | 4 | 9.7 | 6.1 | 0.49 |
|  | Pathogen Growth | -34% | -35% | -45% | -55% |
| LR-05 | Galipro | 2.2 | 7.4 | 3.4 | 0.41 |
|  | Pathogen Growth | -64% | -51% | -69% | -63% |
| Bacillus licheniformis | Vland BL | 3.7 | 5.9 | 3.5 | 0.65 |
|  | Pathogen Growth | -39% | -61% | -68% | -41% |
| Bacillus subtilis | Vland BS | 3.5 | 8.2 | 4.7 | 0.22 |
|  | Pathogen Growth | -43% | -45% | -57% | -80% |
| Osprey 1 | BC | 3.5 | 6.9 | 5.4 | 0.32 |
|  | Pathogen Growth | -43% | -54% | -51% | -71% |
| Osprey 2 | BS | 3.1 | 8.5 | 6.2 | 0.59 |
|  | Pathogen Growth | -49% | -43% | -44% | -46% |

FIG. 19

BACILLUS COMBINATION FOR ADMINISTRATION TO ANIMALS

CROSS REFERENCE TO RELATED APPLICATION

This application is a divisional of U.S. patent application Ser. No. 16/930,577, filed on Jul. 16, 2020, which is a continuation of International Application No. PCT/US2019/014938, filed Jan. 24, 2019, which was published in English under PCT Article 21(2), which in turn claims the benefit of the earlier filing date of U.S. provisional patent application No. 62/621,196, filed on Jan. 24, 2018, all of which are incorporated herein by reference in their entireties.

FIELD

The present application concerns a combination and/or composition comprising three or four *Bacillus* species selected from *Bacillus amyloliquefaciens, Bacillus subtilis, Bacillus licheniformis* and *Bacillus coagulans* for administration to animals, particularly avians.

BACKGROUND

The gastrointestinal (GI) tracts of mammals are colonized by a diverse community of microflora. The GI tract may include hundreds of different species, and this community profile may change over time based on age and health of the individual. A healthy microbiota community in a subject provides many benefits, such as resistance to pathogens, nutrient absorption, and immune system performance. Intestinal microbiota also play a significant role in mediating pathogenic infections of the gut, which significantly affect quality of life. The gastrointestinal microflora compositions of both humans and animals substantially depend upon ingested materials. Accordingly, direct-fed microbial (DFM) compositions are commonly administered to influence physiological health.

DFM products also are administered as an alternative to antibiotics in livestock species. DFMs can restrict adherence of pathogenic microbes to mucosal surfaces, can stimulate an immune response or proliferation of other endogenous beneficial microorganisms. Moreover, certain DFMs produce and secrete other beneficial compounds or compositions, such as antimicrobial substances. Similar results between feeding DFM products and prophylactic levels of antibiotics for growth have been demonstrated. As a result, DFM products may be used as an alternative to antibiotics, or perhaps in combination with antibiotics.

Despite these prior DFM compositions, a need still exists for DFM compositions that beneficially effect subjects receiving such compositions.

SUMMARY

Embodiments of a combination and/or composition comprising three or four *Bacillus* species selected from *Bacillus amyloliquefaciens, Bacillus subtilis, Bacillus licheniformis* and *Bacillus coagulans* are disclosed. The combination/composition is referred to herein as the Bacilli combination. In some embodiments, the composition comprises, consists essentially of, or consists of, *Bacillus subtilis, Bacillus licheniformis* and *Bacillus amyloliquefaciens*. In other embodiments, the composition comprises, consists essentially of, or consists of, *Bacillus subtilis, Bacillus licheniformis, Bacillus amyloliquefaciens*, and *Bacillus coagulans*. In further embodiments, the composition comprises, consists essentially of, or consists of, *Bacillus coagulans, Bacillus subtilis*, and *Bacillus licheniformis*.

Also disclosed are embodiments of an admixed composition comprising a Bacilli combination and an additional component or composition. Exemplary admixed compositions comprise a first composition consisting essentially of, or consisting of, the Bacilli combination, and a second component or composition comprising one or more of a feed, *yucca, quillaja, yucca* and *quillaja*, a silica, mineral clay, a glucan and mannans mixture, a copper salt, a vitamin, an additional direct fed microbial, and any combination thereof.

The foregoing and other objects, features, and advantages of the invention will become more apparent from the following detailed description, which proceeds with reference to the accompanying figures.

BRIEF DESCRIPTION OF THE DRAWINGS

FIG. 1 is a table illustrating the results from the study described in Example 3.

FIG. 2 is a table illustrating results from the study described in Example 4.

FIG. 3 is a table illustrating additional results from the study described in Example 4.

FIG. 4 is a table illustrating results from days 0-14 of the study described in Example 6 for treatment groups T1-T11.

FIG. 5 is a table illustrating results from days 0-14 of the study described in Example 6 for treatment groups T12-T15.

FIG. 6 is a table illustrating results from days 0-21 and 0-35 of the study described in Example 6 for treatment groups T1-T11.

FIG. 7 is a table illustrating results from days 0-21 and 0-35 of the study described in Example 6 for treatment groups T12-T15.

FIG. 8 is a table illustrating results from days 0-42 and 15-22 of the study described in Example 6 for treatment groups T1-T11.

FIG. 9 is a table illustrating results from days 0-42 and 15-22 of the study described in Example 6 for treatment groups T12-T15.

FIG. 10 is a table illustrating results from days 22-35 and 36-42 of the study described in Example 6 for treatment groups T1-T11, and also providing the lesion scores.

FIG. 11 is a table illustrating results from days 22-35 and 36-42 of the study described in Example 6 for treatment groups T12-T15, and also providing the lesion scores.

FIG. 12 is a table illustrating the intestinal bacterial data and processing data obtained from treatment groups T1-11 from the study described in Example 6.

FIG. 13 is a table illustrating the intestinal bacterial data and processing data obtained from treatment groups T12-T15 from the study described in Example 6.

FIG. 18 is a table of results from an in vitro culture test looking at pathogen growth inhibition.

FIG. 19 is a table of results from a second in vitro culture test looking at pathogen growth inhibition.

DETAILED DESCRIPTION

I. Terms

Figure 14:
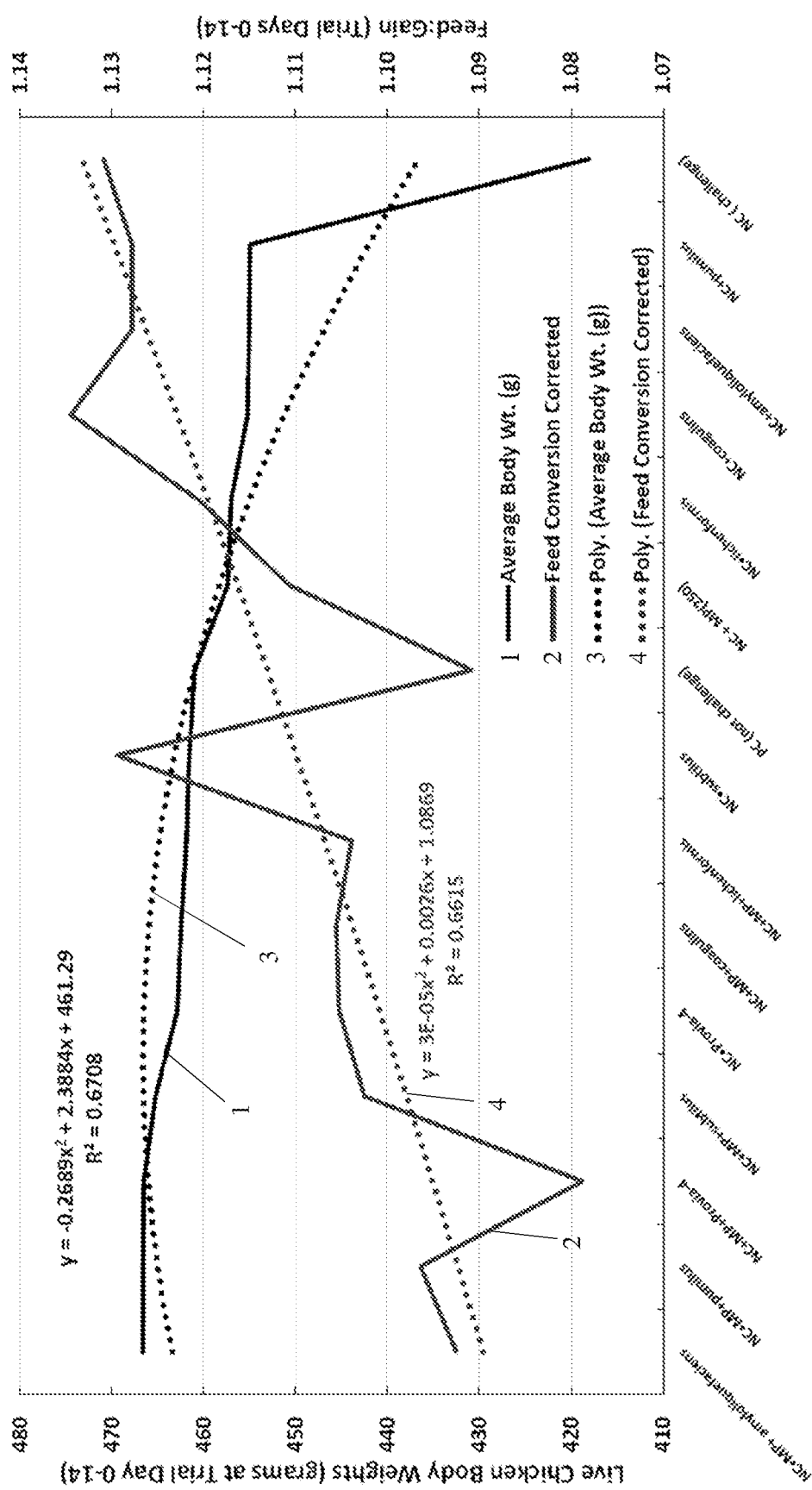
FIG. 14 is a graph of live chicken body weights and feed:gain ratio, illustrating the effect of Magni-Phi® (250 ppm) alone, various DMFs alone, and Magni-Phi®/DFM combinations on body weight gain (0-14 days) and feed conversion (Feed:Gain 0-14 days) from the study described in Example 6, with the dotted lines indicating the polynomial trend line for the respective graphs.

The following explanations of terms and abbreviations are provided to better describe the present disclosure and to guide those of ordinary skill in the art in the practice of the present disclosure. As used herein, "comprising" means "including" and the singular forms "a" or "an" or "the" include plural references unless the context clearly dictates otherwise. The term "or" refers to a single element of stated alternative elements or a combination of two or more elements, unless the context clearly indicates otherwise.

Unless explained otherwise, all technical and scientific terms used herein have the same meaning as commonly understood by one of ordinary skill in the art to which this disclosure pertains. Although methods and materials similar or equivalent to those described herein can be used in the practice or testing of the present disclosure, suitable methods and materials are described below. The materials, methods, and examples are illustrative only and not intended to be limiting. Other features of the disclosure are apparent from the following detailed description and the claims.

Unless otherwise indicated, all numbers expressing quantities of components, molecular weights, percentages, temperatures, times, and so forth, as used in the specification or claims are to be understood as being modified by the term "about." Accordingly, unless otherwise indicated, implicitly or explicitly, the numerical parameters set forth are approximations that may depend on the desired properties sought and/or limits of detection under standard test conditions/methods. When directly and explicitly distinguishing embodiments from discussed prior art, the embodiment numbers are not approximates unless the word "about" is recited.

Administering: Administration by any route to a subject, such as poultry. In some embodiments, the route of administration is oral.

Antimicrobial: An agent that kills and/or inhibits the growth of microorganisms. As used herein, antimicrobials include antibiotics, antifungals, antivirals, and antiparasitics including anticoccidials, or combinations thereof.

Carrier: A substance that is used as an additive in (or with) a combination, composition, or component as disclosed herein. As used herein, a carrier may be incorporated within particles of a combination, composition, or component, or it may be physically mixed with particles of a combination, composition, or component. A carrier can be used, for example, to modify non-biological properties of a combination or composition, such as flowability, stability during storage, exposure to moisture, etc. Examples of carriers are included herein.

Colony forming units (CFU): "Colony forming units" refers to individual colonies of bacteria. A colony is a mass of individual bacteria growing together. For certain embodiments, a colony comprises substantially the same species, and may comprise, but does not necessarily comprise, substantially the same strain. CFU are a measure of the number of bacteria present in or on a surface of a sample. However, CFU is not necessarily a measure of individual cells or spores, as a colony may be formed from a single or a mass of cells or spores.

Combination: A combination includes two or more components that are administered such that the effective time period of at least one component overlaps with the effective time period of at least one other component. A combination, or a component thereof, may be a composition. In some embodiments, effective time periods of all components administered overlap with each other. In an exemplary embodiment of a combination comprising three components, the effective time period of the first component administered may overlap with the effective time periods of the second and third components, but the effective time periods of the second and third components independently may or may not overlap with one another. In another exemplary embodiment of a combination comprising three components, the effective time period of the first component administered overlaps with the effective time period of the second component, but not that of the third component; and the effective time period of the second component overlaps with those of the first and third components. A combination may be a composition comprising the components, a composition comprising one or more components and another separate component (or components) or composition(s) comprising the remaining component(s), or the combination may be two or more individual components. In some embodiments, the two or more components may comprise the same component administered at two or more different times, two or more different components administered substantially simultaneously or sequentially in any order, or a combination thereof.

Bacilli Combination: Refers to a combination, or a composition, of DFMs including only three or four *Bacillus* species selected from *Bacillus amyloliquefaciens, Bacillus subtilis, Bacillus licheniformis* and *Bacillus coagulans*. In some disclosed embodiments, "Bacilli combination" refers to a composition for administration to a subject, particularly to an animal, and even more particularly to an avian, such as chickens and turkeys, that consists of or consists essentially of any three or four of *Bacillus amyloliquefaciens, Bacillus subtilis, Bacillus licheniformis* and *Bacillus coagulans*. In other embodiments, "Bacilli combination" refers to *Bacillus amyloliquefaciens, Bacillus subtilis, Bacillus licheniformis* and *Bacillus coagulans* administered in combination without any other DFMs. A person of ordinary skill in the art will understand that the Bacilli combination may include additional residual material that is carried over from the production of any or all of the three or four *Bacillus* species, such as a dry milk product, and/or a carrier that does not materially affect the structure, function, novel and/or basic features of the *Bacillus* species.

CSL Combination: Refers to a combination, or a composition, of DFMs including only *Bacillus coagulans, Bacillus*

*subtilis* and *Bacillus licheniformis*. In some disclosed embodiments, "CSL combination" refers to a composition for administration to a subject, particularly to an animal, and even more particularly to an avian, such as chickens and turkeys, that consists of or consists essentially of *Bacillus coagulans, Bacillus subtilis* and *Bacillus licheniformis*. In other embodiments, "CSL combination" refers to *Bacillus coagulans, Bacillus subtilis* and *Bacillus licheniformis* administered in combination without any other DFMs. A person of ordinary skill in the art will understand that the CSL combination may include additional residual material that is carried over from the production of any or all of the three *Bacillus* species, such as a dry milk product, and/or a carrier that does not materially affect the structure, function, novel and/or basic features of the three *Bacillus* species.

ASL Combination: Refers to a combination, or a composition, of DFMs including only *Bacillus amyloliquefaciens, Bacillus subtilis* and *Bacillus licheniformis*. In some disclosed embodiments, "ASL combination" refers to a composition for administration to a subject, particularly to an animal, and even more particularly to an avian, such as chickens and turkeys, that consists of or consists essentially of *Bacillus amyloliquefaciens, Bacillus subtilis* and *Bacillus licheniformis*. In other embodiments, "ASL combination" refers to *Bacillus amyloliquefaciens, Bacillus subtilis* and *Bacillus licheniformis* administered in combination without any other DFMs. A person of ordinary skill in the art will understand that the ASL combination may include additional residual material that is carried over from the production of any or all of the three *Bacillus* species, such as a dry milk product, and/or a carrier that does not materially affect the structure, function, novel and/or basic features of the three *Bacillus* species.

ASLC Combination: Refers to a combination, or a composition, of DFMs including only *Bacillus amyloliquefaciens, Bacillus subtilis, Bacillus licheniformis* and *Bacillus coagulans*. In some disclosed embodiments, "ASLC combination" refers to a composition for administration to a subject, particularly to an animal, and even more particularly to an avian, such as chickens and turkeys, that consists of or consists essentially of *Bacillus amyloliquefaciens, Bacillus subtilis, Bacillus licheniformis* and *Bacillus coagulans*. In other embodiments, "ASLC combination" refers to *Bacillus amyloliquefaciens, Bacillus subtilis, Bacillus licheniformis* and *Bacillus coagulans* administered in combination without any other DFMs. A person of ordinary skill in the art will understand that the ASLC combination may include additional residual material that is carried over from the production of any or all of the four *Bacillus* species, such as a dry milk product, and/or a carrier that does not materially affect the structure, function, novel and/or basic features of the four *Bacillus* species.

Direct fed microbial: A composition that contains live and/or viable microorganisms, typically bacteria and/or yeast, that provides a beneficial effect on an animal, such as, but not limited to, an antimicrobial effect including decreased bacterial counts, improved feed conversion rate, improved weight gain, improved health parameters, reduced mortality rate, and/or improved lesion scores.

Feed conversion rate: A measure of the efficiency of an animal to convert feed mass into increased body mass. Typically, the feed conversion rate is calculated as pounds of feed divided by pounds of weight gain, and therefore may be expressed as a dimensionless number. The feed conversion rate is also known in the art as the feed conversion ratio, or feed efficiency.

Mannans: A class of polysaccharides including the sugar mannose. The mannans family includes pure mannans (i.e., the polymer backbone comprises of mannose monomers), glucomannan (the polymer backbone comprises mannose and glucose), and galactomannan (mannans or glucomannan in which single galactose residues are linked to the polymer backbone). Mannans are found in cell walls of some plant species and yeasts, and may be provided as extracts of such plant species and/or yeasts.

Mineral clay: The term "mineral clay" refers to hydrous aluminum silicates. Mineral clays usually include minor amounts of impurities, such as potassium, sodium, calcium, magnesium, and/or iron.

Saponin: A class of chemical compounds, one of many secondary metabolites found in natural sources. Saponins are found in particular abundance in various plant species, such as *quillaja* and *yucca*. More specifically, saponins are amphipathic glycosides grouped, in terms of structure, by their composition. In certain embodiments, a saponin comprises one or more hydrophilic glycoside moieties combined with a lipophilic triterpene or a triterpene derivative, a steroid or a steroidal derivative, or both.

Strain: A strain refers to two members of the same species having a discernible phenotypic and/or genetic difference.

Subject: Any animal or human, but particularly livestock (e.g., cows, sheep, goats, pigs, turkeys, and chickens) and household pets (e.g., dogs, cats, and rodents), and most typically "subject" refers herein to avians, including poultry, such as chickens and turkeys.

Effective amount: A quantity or concentration of a specified compound, composition or combination sufficient to achieve an effect in a subject.

Vitamin: Includes Vitamin A, Vitamin B1 (thiamine), Vitamin B2 (riboflavin), Vitamin B3 (niacin or niacinamide), Vitamin B5 (pantothenic acid), Vitamin B6 (pyridoxine, pyridoxal, or pyridoxamine, or pyridoxine hydrochloride), Vitamin B7 (biotin), Vitamin B9 (folic acid), Vitamin B12 (various cobalamins; commonly cyanocobalamin in vitamin supplements), vitamin C, vitamin D, vitamin E, vitamin K, K1 and K2 (i.e. MK-4, MK-7), folic acid and biotin, and derivative and analogs thereof.

Additional disclosure is provided by U.S. patent application Ser. No. 14/699,740, U.S. patent application Ser. No. 13/566,433, U.S. patent application Ser. No. 13/872,935, U.S. Patent Publication No. 2013/0017211, U.S. Patent Publication No. 2012/0156248, U.S. Patent Publication No. 2007/0253983, U.S. Patent Publication No. 2007/0202092, U.S. Patent Publication No. 2007/0238120, U.S. Patent Publication No. 2006/0239992, U.S. Patent Publication No. 2005/0220846, U.S. Patent Publication No. 2005/0180964, and Australian Patent Application No. 2011/201420, each of which is incorporated herein by reference in its entirety.

II. Bacilli Combination

A Bacilli combination is a combination or composition comprising three or four DFMs selected from *Bacillus coagulans, Bacillus subtilis, Bacillus licheniformis* and *Bacillus amyloliquefaciens*. A CSL combination is a combination or composition comprising the DFMs *Bacillus coagulans, Bacillus subtilis* and *Bacillus licheniformis* and no additional DFMs. An ASL combination is a combination or composition comprising the DFMs *Bacillus amyloliquefaciens, Bacillus subtilis* and *Bacillus licheniformis*. In some embodiments, an ASL combination comprises, consists essentially of, or consists of *Bacillus amyloliquefaciens, Bacillus subtilis* and *Bacillus licheniformis* and no additional DFMs. An ASLC combination is a combination or composition comprising the DFMs *Bacillus amyloliquefaciens, Bacillus subtilis, Bacillus licheniformis* and *Bacillus coagulans*. In some embodiments, an ASLC combination comprises, consists essentially of, or consists of *Bacillus amyloliquefaciens, Bacillus subtilis, Bacillus licheniformis* and *Bacillus coagulans*, but no other additional DFMs.

Certain aspects of the present invention concern the discovery that administering a Bacilli combination, such as a CSL combination, an ASL combination, or an ASLC combination, to a subject provides a substantial benefit to the subject compared to a subject that is not administered the combination. The combination may be administered as a composition. With particular reference to poultry, a Bacilli combination provides a substantial benefit with respect to one or more of feed conversion rate, average body weight, average body weight gain, body weight coefficient of variation, bird mortality, lesion scores, *Salmonella/E. Coli/Clostridium* perfingens (CP) incidence, and/or oocysts in fecal matter relative to poultry fed none, one, or two of these bacilli in any combination.

In some embodiments, one or more of the *bacillus* in the Bacilli combination is provided as a *bacillus* spore, and in certain embodiments, all of the *bacillus* in the Bacilli combination are provided as spores.

In some embodiments, one or more of the *bacillus* in the Bacilli combination is dehydrated, such as by freeze drying or lyophilization, spray drying or other suitable dehydration techniques. Dehydration, such as by freeze drying or spray drying may improve the stability and/or shelf-life of the bacteria. In certain embodiments, all the *bacillus* in the *Bacillus* combination are freeze dried.

A. Bacillus Strains

A person of ordinary skill in the art will appreciate that any strain, or combinations of strains, of *Bacillus coagulans, Bacillus subtilis, Bacillus licheniformis* and/or *Bacillus amyloliquefaciens* can be used in the Bacilli combination. As used herein the terms "*Bacillus amyloliquefaciens,*" "*Bacillus coagulans,*" "*Bacillus subtilis*" and "*Bacillus licheniformis*" independently may refer to a single strain of the respective *Bacillus* species, or to multiple strains, such as 2, 3, 4, 5, 6, 7, 8, 9, 10 or more strains, of each respective *Bacillus* species. Solely by way of example and without limitation, certain acceptable exemplary strains of each *Bacillus* species are listed below. In certain embodiments, a *Bacillus* combination includes one or more of *Bacillus amyloliquefaciens* TOA5001, *Bacillus coagulans* GBI-30 strain, ATCC Designation Number PTA-6086, *Bacillus licheniformis* OBT618, and *Bacillus subtilis* strain OBT 1224, and in a particular embodiments, the *Bacillus* combination includes *Bacillus amyloliquefaciens* TOA5001, *Bacillus coagulans* GBI-30 strain, ATCC Designation Number PTA-6086, *Bacillus licheniformis* OBT618, and *Bacillus subtilis* strain OBT 1224.

Bacillus coagulans Strains

*Bacillus coagulans* Hammer ATCC® BAA-738™ strain LMG 17453, Logan B0934, NCTC 3992, Vitek #202384, *Bacillus coagulans* Hammer ATCC® 7050™ strain NRS 609, NCIB 9365, NCTC 10334, DSM 1, CCM 2013, WDCM 00002, *Bacillus coagulans* Hammer ATCC® 8038™ strain NCA 43P, NCIB 8080, NRS 770, DSM 2312 deposited with ATCC as *Bacillus thermoacidurans* by Berry, *Bacillus coagulans* Hammer ATCC® 10545™ strain NRS 784, NCIB 8041, DSM 2311, CCM 1082, deposited with ATCC as *Bacillus* dextrolacticus by Andersen and Werkman, *Bacillus coagulans* Hammer ATCC® 11014™ strain NRS T27, 78G, DSM 2383, *Bacillus coagulans* Hammer ATCC® 11369™ strain C, DSM 2384 deposited with ATCC as *Bacillus* dextrolacticus by Andersen and Werkman, *Bacillus coagulans* Hammer ATCC® 12245™ strain NCA 308, DSM 2308, NCIB 8870, *Bacillus coagulans* Hammer ATCC® 15949™ strain NCA 4259, DSM 2385, *Bacillus coagulans* Hammer ATCC® 23498™ strain M-39, DSM 2314, NCIB 10276 deposited with ATCC as *Bacillus* racemilacticus by Nakayama and Yanoshi, *Bacillus coagulans* Hammer ATCC® 31284™ deposited with ATCC as *Lactobacillus sporogenes* by Horowitz-Wiassowa and Nowotelnow, Ganeden Biotech Inc.'s *Bacillus coagulans* GBI-30 strain, ATCC Designation Number PTA-6086, *Bacillus coagulans* Hammer ATCC® 53595™ strain PM-1000, *Bacillus coagulans* Hammer strain DSM 2350, NRRL-NRS 2012, *Bacillus coagulans* Hammer strain DSM 2356, NCIB 8523, N.R.Smith (NRS) 798, B. Hammer Iowa State College 200, *Bacillus coagulans* Hammer strain DSM 30760, *Bacillus coagulans* Hammer strain STI09070 (IMET), 1032-005, *Bacillus coagulans* Hammer strain STI09076 (IMET), 1141-003, *Bacillus coagulans* Hammer strain STI09080 (IMET), 1136-014, *Bacillus coagulans* Hammer strain STI09208 (IMET), 491-25, *Bacillus coagulans* Hammer strain STI09210 (IMET), 485-59, *Bacillus coagulans* Hammer strain NCIB 700460, Thl, *Bacillus coagulans* Hammer strain NCIB 701099, BG5, TH27 (205), *Bacillus coagulans* Hammer strain NCIB 701159, 254, and *Bacillus coagulans* Hammer strain NCIB 701164, 259.

Bacillus licheniformis Strains

*Bacillus licheniformis* (Weigmann) Chester ATCC® 6598™ strain NRS 745 deposited with ATCC as *Bacillus subtilis* by (Ehrenberg) Cohn, *Bacillus licheniformis* (Weigmann) Chester ATCC® 6634™ strain NRS 304, *Bacillus licheniformis* (Weigmann) Chester ATCC® 8480™ strain NRS 1128, *Bacillus licheniformis* (Weigmann) Chester ATCC® 9259™, *Bacillus licheniformis* (Weigmann) Chester ATCC® 9789™ strain AMNIH 723, ATCC 102, ATCC 4527, ATCC 8243, ATCC 9800, NCTC 2586, NCTC 6346, NRS 243, NRS 978, W. Ford 1, DSM 8785, DSM 46308, BU 171, CCDB b-30, CCEB 631, CCM 2205, CN 1060, HNCMB 101012, IFO 12195, IFO 12196, IMET 11025, NBRC 12195, NBRC 12196, NCDO 735, NCDO 835, NCIB 6346, NCIB 8059, NCIB 8061, OUT 8367, OUT 8368, Smith 243, Smith 978, HankeyB13 deposited with ATCC as *Bacillus subtilis* by (Ehrenberg) Cohn, *Bacillus licheniformis* (Weigmann) Chester ATCC® 9945™ strain NRS 712, NCIB 8062 deposited with ATCC as *Bacillus subtilis* by (Ehrenberg) Cohn, *Bacillus licheniformis* (Weigmann) Chester ATCC® 9945a™ strain CD-2, NCIB 11709, *Bacillus licheniformis* (Weigmann) Chester ATCC® 10716™ strain ATCC 11944, BS 2181, Boots 1343, CCM 2181, FDA BT1, NCIB 8874, NRS 1330, Tracy I, DSM 603, IFO 12199, NBRC 12199, *Bacillus licheniformis* (Weigmann) Chester ATCC® 11945™ strain 1331, FDA BT3, *Bacillus licheniformis* (Weigmann) Chester ATCC® 11946™ strain 1333, B-1001, *Bacillus licheniformis* (Weigmann) Chester ATCC® 12139™ strain CSC deposited with ATCC as *Bacillus subtilis* by (Ehrenberg) Cohn, *Bacillus licheniformis* (Weigmann) Chester ATCC® 12713™ strain PRL B479, NRRL B-1001, *Bacillus licheniformis* (Weigmann) Chester ATCC® 12759™ strain ATCC 11560, Damodaron P-8, LMG 7560, NRS 1415, Vitek #200148, NCIB 8549, HankeyB133, P8, *Bacillus licheniformis* (Weigmann) Chester ATCC® 12759-MINI-PACK™ strain ATCC 11560, Damodaron P-8, LMG 7560, NRS 1415, Vitek #200148, *Bacillus licheniformis* (Weigmann) Chester ATCC® 13438™ Strain NCTC 8233, M. II strain, *Bacillus licheniformis* (Weigmann) Chester ATCC® 14409™ strain 620, NRS 1114, NCIB 1042, deposited with ATCC as *Bacillus abysseus* by ZoBell and Upham, *Bacillus licheniformis* (Weigmann) Chester ATCC® 14580™ strain (Gibson) 46, NCIB 9375, NCTC 10341, NRS 1264, DSM 13, CCM 2145, IFO 12200, NBRC 12200, WDCM 00068, *Bacillus licheniformis* (Weigmann) Chester ATCC® 14580D-5™ strain designation: Genomic DNA from *Bacillus licheniformis* Strain 46 [ATCC® 14580™], *Bacillus licheniformis* (Weigmann) Chester ATCC® 14594™, *Bacillus licheniformis* (Weigmann) Chester ATCC® 21038™ strain L-065, *Bacillus licheniformis* (Weigmann) Chester ATCC® 21039™, *Bacillus licheniformis* (Weigmann) Chester ATCC® 21415™ strain NS 1 deposited with ATCC as *Bacillus subtilis* by (Ehrenberg) Cohn, *Bacillus licheniformis* (Weigmann) Chester ATCC® 21417™ strain M deposited with ATCC as *Bacillus subtilis* (Ehrenberg) Cohn, *Bacillus licheniformis* (Weigmann) Chester ATCC® 21418™ deposited with ATCC as *Bacillus subtilis* by (Ehrenberg) Cohn, *Bacillus licheniformis* (Weigmann) Chester ATCC® 21424™ strain DSM 1969, *Bacillus licheniformis* (Weigmann) Chester ATCC® 21610™ strain B-201-7 deposited with ATCC as *Bacillus subtilis* (Ehrenberg) Cohn, *Bacillus licheniformis* (Weigmann) Chester ATCC® 21667™ strain FD 23612, *Bacillus licheniformis* (Weigmann) Chester ATCC® 21733™ strain DSM 1913 deposited with ATCC as *Bacillus subtilis* by (Ehrenberg) Cohn, *Bacillus licheniformis* (Weigmann) Chester ATCC® 25972™ strain 749/C, DSM 8782, DSM 46217, IMET10723, NCIB 9443, *Bacillus licheniformis* (Weigmann) Chester ATCC® 27326™ strain OM-81, *Bacillus licheniformis* (Weigmann) Chester ATCC® 27811™ strain 584, FERM-P 1038, *Bacillus licheniformis* (Weigmann) Chester ATCC® 31667™ strain DG 14, *Bacillus licheniformis* (Weigmann) Chester ATCC® 31972™ strain PM-3, *Bacillus licheniformis* (Weigmann) Chester ATCC® 33632™ strain (IOC) 2390, NCIB 11672, *Bacillus licheniformis* (Weigmann) Chester ATCC® 39326™, *Bacillus licheniformis* (Weigmann) Chester ATCC® 53757™ strain PWD-1, *Bacillus licheniformis* (Weigmann) Chester ATCC® 53926™ strain E312, *Bacillus licheniformis* (Weigmann) Chester ATCC® 55768™ strain O.W.U. 138B [OWU 138B], *Bacillus licheniformis* (Weigmann) Chester strain DSM 15, C, *Bacillus licheniformis* (Weigmann) Chester strain DSM 392, *Bacillus licheniformis* (Weigmann) Chester strain DSM 394, *Bacillus licheniformis* (Weigmann) Chester strain DSM 7259, NRRL-NRS 1263, *Bacillus licheniformis* (Weigmann) Chester strain DSM 7459, *Bacillus licheniformis* (Weigmann) Chester strain DSM 11258, *Bacillus licheniformis* (Weigmann) Chester strain DSM 11259, *Bacillus licheniformis* (Weigmann) Chester strain DSM 12369, *Bacillus licheniformis* (Weigmann) Chester strain DSM 12370, *Bacillus licheniformis* (Weigmann) Chester strain DSM 26543, *Bacillus licheniformis* (Weigmann) Chester strain DSM 28096, *Bacillus licheniformis* (Weigmann) Chester strain DSM 28591, *Bacillus licheniformis* (Weigmann) Chester strain DSM 30523, *Bacillus licheniformis* (Weigmann) Chester strain DSM 30535, *Bacillus licheniformis* (Weigmann) Chester strain DSM 30542, *Bacillus licheniformis* (Weigmann) Chester strain DSM 30585, *Bacillus licheniformis* (Weigmann) Chester strain DSM 30615, *Bacillus licheniformis* (Weigmann) Chester strain DSM 30620, *Bacillus licheniformis* (Weigmann) Chester strain DSM 30624, *Bacillus licheniformis* (Weigmann) Chester strain DSM 30643, *Bacillus licheniformis* (Weigmann) Chester strain DSM 30654, *Bacillus licheniformis* (Weigmann) Chester strain DSM 30724, *Bacillus licheniformis* (Weigmann) Chester strain DSM 30766, *Bacillus licheniformis* (Weigmann) Chester strain DSM 30769, *Bacillus licheniformis* (Weigmann) Chester strain DSM 30778, *Bacillus licheniformis* (Weigmann) Chester strain DSM 30779, *Bacillus licheniformis* (Weigmann) Chester strain DSM 30865, *Bacillus licheniformis* (Weigmann) Chester strain DSM 30926, *Bacillus licheniformis* (Weigmann) Chester strain DSM 30959, *Bacillus licheniformis* (Weigmann) Chester strain DSM 30960, *Bacillus licheniformis* (Weigmann) Chester strain DSM 30961, *Bacillus licheniformis* (Weigmann) Chester strain DSM 30976, *Bacillus licheniformis* (Weigmann) Chester strain DSM 31019, *Bacillus licheniformis* (Weigmann) Chester strain DSM 100653, *Bacillus licheniformis* (Weigmann) Chester strain DSM 100655, *Bacillus licheniformis* (Weigmann) Chester strain DSM 103059, *Bacillus licheniformis* (Weigmann) Chester strain NCIB 1525, 1229, *Bacillus licheniformis* (Weigmann) Chester strain NCIB 6816, Glaxo 417, *Bacillus licheniformis* (Weigmann) Chester strain NCIB 7224, Loos, *Bacillus licheniformis* (Weigmann) Chester strain NCIB 8536, P1, *Bacillus licheniformis* (Weigmann) Chester strain NCIB 8537, Ho, *Bacillus licheniformis* (Weigmann) Chester strain NCIB 9536, Gibson 1319, NRS 1553, *Bacillus licheniformis* (Weigmann) Chester strain NCIB 9667, 1, *Bacillus licheniformis* (Weigmann) Chester strain NCIB 9668, 2, *Bacillus licheniformis* (Weigmann) Chester strain NCIB 9669, 3, *Bacillus licheniformis* (Weigmann) Chester strain NCIB 10689, *Bacillus licheniformis* (Weigmann) Chester strain NCIB 11143, *Bacillus licheniformis* (Weigmann) Chester strain NCIB 11643, YNS7712R, *Bacillus licheniformis* (Weigmann) Chester strain NCIB 13497, *Bacillus licheniformis* (Weigmann) Chester strain NCIB 14014, DA33, *Bacillus licheniformis* B1 (NRRL Deposit Number B-50907), *Bacillus subtilis* B2 (Deposit Number B-50908), *Bacillus licheniformis* RW25 (NRRL Deposit Number B-50911), *Bacillus licheniformis* RW32 (NRRL Deposit Number B-50912), and *Bacillus licheniformis* RW41 (NRRL Deposit Number B-50913), *Bacillus* lichemformis BL21 (NRRL B-50134), *Bacillus* lichemformis 3-12a (NRRL B-50504), *Bacillus licheniformis* 4-2a (NRRL B-50506), *Bacillus licheniformis* 842 (NRRL B-50516), *Bacillus* lichemformis DSM 5749 (BioPlus® 2B, Chr. Hansen Bio Systems), and *Bacillus licheniformis* OBT618 (ATCC PTA-122188, Osprey Biotechnics).

*Bacillus subtilis* Strains

*Bacillus subtilis* (Ehrenberg) Cohn ATCC®82™ strain AMC, ATCC 8037, NRS 315, *Bacillus subtilis* (Ehrenberg) Cohn ATCC©82D-5™ strain designation: Genomic DNA from *Bacillus subtilis* strain AMC [ATCC® 82™], *Bacillus subtilis* (Ehrenberg) Cohn ATCC®465™ strain NRS 743, *Bacillus subtilis* (Ehrenberg) Cohn ATCC®4529™ strain 3, ATCC 8013, NCTC 2588, NRS 1004 deposited with ATCC as *Bacillus* vulgatus by Trevisan, *Bacillus subtilis* (Ehrenberg) Cohn ATCC®4925™ strain NRS 740 deposited with ATCC as *Bacillus* nigrificans by Fabian and Nienhuis, *Bacillus subtilis* (Ehrenberg) Cohn ATCC®4944™ strain NCTC, NRS 1106 deposited with ATCC as *Bacillus parvus*, *Bacillus subtilis* subspecies *subtilis* (Ehrenberg) Cohn ATCC® 6051™ strain Marburg strain, ATCC 6051-U, CCM 2216, CCRC 10255, CCUG 163B, CFBP 4228, CIP 52.65, DSM 10, IAM 12118, IFO 12210, IFO 13719, IFO 16412, IMET 10758, JCM 1465, LMG 7135, NCAIM B.01095, NCCB 32009, NCCB 53016, NCCB 70064, NCFB 1769, NCIB 3610, NCTC 3610, NRRL B-4219, NRS 1315, NRS 744, VKM B-501, NBRC 13719 deposited with ATCC as *Bacillus subtilis* (Ehrenberg) Cohn, *Bacillus subtilis* (Ehrenberg) Cohn ATCC®6051a™ strain P31K6, *Bacillus subtilis* bacteriophage phi-e ATCC®6051-B1™ strain Phi-e deposited with ATCC as phi e, *Bacillus subtilis* (Ehrenberg) Cohn ATCC©6460™ strain NRS 259 deposited with ATCC as *Bacillus aterrimus* by Lehmann and Neumann, *Bacillus subtilis* (Ehrenberg) Cohn ATCC©6461™ strain NRS 275, CN 2192, NCIB 8055 deposited with ATCC as *Bacillus aterrimus* by Lehmann and Neumann, *Bacillus subtilis* subspecies *spizizenii* Nakamura et al. ATCC® 6633™ strain NRS 231, DSM 347, CCM 1999, IAM 1069, NCIB 8054, NCTC 10400, WDCM 00003 deposited with ATCC as *Bacillus subtilis* (Ehrenberg) Cohn, *Bacillus subtilis* subspecies *spizizenii* Nakamura et al. ATCC® 6633D-5™ strain designation: Genomic DNA from *Bacillus subtilis* subspecies *spizizenii* strain NRS 231 [ATCC®6633™] deposited with ATCC as *Bacillus subtilis* (Ehrenberg) Cohn, *Bacillus subtilis* subspecies *spizizenii* Nakamura et al. ATCC® CRM-6633™ strain NRS 231 deposited with ATCC as *Bacillus subtilis* (Ehrenberg) Cohn, *Bacillus subtilis* subspecies *spizizenii* Nakamura et al. ATCC® 6633-MINI-PACK™ strain NRS 231 deposited with ATCC as *Bacillus subtilis* (Ehrenberg) Cohn, *Bacillus subtilis* (Ehrenberg) Cohn ATCC©6984™ strain NRS 747 deposited with ATCC as *Bacillus vulgatus* subspecies *hydrolyticus*, *Bacillus subtilis* (Ehrenberg) Cohn ATCC®7003™ strain NRS 730, *Bacillus subtilis* (Ehrenberg) Cohn ATCC®7058™ strain NRS 351, *Bacillus subtilis* (Ehrenberg) Cohn ATCC®7059™ strain NRS 352, *Bacillus subtilis* (Ehrenberg) Cohn ATCC®7060™ strain NRS 659, *Bacillus subtilis* (Ehrenberg) Cohn ATCC®7067™ strain NRS 238, ATCC 7974, ATCC 8012, *Bacillus subtilis* (Ehrenberg) Cohn ATCC®7480™ strain NRS 1107 deposited with ATCC as *Bacillus endoparasiticus* by (Benedek) Benedek, *Bacillus subtilis* (Ehrenberg) Cohn ATCC®8188™ strain ATCC 8450, NRS 773 deposited with ATCC as Tyrothrix minimus, *Bacillus subtilis* (Ehrenberg) Cohn ATCC®8473™ strain NRS 762, *Bacillus subtilis* (Ehrenberg) Cohn ATCC®9466™ strain designation: FDA strain PCI 220 [BUCSAV 170, NCIB 8159, NRRL B-558, NRS 1088], *Bacillus subtilis* (Ehrenberg) Cohn ATCC®9524™ strain 3R9675, NRS 1109, *Bacillus subtilis* (Ehrenberg) Cohn ATCC®9799™ strain NCTC 6276, NRS 1125, *Bacillus subtilis* (Ehrenberg) Cohn ATCC®9858™ strain NRS 237, NCIB 8063, *Bacillus subtilis* (Ehrenberg) Cohn ATCC®9943™ strain NRS 979, *Bacillus subtilis* (Ehrenberg) Cohn ATCC®10774™ strain BU169, NCIB 8872, *Bacillus subtilis* (Ehrenberg) Cohn ATCC®10783™ strain NRRL B-543, *Bacillus subtilis* (Ehrenberg) Cohn ATCC®11774™ strain NCTC 8236, DSM 2109, *Bacillus subtilis* (Ehrenberg) Cohn ATCC®11838™ strain AMC 46-A-6 (strain I), NCIB 8850, *Bacillus subtilis* (Ehrenberg) Cohn ATCC®12100™ strain NCA 1558, ND 957, *Bacillus subtilis* (Ehrenberg) Cohn ATCC®12432™ strain MB 32, 56R188, ATCC 13597, NCIB 8993, *Bacillus subtilis* (Ehrenberg) Cohn ATCC®12695™ strain 51-52, *Bacillus subtilis* (Ehrenberg) Cohn ATCC®12711™ strain PRL B92, Ra, *Bacillus subtilis* (Ehrenberg) Cohn ATCC®13542™, *Bacillus subtilis* (Ehrenberg) Cohn ATCC®13933™ strain NRRL B-1471, *Bacillus subtilis* (Ehrenberg) Cohn ATCC®13952™ strain 1346, *Bacillus subtilis* (Ehrenberg) Cohn ATCC®14410™ strain 625, NRS 1115 deposited with ATCC as *Bacillus borborokoites* by ZoBell and Upham, *Bacillus subtilis* (Ehrenberg) Cohn ATCC©14415™ strain 569, NRS 1120 deposited with ATCC as *Bacillus submarinus* by ZoBell and Upham, *Bacillus subtilis* (Ehrenberg) Cohn ATCC®14416™ strain 576, NRS 1121 deposited with ATCC as *Bacillus thalassokoites* by ZoBell and Upham, *Bacillus subtilis* (Ehrenberg) Cohn ATCC®14593™ strain IAM 1145, *Bacillus subtilis* (Ehrenberg) Cohn ATCC®14617™ strain A-1625, *Bacillus subtilis* (Ehrenberg) Cohn ATCC©14660™ strain C30-1, *Bacillus subtilis* (Ehrenberg) Cohn ATCC®14662™ strain C30-109, *Bacillus subtilis* (Ehrenberg) Cohn ATCC®14807™ strain MB-155, *Bacillus subtilis* (Ehrenberg) Cohn ATCC®15040™ strain SX-67, *Bacillus subtilis* (Ehrenberg) Cohn ATCC®15041™ strain SX-92, *Bacillus subtilis* (Ehrenberg) Cohn ATCC®15134™ deposited with ATCC as *Bacillus uniflagellatus* by Mann, *Bacillus subtilis* (Ehrenberg) Cohn ATCC®15183™ strain 309, *Bacillus subtilis* (Ehrenberg) Cohn ATCC®15244™ strain 3369, *Bacillus subtilis* (Ehrenberg) Cohn ATCC®15245™ strain 3349, IAM 1-3 deposited with ATCC as *Bacillus natto* by Sawamura, *Bacillus subtilis* (Ehrenberg) Cohn ATCC®15476™ strain M-4-45, *Bacillus subtilis* (Ehrenberg) Cohn ATCC®15477™ strain M-24-1 deposited with ATCC as *Bacillus pumilus* by Meyer and Gottheil, *Bacillus subtilis* (Ehrenberg) Cohn ATCC©15561™ strain K-X-1, A-1, *Bacillus subtilis* (Ehrenberg) Cohn ATCC®15563™ strain Marburg, *Bacillus subtilis* bacteriophage SP8 ATCC®15563-B1™ strain SP8 deposited with ATCC as SP8 bacteriophage, *Bacillus subtilis* (Ehrenberg) Cohn ATCC®15575™ strain SB 19, *Bacillus subtilis* (Ehrenberg) Cohn ATCC®15811™ strain 5380, *Bacillus subtilis* (Ehrenberg) Cohn ATCC®15818™ strain RIA 445, *Bacillus subtilis* (Ehrenberg) Cohn ATCC®15819™ strain RIA 447, *Bacillus subtilis* (Ehrenberg) Cohn ATCC®15841™, *Bacillus subtilis* bacteriophage S-a ATCC®15841-B1™ strain S-a deposited with ATCC as S-a bacteriophage, *Bacillus subtilis* (Ehrenberg) Cohn ATCC®19659™ strain PRD 66, IFO 13722, *Bacillus subtilis* (Ehrenberg) Cohn ATCC®19659-MINI-PACK™ strain PRD 66, IFO 13722, *Bacillus subtilis* (Ehrenberg) Cohn ATCC®21008™ strain 182-H-86 deposited with ATCC as *Bacillus pumilus* by Meyer and Gottheil, *Bacillus subtilis* (Ehrenberg) Cohn ATCC®21183™ strain 5221, *Bacillus subtilis* (Ehrenberg) Cohn ATCC®21228™ strain SC 8548, SO-4, DSM 1970, *Bacillus subtilis* (Ehrenberg) Cohn ATCC©21331™ strain IFO 35, *Bacillus subtilis* (Ehrenberg) Cohn ATCC®21332™ strain IAM 1213, *Bacillus subtilis* (Ehrenberg) Cohn ATCC®21394™ strain 4-3-Ky, DSM 1971 deposited with ATCC as *Bacillus subtilis* subspecies *sakainensis*, *Bacillus subtilis* (Ehrenberg) Cohn ATCC®21555™ strain Y 13, *Bacillus subtilis* (Ehrenberg) Cohn ATCC®21556™, *Bacillus subtilis* (Ehrenberg) Cohn ATCC®21742™ strain AHr-5, *Bacillus subtilis* (Ehrenberg) Cohn ATCC©21770™ strain SP-3 deposited with ATCC as *Bacillus cereus* by Frankland and Frankland, *Bacillus subtilis* (Ehrenberg) Cohn ATCC®21951™ strain 716, IFO 13322 deposited with ATCC as *Bacillus pumilus* by Meyer and Gottheil, *Bacillus subtilis* (Ehrenberg) Cohn ATCC®23059™ strain W23, *Bacillus subtilis* (Ehrenberg) Cohn ATCC©23856™ strain EMG 50, SB19, *Bacillus subtilis* (Ehrenberg) Cohn ATCC®23857™ strain 168, *Bacillus subtilis* (Ehrenberg) Cohn ATCC®23857D-5™ strain Designation: Genomic DNA from *Bacillus subtilis* strain 168 [ATCC® 23857™]*Bacillus subtilis* (Ehrenberg) Cohn ATCC®23858™ strain EMG 52, *Bacillus subtilis* (Ehrenberg) Cohn ATCC®23859™ strain EMG 53, *Bacillus subtilis* (Ehrenberg) Cohn ATCC®25369™ strain 24028 deposited with ATCC as *Bacillus pulvifaciens* by Nakamura, *Bacillus subtilis* (Ehrenberg) Cohn ATCC®27328™ strain C, *Bacillus subtilis* (Ehrenberg) Cohn ATCC©27370™ strain 168 M, *Bacillus subtilis* bacteriophage SPO1 ATCC®27370-B1™ strain SPO1 deposited with ATCC as SPO1, *Bacillus subtilis* (Ehrenberg) Cohn ATCC®27505™ strain K49, HER 1346 deposited with ATCC as *Bacillus subtilis* subspecies *amyloliquefaciens*, *Bacillus subtilis* (Ehrenberg) Cohn ATCC©27689™ strain SB168 (trp-), *Bacillus subtilis* (Ehrenberg) Cohn ATCC®29056™ strain SB100, *Bacillus subtilis* (Ehrenberg) Cohn ATCC®29233™ strain X6, *Bacillus subtilis* (Ehrenberg) Cohn ATCC®31002™ strain Ahr.AUr-9, FERM-1998, *Bacillus subtilis* (Ehrenberg) Cohn ATCC®31028™ strain FD 6404 deposited with ATCC as *Bacillus globigii* by Migula, *Bacillus subtilis* (Ehrenberg) Cohn ATCC®31091™ strain 1054, IFO 13586, *Bacillus subtilis* (Ehrenberg) Cohn ATCC®31094™ strain 1097, IFO 13621, *Bacillus subtilis* (Ehrenberg) Cohn ATCC®31098™ strain 1027, IFO 13585 deposited with ATCC as *Bacillus pumilus* by Meyer and Gottheil, *Bacillus subtilis* subspecies *subtilis* (Ehrenberg) Nakamura et al. ATCC®31578™ strain DSM 6223, RUB 331, *Bacillus subtilis* (Ehrenberg) Cohn ATCC®31954™ strain MO7S-16/11, *Bacillus subtilis* (Ehrenberg) Cohn ATCC®33234™ strain NCIB 10106, *Bacillus subtilis* (Ehrenberg) Cohn ATCC®35021™ strain 5230, NRS 6, *Bacillus subtilis* (Ehrenberg) Cohn ATCC®35854™ strain NRRL B-3411, *Bacillus subtilis* (Ehrenberg) Cohn ATCC®35946™ strain OSU 75, *Bacillus subtilis* subspecies *subtilis* (Ehrenberg) Nakamura et al. ATCC®37014™ strain DSM 6224, BD170, pSA2100, *Bacillus subtilis* subspecies *subtilis* (Ehrenberg) Nakamura et al. ATCC®37015™ strain DSM 4514, BD170, NCIB 11624, pUB110, *Bacillus subtilis* subspecies *subtilis* (Ehrenberg) Nakamura et al. ATCC®37108™ strain DSM 4873, BGSC 1E32, BR151, pPL608, *Bacillus subtilis* subspecies *subtilis* (Ehrenberg) Nakamura et al. ATCC®37128™ strain DSM 4554, BGSC 1E18, pE194, *Bacillus subtilis* subspecies *subtilis* (Ehrenberg) Nakamura et al. ATCC®39090™ strain DSM 6198, BGSC 1S53, *Bacillus subtilis* (Ehrenberg) Cohn ATCC©39320™ strain MB 4488, *Bacillus subtilis* (Ehrenberg) Cohn ATCC®39374™ strain MB 3575, *Bacillus subtilis* (Ehrenberg) Cohn ATCC®39706™ strain B1-20, *Bacillus subtilis* (Ehrenberg) Cohn ATCC®43223™ strain ABM261, *Bacillus subtilis* (Ehrenberg) Cohn ATCC®49343™ strain IMVS 0101, *Bacillus subtilis* (Ehrenberg) Cohn ATCC©49760™ deposited with ATCC as *Bacillus globigii* by Migula, *Bacillus subtilis* (Ehrenberg) Cohn ATCC®49822™ deposited with ATCC as *Bacillus globigii* by Migula, *Bacillus subtilis* (Ehrenberg) Cohn ATCC®55033™ strain SMS274, *Bacillus subtilis* (Ehrenberg) Cohn ATCC®55060™ strain MB 4974, *Bacillus subtilis* (Ehrenberg) Cohn ATCC®55405™ strain 300, *Bacillus subtilis* subspecies *inaquosorum* ATCC®55406™ strain DA33 deposited with ATCC as *Bacillus licheniformis* (Weigmann) Chester, *Bacillus subtilis* (Ehrenberg) Cohn ATCC®55422™ strain SC 15257, *Bacillus subtilis* (Ehrenberg) Cohn ATCC®55614™ strain 1.2, AQ153, *Bacillus subtilis* (Ehrenberg) Cohn ATCC®55675™ strain BPO1, *Bacillus subtilis* subspecies *subtilis* (Ehrenberg) Nakamura et al. strain DSM 402, BRC 111470, NCIB 10106, *Bacillus subtilis* subspecies *spizizenii* Nakamura et al. strain DSM 618, *Bacillus subtilis* subspecies *spizizenii* Nakamura et al. strain DSM 1087, *Bacillus subtilis* (Ehrenberg) Cohn strain DSM 1088, IFO 13169, NBRC 13169, OUT 8353, *Bacillus subtilis* (Ehrenberg) Cohn strain DSM 1089, IFO 3026, NBRC 3026, OUT 8350, *Bacillus subtilis* subspecies *subtilis* (Ehrenberg) Nakamura et al. strain DSM 1090, OUT 8424, *Bacillus subtilis* subspecies *subtilis* (Ehrenberg) Nakamura et al. strain DSM 1091, OUT 8425, *Bacillus subtilis* (Ehrenberg) Cohn strain DSM 1092, IFO 3009, NBRC 3009, OUT 8235, *Bacillus subtilis* subspecies *subtilis* (Ehrenberg) Nakamura et al. strain DSM 3256, IAM 1213, *Bacillus subtilis* subspecies *subtilis* (Ehrenberg) Nakamura et al. strain DSM 3257, IAM 1259, *Bacillus subtilis* (Ehrenberg) Cohn strain DSM 3258, IAM 1260, *Bacillus subtilis* (Ehrenberg) Cohn strain DSM 4181, NCA 72-52, SA 22, *Bacillus subtilis* subspecies *subtilis* (Ehrenberg) Nakamura et al. strain DSM 4393, pC194, SB202, *Bacillus subtilis* (Ehrenberg) Cohn strain DSM 4449, natto 3335 UM4, *Bacillus subtilis* (Ehrenberg) Cohn strain DSM 4450, natto 3335 UM8, pLS20, pBC16, *Bacillus subtilis* (Ehrenberg) Cohn strain DSM 4451 *Bacillus subtilis* (Ehrenberg) Cohn strain DSM 4515, DB163, pGR71, *Bacillus subtilis* (Ehrenberg) Cohn strain DSM 4608, BR157, pMW1, *Bacillus subtilis* subspecies *subtilis* (Ehrenberg) Nakamura et al. strain DSM 4750, 1E7, BGSC 1E7, pE194-cop6, *Bacillus subtilis* subspecies *subtilis* (Ehrenberg) Nakamura et al. strain DSM 4751, 1E34, BGSC 1E34, pAM77, *Bacillus subtilis* subspecies *subtilis* (Ehrenberg) Nakamura et al. strain DSM 4871, BD426, BGSC 1E21, pBD8, *Bacillus subtilis* subspecies *subtilis* (Ehrenberg) Nakamura et al. strain DSM 4872, BD466, BGSC 1E24, pBD10, *Bacillus subtilis* subspecies *subtilis* (Ehrenberg) Nakamura et al. strain DSM 4874, BGSC 1E38, pMK3, YB886, *Bacillus subtilis* subspecies *subtilis* (Ehrenberg) Nakamura et al. strain DSM 5213, BGSC 1A40, BR 151, *Bacillus subtilis* subspecies *subtilis* (Ehrenberg) Nakamura et al. strain DSM 5214, BD 393, BGSC 1A511, *Bacillus subtilis* subspecies *subtilis* (Ehrenberg) Nakamura et al. strain DSM 5545, BGSC 1A459/SU+ III, *Bacillus subtilis* subspecies *subtilis* (Ehrenberg) Nakamura et al. strain DSM 5547, *Bacillus subtilis* (Ehrenberg) Cohn strain DSM 5552, *Bacillus subtilis* (Ehrenberg) Cohn strain DSM 5611, NRRL B-360, *Bacillus subtilis* subspecies *subtilis* (Ehrenberg) Nakamura et al. strain DSM 5660, NRRL B-362, *Bacillus subtilis* subspecies *spizizenii* Nakamura et al. strain DSM 6395, BGSC 2A2, W23 2A2, WB 672, *Bacillus subtilis* (Ehrenberg) Cohn strain DSM 6397, BGSC 1A2, SB 491, *Bacillus subtilis* subspecies *spizizenii* Nakamura et al. strain DSM 6399, BGSC 2A1, SB 623 *Bacillus subtilis* subspecies *spizizenii* Nakamura et al. strain DSM 6405, BGSC 2A3, W23 SR, *Bacillus subtilis* subspecies *subtilis* (Ehrenberg) Nakamura et al. strain DSM 6887, BGSC 1A309, NP40, *Bacillus subtilis* subspecies *subtilis* (Ehrenberg) Nakamura et al. strain DSM 6889, 1A658, BGSC 1A658, DA 65 *Bacillus subtilis* subspecies *spizizenii* Nakamura et al. strain DSM 8439, CCM 2268, IAM 12021, *Bacillus subtilis* (Ehrenberg) Cohn strain DSM 13019, SSI MK1, *Bacillus subtilis* subspecies *spizizenii* Nakamura et al. strain DSM 15029, NRRL B-23049, *Bacillus subtilis* subspecies *inaquosorum* Rooney et al. strain DSM 21200, *Bacillus subtilis* (Ehrenberg) Cohn strain DSM 21393, *Bacillus subtilis* subspecies *inaquosorum* Rooney et al. strain DSM 22148, KCTC 13429, *Bacillus subtilis* (Ehrenberg) Cohn strain DSM 23521, *Bacillus subtilis* (Ehrenberg) Cohn strain DSM 23778, *Bacillus subtilis* (Ehrenberg) Cohn strain DSM 25152, *Bacillus subtilis* (Ehrenberg) Cohn strain DSM 28592, *Bacillus subtilis* (Ehrenberg) Cohn strain DSM 30512, *Bacillus subtilis* (Ehrenberg) Cohn strain DSM 30529, *Bacillus subtilis* (Ehrenberg) Cohn strain DSM 30533, *Bacillus subtilis* (Ehrenberg) Cohn strain DSM 30534, *Bacillus subtilis* (Ehrenberg) Cohn strain DSM 30540, *Bacillus subtilis* (Ehrenberg) Cohn strain DSM 30541, *Bacillus subtilis* (Ehrenberg) Cohn strain DSM 30551, *Bacillus subtilis* (Ehrenberg) Cohn strain DSM 30558, *Bacillus subtilis* (Ehrenberg) Cohn strain DSM 30562, *Bacillus subtilis* (Ehrenberg) Cohn strain DSM 30570, *Bacillus subtilis* (Ehrenberg) Cohn strain DSM 30581, *Bacillus subtilis* (Ehrenberg) Cohn strain DSM 30597, *Bacillus subtilis* (Ehrenberg) Cohn strain DSM 30642, *Bacillus subtilis* (Ehrenberg) Cohn strain DSM 30651, *Bacillus subtilis* (Ehrenberg) Cohn strain DSM 30652, *Bacillus subtilis* (Ehrenberg) Cohn strain DSM 30671, *Bacillus subtilis* (Ehrenberg) Cohn strain DSM 30676, *Bacillus subtilis* (Ehrenberg) Cohn strain DSM 30677, *Bacillus subtilis* (Ehrenberg) Cohn strain DSM 30682, *Bacillus subtilis* (Ehrenberg) Cohn strain DSM 30711, *Bacillus subtilis* (Ehrenberg) Cohn strain DSM 30723, *Bacillus subtilis* (Ehrenberg) Cohn strain DSM 30801, *Bacillus subtilis* (Ehrenberg) Cohn strain DSM 30924, *Bacillus subtilis* (Ehrenberg) Cohn strain DSM 30925, *Bacillus subtilis* (Ehrenberg) Cohn strain DSM 30927, *Bacillus subtilis* (Ehrenberg) Cohn strain DSM 30928, *Bacillus subtilis* (Ehrenberg) Cohn strain DSM 30929, *Bacillus subtilis* (Ehrenberg) Cohn strain DSM 30941, D1, *Bacillus subtilis* (Ehrenberg) Cohn strain DSM 30942, D-FC1, *Bacillus subtilis* (Ehrenberg) Cohn strain DSM 31008, *Bacillus subtilis* (Ehrenberg) Cohn strain DSM 31009, *Bacillus subtilis* (Ehrenberg) Cohn strain DSM 31010, *Bacillus subtilis* (Ehrenberg) Cohn strain DSM 31020, *Bacillus subtilis* (Ehrenberg) Cohn strain DSM 31021, *Bacillus subtilis* (Ehrenberg) Cohn strain DSM 31033, *Bacillus subtilis* (Ehrenberg) Cohn strain DSM 100605, *Bacillus subtilis* (Ehrenberg) Cohn strain DSM 100612, *Bacillus subtilis* (Ehrenberg) Cohn strain DSM 100613, *Bacillus subtilis* (Ehrenberg) Cohn strain DSM 100614, *Bacillus subtilis* (Ehrenberg) Cohn strain DSM 103044, *Bacillus subtilis* (Ehrenberg) Cohn strain DSM 103047, *Bacillus subtilis* (Ehrenberg) Cohn strain DSM 103051, *Bacillus subtilis* (Ehrenberg) Cohn strain DSM 103758, *Bacillus subtilis* AM0904 (NRRL Deposit Number B-50914), *Bacillus subtilis* AM0911 (NRRL Deposit Number B-50915), *Bacillus subtilis* NP122 (NRRL Deposit Number B-50910), *Bacillus subtilis* NP119B (NRRL Deposit Number B-50909), *Bacillus subtilis* BS18 (NRRL B-50633), *Bacillus subtilis* BS278 (NRRL 50634), *Bacillus subtilis* 4-7d (NRRL B-50505), *Bacillus subtilis* 3-5h (NRRL B-50507), *Bacillus subtilis* AGTP BS3BP5 (NRRL B-50510), *Bacillus subtilis* BS918 (NRRL B-50508), *Bacillus subtilis* AGTP BS1013 (NRRL-50509), *Bacillus subtilis* AGTP 944 (NRRL B-50548), *Bacillus subtilis* AGTP BS442 (NRRL B-50542), *Bacillus subtilis* AGTP BS1069 (NRRL B-50544), *Bacillus subtilis* AGTP BS521 (NRRL B-50545), *Bacillus subtilis* B27 (NRRL B-50105), *Bacillus subtilis* 3A-P4 (PTA-6506), *Bacillus subtilis* 22C-P1 (PTA-6508), *Bacillus subtilis* BL21 (NRRL B-50134), *Bacillus subtilis* strain GB03, *Bacillus subtilis* strain QST713, *Bacillus subtilis* DSM 5750 (BioPlus® 2B, Chr. Hansen Bio Systems), *Bacillus subtilis* strain OBT 1224 (Osprey Biotechnic).

*Bacillus amyloliquefaciens* Strains

*Bacillus amyloliquefaciens* (Fukumoto) Priest et al. (ATCC® 23350™), *Bacillus amyloliquefaciens* (Fukumoto) Priest et al. (ATCC® 23842™), *Bacillus amyloliquefaciens* SB 3296 (PTA-7548), *Bacillus amyloliquefaciens* (Fukumoto) Priest et al. (ATCC® 23843™), *Bacillus amyloliquefaciens* SB3297 (PTA-7549), *Bacillus amyloliquefaciens* (Fukumoto) Priest et al. (ATCC® BAA-390™), *Bacillus amyloliquefaciens* (Fukumoto) Priest et al. (ATCC® 23845™) *Bacillus amyloliquefaciens* (Fukumoto) Priest et al. (ATCC® 23844™), *Bacillus amyloliquefaciens* (Fukumoto) Priest et al. (ATCC® 31592™), *Bacillus amyloliquefaciens* (Fukumoto) Priest et al. (ATCC® 53495™), *Bacillus amyloliquefaciens* (Fukumoto) Priest et al. (ATCC® 49763™) *Bacillus amyloliquefaciens*: SB 3276 (PTA-7541), *Bacillus amyloliquefaciens*: PMBP-M7 (vial labeled BCRC PMBP-M7) (PTA-5819), *Bacillus amyloliquefaciens* SB 3284 (PTA-7545), *Bacillus amyloliquefaciens* SB 3288 (PTA-7546), *Bacillus amyloliquefaciens* MF215 (SB3446) (PTA-7790), *Bacillus amyloliquefaciens* SB 3283 (PTA-7544), *Bacillus amyloliquefaciens* MF 225 (SB 3448) (PTA-7791), *Bacillus* sp. (ATCC® 70038™, Deposited As *Bacillus amyloliquefaciens* (Fukumoto) Priest et al.), *Bacillus amyloliquefaciens* TOA5001 (NITE Patent Microorganisms Depositary Accession Number BP-01844).

III. Amounts of *Bacillus coagulans*, *Bacillus subtilis*, *Bacillus licheniformis* and/or *Bacillus amyloliquefaciens* in Bacilli Combinations The relative amounts of *Bacillus coagulans*, *Bacillus subtilis*, *Bacillus licheniformis* and/or *Bacillus amyloliquefaciens* present in the Bacilli combination are selected to obtain a desired result. For certain embodiments, the Bacilli combination comprises from about $10^5$ to about $10^{12}$ CFU/gram, and more typically from about $10^5$ to $10^{10}$ or from $10^8$ to $10^{10}$ CFU/gram of each of the *Bacillus* species in the Bacilli combination. In certain embodiments, the *Bacillus* combination is added to feed in an amount sufficient to provide from $5 \times 10^5$ to $8 \times 10^5$ CFU/gram of the feed/*Bacillus* combination. And in particular embodiments, 0.25 pounds/ton of feed is sufficient to provide $5 \times 10^5$ to $8 \times 10^5$ CFU/gram.

In some embodiments, the Bacilli combination may be administered to provide different CFU ratios of the *Bacillus* species included therein. In some embodiments, the ratio of *Bacillus subtilis:Bacillus licheniformis* in the Bacilli combination may be from 2:1 to 1:2, and typically is about 1:1, relative to each other. And with respect to other *Bacillus* species in the Bacilli combination, the total amount of *Bacillus subtilis* and *Bacillus* lichemformis (BSBL) relative to the other *Bacillus* species may be from greater than zero to 99%, such as from 10% to 90%, from 15% to 85%, from 20% to 80%, from 25% to 75%, from 35% to 65%, from 45% to 55%, or substantially 50%, based on CFU.

In some embodiments, the ASL combination may comprise, consist essentially of, or consist of, in amounts relative to each other, from 25% or less to 75% or more *Bacillus amyloliquefaciens* (BA) and from 75% or more to 25% or less BSBL. In certain embodiments, the ratio of BA to BSBL in the ASL combination is from 25%:75% BA:BSBL to 75%:25% BA:BSBL, and may be about 50%:50% BA:BSBL.

In some embodiments, the ASLC combination may comprise, consist essentially of, or consist of, in amounts relative to each other, from 25% or less to 75% or more in total of *Bacillus amyloliquefaciens* (BA) and *Bacillus coagulans* (BC), and from 75% or more to 25% or less BSBL. In certain embodiments, the ratio of BA+BC to BSBL in the ASL combination is from 25%:75% BA+BC:BSBL to 75%:25% BA+BC:BSBL, and may be about 50%:50% BA+BC:BSBL. The amounts of BA and BC, relative to each other may be from greater than zero to 99% BA relative to BC, such as from 10% to 90%, from 15% to 85%, from 20% to 80%, from 25% to 75%, from 35% to 65%, from 45% to 55%, or substantially 50% BA relative to BC, based on CFU.

For example, the CSL combination may comprise from $3.5 \times 10^9$ to $10 \times 10^9$ CFU *Bacillus coagulans* per gram of the CSL combination, such as from $4.1 \times 10^9$ to $7.5 \times 10^9$, from $5 \times 10^9$ to $6.4 \times 10^9$ or from $5 \times 10^9$ to $6 \times 10^9$ CFU *Bacillus coagulans*/gram. The CSL combination may comprise from $5 \times 10^8$ to $10 \times 10^8$ CFU *Bacillus subtilis* per gram of the CSL combination, such as from $6 \times 10^8$ to $8.7 \times 10^8$, from $6.9 \times 10^8$ to $9 \times 10^8$, or $7.2 \times 10^8$ to $8 \times 10^8$ CFU *Bacillus subtilis*/per gram. And the CSL combination may comprise from $5 \times 10^8$ to $10 \times 10^8$ CFU *Bacillus licheniformis* per gram of the CSL combination, such as from $6\times10^8$ to $8.7\times10^8$, from $6.9\times10^8$ to $9\times10^8$, or $7.2\times10^8$ to $8\times10^8$ CFU *Bacillus* lichemformis per gram.

In certain embodiments, the CSL combination may be administered to provide different CFU ratios of the three *Bacillus* species. For example, in one embodiment, the CSL combination ratio provides from about 6 parts to about 10 parts *Bacillus coagulans* to 1 part to 2 parts *Bacillus subtilis*, and from about 1 part to about 2 parts *Bacillus licheniformis*. The ratio of *Bacillus subtilis*:*Bacillus licheniformis* in the CSL combination may be from 2:1 to 1:2, and typically is about 1:1. In certain embodiments, the CSL combination comprises about $5\times10^9$ *Bacillus coagulans*, about $8\times10^8$ *Bacillus subtilis*, and $8\times10^8$ *Bacillus licheniformis* per gram of the CSL combination.

In other embodiments, the *Bacillus* combination comprises, consists essentially of, or consists of, *Bacillus subtilis, Bacillus licheniformis, Bacillus amyloliquefaciens* and *Bacillus coagulans*. The relative amounts of the *Bacillus* species in such embodiments are from 25% to 50% *Bacillus subtilis*, from 30% to 65% *Bacillus* lichemformis, from 5% to 30% *Bacillus amyloliquefaciens* and from greater than zero to 15% *Bacillus coagulans*, in amounts relative to each other, such as from 30% to 45% *Bacillus subtilis*, from 40% to 60% *Bacillus licheniformis*, from 10% to 25% *Bacillus amyloliquefaciens* and from 1% to 12% *Bacillus coagulans*. In certain embodiments, the *Bacillus* combination comprises, consists essentially of, or consists of, from 30% to 40% *Bacillus subtilis*, from 40% to 50% *Bacillus* lichemformis, from 10% to 20% *Bacillus amyloliquefaciens* and from 2% to 10% *Bacillus coagulans* in amounts relative to each other. In some embodiments, the amount of *Bacillus licheniformis* is greater than the amount of *Bacillus subtilis* in the *Bacillus* combination. In certain embodiments, such a composition can be a commercially available product, such as the composition sold as Provia Prime™ by Phibro Animal Health Corporation.

IV. Additional Component(s)

The Bacilli combination also can be administered in combination with one or more additional components or compositions. An additional component or composition may be any component or composition that can be administered to a subject, particularly an animal, such as an avian, including poultry, in combination with the Bacilli species in the Bacilli combination, such as *Bacillus coagulans, Bacillus subtilis* and *Bacillus licheniformis*, or *Bacillus amyloliquefaciens, Bacillus subtilis* and *Bacillus licheniformis* and optionally *Bacillus coagulans*. Certain disclosed Bacilli combinations are particularly formulated for administration to poultry, and therefore can comprise the Bacilli combination in combination with any other component or composition now known or hereafter developed for administration to poultry. Exemplary additional components include a carrier, a vitamin, a copper salt, a feed supplement, an additional DFM, a feed, such as a poultry feed, or a combination thereof. The additional component(s) will comprise from 1 wt % to 99 wt % and the Bacilli combination will comprise from 99 wt % to 1 wt % of the total weight of the combination. Preferably the additional component(s) will comprise from 10 wt % to 90 wt % and the Bacilli combination will comprise from 90 wt % to 10 wt % of the total weight of the combination. Yet even more preferably, the additional component(s) will comprise 20 wt % to 80 wt % and the Bacilli combination will comprise from 80 wt % to 20 wt % of the total weight of the combination. The Bacilli combination may be administered with the other component (s), optionally in a mixture with the other component(s), such as poultry feed and/or a feed supplement, in an amount sufficient to provide the desired amounts of the respective *Bacillus* species in the particular combination. For example for the CSL combination, the amount administered may be sufficient to provide from $0.5\times10^5$ to $2\times10^5$ CFU *Bacillus coagulans* per gram of the mixture, from $1.2\times10^5$ to $4\times10^5$ CFU *Bacillus subtilis* per gram of the mixture, and/or from $1.2\times10^5$ to $4\times10^5$ CFU *Bacillus licheniformis* per gram of the mixture. In some embodiments, the amount of *Bacillus coagulans* in the mixture is from $0.6\times10^5$ to $1.5\times10^5$ CFU, or from $0.9\times10^5$ to $1.2\times10^5$ CFU per gram of the mixture. Independently, the amount of each of the *Bacillus subtilis* and *Bacillus* lichemformis in the mixture may be from $1.5\times10^5$ to $3\times10^5$ or from $2.3\times10^5$ to $3\times10^5$ CFU per gram of the mixture. In certain embodiments, the CSL combination is administered with one or more additional components, such as feed and/or feed supplement, in an amount sufficient to provide $0.62\times10^5$, $0.93\times10^5$ or $1.2\times10^5$ CFU *Bacillus coagulans*, and independently $1.5\times10^5$, $2.3\times10^5$ or $3\times10^5$ CFU of each of the *Bacillus subtilis* and *Bacillus* lichemformis, per gram of the mixture. Exemplary additional components and/or compositions of a combination comprising the Bacilli combination are discussed in more detail below.

A. Carrier

In some embodiments, the Bacilli combination may be mixed with and/or dispersed in a carrier to form a dispersed composition. The carrier(s) may be selected to provide a non-biological benefit to the composition, compared to a Bacilli combination without a carrier, such as, but not limited to, achieving or improving a readily flowable state, and/or improving stability during storage and/or transport. Suitable carriers that may be used in combination with a Bacilli combination include, but are not limited to, plant material, such as beet pulp, ground corn, corn syrup solids, plant fiber, rice hulls, soluble plant fiber, wheat middlings, microcrystalline cellulose; carbonates, such as metal carbonates, such as calcium carbonate, potassium carbonate; sulfates, such as metal sulfates, such as potassium sulfate, sodium sulfate; lactates, including metal lactates, such as calcium lactate; oxides, including metal oxides, such as calcium oxide; propionates, including metal propionates, such as calcium propionate; stearates, including metal stearates, such as calcium stearate; phosphates, such as dicalcium phosphate dehydrate, monocalcium phosphate, sodium tripolyphosphate, or tetra sodium pyrophosphate; minerals, such as dolomite, silicon dioxide, silica, limestone, or vermiculite; clays, such as bentonite, montmorillonite, kaolin; sugars, such as glucose, sucrose, dextrose, fructose, or a combination thereof; maltodextrin; salt, such as sodium chloride; carrageenan; cellulose; guar gum; polyols; sodium alumino silicate; urea; animal protein products; forage products; grain products; plant protein products; processed grain products; roughage products; molasses products; or combinations thereof. In certain embodiments, the carrier is calcium carbonate.

Animal protein products may include, but are not limited to, blood meal; animal by-product meal; buttermilk, including condensed buttermilk and dried buttermilk; casein; dried hydrolyzed casein; cheese rind; crab meal; fish products, including fish by-products, fish liver and glandular meal, fish meal, fish protein concentrates, fish residue meal, and dried and/or condensed fish solubles; fleshings hydrolysate; hydrolyzed hair; hydrolyzed leather meal; hydrolyzed poultry by-product aggregate; hydrolyzed poultry feathers;

leather hydrolysate; meat and bone meal; meat and bone meal tankage; meat meal; meat meal tankage; dried meat solubles; dried lactalbumin; dried feed grade milk; dried milk protein; poultry by-products and/or by-products meal; poultry hatchery by-product; shrimp meal; skimmed milk, including condensed, condensed cultured, dried, or dried cultured skimmed milk; whey, including condensed, condensed cultured, condensed hydrolyzed, dried, or dried hydrolyzed whey; condensed and/or dried whey product; condensed and/or dried whey solubles; or a combination thereof.

Forage products may include, but are not limited to, alfalfa products, such as dehydrated meal, optionally in pellet form, ground hay, or suncured meal, optionally in pellet form; coastal bermudagrass hay; dehydrated corn plant; dehydrated silage; flax plant product; ground grass; *lespedeza* meal and/or stem meal; ground soybean hay; or combinations thereof.

Grain products may include, but are not limited to, barley, corn, grain sorghum, mixed feed oats, oats, triticale, wheat, ground brown rice, ground or ground paddy rough rice, broken or chipped rice, brewers rice, rye, or a combination thereof. The grain products may be in any suitable form, such as whole, ground, cracked, hulls, bran, screen cracked, flaked, kibbled, toasted, and/or heat processed.

Plant protein products may include, but are not limited to, dried beans; canola meal; coconut meal; cottonseed, such as flakes, cake, meal, low gossypol meal, and/or whole pressed cottonseed; guar meal; dried kelp; linseed meal; peanut meal; peas; potato protein; dried seaweed meal; safflower meal; soy protein concentrate; soybean feed; ground soybeans; soybean meal, optionally kibbled; heat processed soybeans; ground, extruded whole soybeans; soy flour; soy grits; sunflower meal, optionally dehulled; or a combination thereof.

The processed grain by-products may be aspirated grain fractions; brewers dried grains; buckwheat middlings; condensed distillers solubles; condensed fermented corn extracts; corn bran; corn flour; corn germ meal; corn gluten feed and/or meal; corn grits; distillers dried grains, optionally with solubles; distillers dried solubles, flour, grain sorghum germ cake, meal, grits, and/or mill feed; meal hominy feed; malt sprouts; oat groats; feeding oat meal; pearl barley by-product; peanut skins; rice bran; rice polishings; rye middlings; gelatinized or partially aspirated sorghum grain flour; wheat bran, flour, shorts, germ meal, defatted germ meal, middlings, mill run and/or red dog; or a combination thereof.

Roughage products may include, but are not limited to, almond hulls; dried apple pectin pulp; dried apple pomace; bagasse; barley hulls; barley mill by-product; dried, plain beet pulp; buckwheat hulls; dried citrus meal; dried citrus pulp; citrus seed meal; corn cob fractions; cottonseed hulls; flax straw by-product; ground corn cob; *psyllium* seed husk; malt hulls; clipped oat by-product; oat hulls; oat mill by-product; peanut hulls; rice hulls; rice mill by-product; rye mill run; soybean hulls, mill feed, and/or mill run; sunflower hulls; ground straw; dried tomato pomace; or a combination thereof.

Molasses products may be beet molasses; dried beet molasses product; dried beet pulp molasses; cane molasses; citrus molasses; molasses yeast condensed solubles; concentrated separator by-product; condensed molasses fermentation solubles; starch molasses; molasses distillers condensed solubles; molasses distillers dried solubles; or a combination thereof.

B. Copper Species

The disclosed combination may be mixed with a copper species such as a copper species that provides a copper ion. The copper species may be a copper salt. Exemplary copper species that may be combined with the Bacilli combination include, but are not limited to, copper chloride, copper bromide, copper iodide, copper sulfate, copper sulfite, copper bisulfite, copper thiosulfate, copper phosphate, monobasic copper phosphate, dibasic copper phosphate, copper hypophosphite, copper dihydrogen pyrophosphate, copper tetraborate, copper borate, copper carbonate, copper bicarbonate, copper metasilicate, copper citrate, copper malate, copper methionate, copper succinate, copper lactate, copper formate, copper acetate, copper butyrate, copper propionate, copper benzoate, copper tartrate, copper ascorbate, copper gluconate, or a combination thereof, preferably copper sulfate, copper acetate, copper citrate, copper methionate, or a combination thereof. A copper species, such as a copper salt, may be provided separately, or individually, or it may be provided as part of a composition, such as a feed or a feed supplement. Certain disclosed embodiments comprise, consist essentially of, or consist of *Bacillus coagulans, Bacillus subtilis, Bacillus licheniformis* and a copper species. Other particular embodiments, comprise, consist essentially of, or consist of *Bacillus amyloliquefaciens, Bacillus subtilis, Bacillus licheniformis* and a copper species. And other particular embodiments, comprise, consist essentially of, or consist of *Bacillus amyloliquefaciens, Bacillus subtilis, Bacillus licheniformis* and *Bacillus coagulans* and a copper species. In any embodiments, the copper species may be a copper salt, such as a salt that can provide a copper ion, for example, copper sulfate.

C. Vitamin(s)

Exemplary vitamins include, but are not limited to, one or more of Vitamin A, Vitamin B1 (thiamine), Vitamin B2 (riboflavin), Vitamin B3 (niacin or niacinamide), Vitamin B5 (pantothenic acid), Vitamin B6 (pyridoxine, pyridoxal, or pyridoxamine, or pyridoxine hydrochloride), Vitamin B7 (biotin), Vitamin B9 (including folic acid), Vitamin B12 (various cobalamins; commonly cyanocobalamin in vitamin supplements), Vitamin C (ascorbic acid or a salt thereof, such as sodium ascorbate or calcium sorbate), Vitamin D (vitamin $D_1$, vitamin $D_2$, vitamin $D_3$, vitamin $D_4$, vitamin $D_5$, 25-hydroxy vitamin $D_3$, 25-dihydroxy vitamin $D_3$, or combinations thereof), Vitamin E, Vitamin K (K1 and K2 (i.e. MK-4, MK-7)), and biotin, and derivatives, salts and/or analogs thereof.

D. Feed

The feed may be any feed suitable for administration to an animal. The Bacilli combination may be administered in combination with the feed, such as by forming a mixture of the Bacilli combination and the feed, or by administering the Bacilli combination and the feed sequentially, in any order. In certain disclosed embodiments the animal is a poultry, and the Bacilli combination is used in combination with, and may be admixed with, a poultry feed, such as a poultry basal diet. The feed may comprise corn, alfalfa, peas, soybean meal, soybean oil, wheat, oats, sorghum, barley, rye, rice hulls, canola, corn oil, limestone, salt (for example, sodium chloride), distillers dried grains with solubles (DDGS), dicalcium phosphate, sodium sesquicarbonate, methionine source, lysine source, L-threonine, mineral oil, biotin, folic acid, kelp, menadione dimethylpyrimidinol bisulfite, calcium aluminosilicate, or any combination thereof. The feed may also comprise one or more additional components. Additional components may be used for any desired purpose, such as a substantially biologically inert material added, for example, as a filler, or to provide a desired beneficial effect. For example, the feed may include a carbonate (including a metal carbonate such as calcium carbonate); a trace mineral, such as, but not limited to, chloride, fluoride, iodide, chromium, copper, zinc, iron, magnesium, manganese, molybdenum, phosphorus, potassium, sodium, sulfur, selenium, or a combination thereof; a bulking agent; a carrier; a colorant; a taste enhancer; a preservative; one or more vitamins; or a combination thereof. The preservative may be benzoic acid or a salt thereof, e.g. sodium benzoate; lactic acid or a salt thereof, e.g. sodium lactate, potassium lactate or calcium lactate; propionic acid or a salt thereof, e.g. sodium propionate; ascorbic acid or a salt thereof, e.g. sodium ascorbate; gallic acid or a salt thereof e.g. sodium gallate; sulfur dioxide and/or sulfites; nitrites; nitrates; choline, or a salt thereof, such as an anion salt of choline, e.g. choline halide, such as chloride, bromide, iodide, fluoride, or choline hydroxide; or any combination thereof. The one or more vitamins may include vitamin A; vitamin $B_1$, such as thiamine mononitrate; vitamin $B_2$, such as riboflavin-5-phosphate; vitamin $B_3$, such as niacin or niacinamide; vitamin $B_5$, such as pantothenic acid or d-calcium pantothenate; vitamin $B_6$, such as pyridoxine or pyridoxine hydrochloride; vitamin $B_{12}$; vitamin C, such as ascorbic acid, sodium ascorbate, or calcium sorbate; vitamin D; vitamin E; vitamin K, or a combination thereof. Vitamin D may comprise vitamin $D_1$, vitamin $D_2$, vitamin $D_3$, vitamin $D_4$, vitamin $D_5$, 25-hydroxy vitamin $D_3$, 25-dihydroxy vitamin $D_3$, or combinations thereof.

The feed, such as a poultry feed, may also include fats and/or oils, such as tallow, optionally derived from the rendering of beef offal; lard, optionally derived from the rendering of pork offal; poultry fat, optionally derived from poultry offal; feed grade animal fat, optionally derived from a mixture of rendered beef, pork, and/or poultry raw material; yellow grease, optionally derived from reprocessed restaurant grease and/or cooking oil; and/or blended animal-vegetable fat, which may include blends of different types and/or amounts of animal fats and vegetable oils from restaurant grease. Additionally, or alternatively, the feed may include protein sources, such as canola, fish meal, field peas, meat and bone meal, soybeans, and/or cereal by-products.

E. Feed Supplements

The Bacilli combination may be used in combination with one or more feed supplements. In some embodiments, the Bacilli combination is mixed with the feed supplement to form a mixture or composition comprising the Bacilli combination and the feed supplement(s). In other embodiments, the Bacilli combination is administered in combination with a feed supplement.

1. *Yucca* and/or *Quillaja*, or Extracts Thereof

Additionally, or alternatively, a disclosed Bacilli combination can be administered in combination with *yucca* and/or *quillaja* plant material, or extracts thereof. Examples of *yucca* include, but are not limited to, *Yucca aloifolia, Yucca angustissima, Yucca arkansana, Yucca baccata, Yucca baileyi, Yucca brevifolia, Yucca campestris, Yucca capensis, Yucca carnerosana, Yucca cernua, Yucca coahuilensis, Yucca constricta, Yucca decipiens, Yucca declinata, Yucca desmetiana, Yucca elata, Yucca endlichiana, Yucca faxoniana, Yucca filamentosa, Yucca filifera, Yucca flaccida, Yucca gigantean, Yucca glauca, Yucca gloriosa, Yucca grandiflora, Yucca harrimaniae, Yucca intermedia, Yucca jaliscensis, Yucca lacandonica, Yucca linearifolia, Yucca luminosa, Yucca madrensis, Yucca mixtecana, Yucca necopina, Yucca neomexicana, Yucca pallida, Yucca periculosa, Yucca poto-sina, Yucca queretaroensis, Yucca reverchonii, Yucca rostrata, Yucca rupicola, Yucca schidigera, Yucca schottii, Yucca sterilis, Yucca tenuistyla, Yucca thompsoniana, Yucca treculeana, Yucca utahensis, Yucca valida* or combinations thereof. In certain embodiments, the *Yucca* is or comprises *Yucca schidigera*.

Examples of *quillaja* include, but are not limited to, *Quillaja brasiliensis, Quillaja* lanceolata, *Quillaja* lancifolia, *Quillaja* molinae, *Quillaja* petiolaris, *Quillaja* poeppigii, *Quillaja saponaria, Quillaja sellowiana, Quillaja smegmadermos* or combinations thereof. In certain embodiments, the *quillaja* is or comprises *Quillaja saponaria*.

A person of ordinary skill in the art will appreciate that, as used herein, a plant name may refer to the plant as a whole, or to any part of the plant, such as the roots, stem or trunk, bark, leaves, flower, flower stems, seeds, or a combination thereof. These plant parts may be used fresh, or dried, and may be whole, pulverized, or comminuted. The plant name may also refer to extracts from any part or parts of the plant, such as chemical extracts, or extracts obtained by pressing, or any other methods of concentrating or extracting oils or other extracts known to those in the art or that are hereafter discovered. Plant extracts may include compounds that are saponins, triterpenoids, polyphenols, antioxidants or resveratrol, or combinations thereof.

The combination may comprise a composition comprising *yucca* and/or *quillaja* that may also include carriers and binding agents suitable to formulate the *yucca* and/or *quillaja* for administration to an animal. In certain embodiments, such a composition can be a commercially available product, such as a composition comprising *Yucca schidigera* and *Quillaja saponaria*, sold under the trademark NUTRAFITO PLUS by Desert King International and/or MAGNI-PHI© by Phibro Animal Health Corporation. Such compositions may comprise from 99% or more *Quillaja saponaria* and 1% or less *Yucca schidigera* to 75% *Quillaja saponaria* and 25% *Yucca schidigera*, such as from 95% *Quillaja saponaria* and 5% *Yucca schidigera* to 80% *Quillaja saponaria* and 20% *Yucca schidigera*, and in certain embodiments, 85% *Quillaja saponaria* and 15% *Yucca schidigera*, or 90% *Quillaja saponaria* and 10% *Yucca schidigera*.

In some embodiments, a combination and/or composition comprises, consists essentially of, or consists of, *yucca, quillaja, Bacillus coagulans, Bacillus subtilis, Bacillus licheniformis* and *Bacillus amyloliquefaciens*, such as *Yucca schidigera, Quillaja saponaria, Bacillus coagulans, Bacillus subtilis, Bacillus licheniformis* and *Bacillus amyloliquefaciens*. The combination and/or composition may comprise, consist essentially of, or consist of, from 100 to 500 ppm or more *yucca* and *quillaja*, and from 0.1 to 1 pounds of *Bacillus coagulans, Bacillus subtilis, Bacillus licheniformis* and *Bacillus amyloliquefaciens*, per ton of a feed, such as from 200 to 500 ppm *yucca* and *quillaja*, and from 0.1 to 0.5 pounds of *Bacillus coagulans, Bacillus subtilis, Bacillus licheniformis* and *Bacillus amyloliquefaciens*, and in certain embodiments, from 200 to 300 ppm *Yucca schidigera* and *Quillaja saponaria*, and from 0.2 to 0.3 pounds of *Bacillus coagulans, Bacillus subtilis, Bacillus licheniformis* and *Bacillus amyloliquefaciens*.

2. Silica, Mineral Clay, Glucan and Mannans

Additionally, or ahernatively, a Bacilli combination can be administered in combination with a feed supplement comprising silica, mineral clay, glucan and mannans. The feed supplement may further comprise an endoglucanohydrolase, either endogenously or as an affirmatively added ingredient. As used herein, weight % for endoglucanohydrolase is based on a 70,000 unit/gram endoglucanohydrolase product. The endoglucanohydrolase may be β-1,3 (4)-endoglucanohydrolase.

In any embodiments disclosed herein, the feed supplement may comprise, consist essentially of, or consist of, glucan (e.g., β-1,3 (4)glucan), silica, mineral clay and mannans. In some embodiments, the feed supplement comprises, consists essentially of, or consists of, glucan (e.g., β-1,3 (4)glucan), silica, mineral clay, mannans and endoglucanohydrolase. In any embodiments disclosed herein, the glucan and mannans may be provided, at least in part, by yeast cell wall or an extract thereof. Thus, in some embodiments, the feed supplement may comprise, consist essentially of, or consist of, silica, mineral clay and yeast cell wall or an extract thereof, or the feed supplement may comprise, consist essentially of, or consist of, silica, mineral clay, yeast cell wall or an extract thereof, and endoglucanohydrolase. Similarly, endoglucanohydrolase may, in certain disclosed embodiments, be provided by yeast cell wall or a yeast cell wall extract.

Suitable sources of silica include, but are not limited to, sand, diatomaceous earth, and synthetic silica. In one embodiment, quartz may be used. In certain embodiments, the mannans comprise glucomannan.

The components of the feed supplement are prepared by methods commonly known in the art and can be obtained from commercial sources. β-1,3 (4)-endoglucanohydrolase may be produced from submerged fermentation of a strain of *Trichoderma longibrachiatum*. Diatomaceous earth is available as a commercially-available product with from 70% to 95% silica ($SiO_2$) and with its remaining components not assayed but primarily ash (minerals) as defined by the Association of Analytical Chemists (AOAC, 2002). The mineral clays (e.g., aluminosilicates) used in this feed supplement may be any of a variety of commercially-available clays including, but not limited to, montmorillonite clay, bentonite and zeolite. Glucan, mannans, and/or endoglucanohydrolase can be obtained from plant cell walls, yeast or yeast cell wall or an extract thereof (e.g., *Saccharomyces cerevisiae, Candida utilis*), certain fungi (e.g., mushrooms), algae, and bacteria. In certain embodiments, yeast can be administered affirmatively to provide glucan, mannans and endoglucanohydrolase endogenously.

In one embodiment, the feed supplement comprises, consists essentially of, or consists of, 1-40 wt % silica, 0.5-25 wt % glucan and mannans, and 40-92 wt % mineral clay, in amounts relative to each other. In another embodiment, the feed supplement comprises, consists essentially of, or consists of, 5-40 wt % silica, 0.5-15 wt % glucan and mannans, and 40-80 wt % mineral clay, in amounts relative to each other. In another embodiment, the feed supplement comprises, consists essentially of, or consists of, 20-40 wt % silica, 0.5-10 wt % glucan and mannans, and 50-70 wt % mineral clay, in amounts relative to each other. In another embodiment, the feed supplement comprises, consists essentially of, or consists of, 15-40 wt % silica, greater than zero to 15 wt % glucans, greater than zero to 10 wt % mannans, and 50-81 wt % mineral clay, in amounts relative to each other. In another embodiment, the feed supplement comprises, consists essentially of, or consists of, 15-40 wt % silica, 0.5-5.0 wt % glucans, 0.5-8.0 wt % mannans, and 50-81 wt % mineral clay, in amounts relative to each other. In another embodiment, the feed supplement comprises, consists essentially of, or consists of, 20-30 wt % silica, 0.5-3.5 wt % glucans, 0.5-6.0 wt % mannans, and 60-70 wt % mineral clay, in amounts relative to each other.

In some embodiments, β-glucans and mannans are obtained from yeast or yeast cell wall or an extract thereof. The feed supplement may comprise, consist essentially of, or consist of, 1-40 wt % silica, 1-30 wt % yeast cell wall or an extract thereof, and 40-92 wt % mineral clay, in amounts relative to each other. In one embodiment, the feed supplement comprises, consists essentially of, or consists of, 10-40 wt % silica, 5-20 wt % yeast cell wall or an extract thereof, and 40-80 wt % mineral clay, in amounts relative to each other. In another embodiment, the feed supplement comprises, consists essentially of, or consists of, 15-30 wt % silica, 5-15 wt % yeast cell wall or an extract thereof, and 50-70 wt % mineral clay, in amounts relative to each other.

In any of the above embodiments, the feed supplement may further comprise an endoglucanohydrolase, such as β-1,3 (4)-endoglucanohydrolase. The feed supplement may include from 0.025 wt % endoglucanohydrolase to 5 wt % endoglucanohydrolase or more, such as from 0.05 wt % to 3 wt % β-1,3 (4)-endoglucanohydrolase, relative to the amounts of silica, mineral clay, glucan, mannans, and/or yeast, yeast cell wall, or yeast cell wall extract present in the feed supplement. In one embodiment, the feed supplement comprises, consists essentially of, or consists of, 0.1-3 wt % β-1,3 (4)-endoglucanohydrolase, 20-40 wt % silica, 0.5-20 wt % glucan and mannans, and 50-70 wt % mineral clay, in amounts relative to each other. In another embodiment, the feed supplement comprises, consists essentially of, or consists of, 0.1-3 wt %, β-1,3 (4)-endoglucanohydrolase, 20-40 wt % silica, 0.5-10 wt % glucan and mannans, and 50-70 wt % mineral clay, in amounts relative to each other. Alternatively, the feed supplement may comprise, consist essentially of, or consist of, 0.1-3 wt % β-1,3 (4)-endoglucanohydrolase, 1-40 wt % silica, 5-30 wt % yeast cell wall or an extract thereof, and 40-92 wt % mineral clay, in amounts relative to each other. In one embodiment, the feed supplement comprises, consists essentially of, or consists of, 0.1-3 wt % β-1,3 (4)-endoglucanohydrolase, 10-40 wt % silica, 5-20 wt % yeast cell wall or an extract thereof, and 40-80 wt % mineral clay, in amounts relative to each other. In another embodiment, the feed supplement comprises, consists essentially of, or consists of, 0.1-3 wt % β-1,3 (4)-endoglucanohydrolase, 15-30 wt % silica, 5-15 wt % yeast cell wall or an extract thereof, and 50-70 wt % mineral clay, in amounts relative to each other.

In any of the above embodiments, the silica may be provided by diatomaceous earth. In any of the above embodiments, the glucans may be β-glucans. In some embodiments, the β-glucans can be obtained from yeast, or other materials, such as fungi, algae, bacteria, or the like. In any of the above embodiments, the mannans may comprise glucomannan.

The glucan and mannans (or yeast or yeast cell wall or an extract thereof) can be prepared by a method known to a person of ordinary skill in the art and as further disclosed by the patent documents incorporated herein by reference. Yeast cell wall or an extract thereof may have a feed supplement comprising 0-15% moisture and 85-100% dry matter. The dry matter may comprise 10-65% protein, 0-25% fats, 0-3% phosphorus, 5-30% β-glucan, 5-35% mannans, and 0-15% ash. In an independent embodiment, a commercial source of β-1,3 (4) glucan and glucomannan derived from primary inactivated yeast (*Saccharomyces cerevisiae*) with the following chemical feed supplement can be used: moisture 2-5%; proteins 40-50%; fats 3-8%; phosphorus 0-2%; mannans 10-16%; β-1,3-(4) glucan 10-20%; and ash 2-12%.

In another independent embodiment, the yeast cell wall or an extract thereof comprises moisture 1-7% and dry matter 93-99%, and the dry matter may comprise proteins 18-28%, fats 10-17%, phosphorus 0-2%, mannans 20-30%, β-1,3-(4) glucan 18-28%, and ash 2-5%.

In an independent embodiment of the feed supplement, silica, glucan and mannans, and mineral clay are combined at 1-40%, 0.5-25% and 40-92% by weight, respectively. In an independent embodiment of the feed supplement and/or combination, β-1,3 (4)-endoglucanohydrolase, diatomaceous earth, yeast cell wall or an extract thereof, and mineral clay are combined at 0.05-3%, 1-40%, 1-20% and 40-92% by weight, respectively. In an independent feed supplement and/or combination, β-1,3 (4)-endoglucanohydrolase, diatomaceous earth, yeast cell wall or an extract thereof, and mineral clay are combined at 0.1-3%, 5-40%, 2-15% and 40-80% by weight, respectively. In another independent embodiment of the feed supplement and/or combination, β-1,3 (4)-endoglucanohydrolase, diatomaceous earth, yeast cell wall or an extract thereof, and mineral clay are combined at 0.1-3%, 30-40%, 4-15% and 50-65% by weight, respectively.

The feed supplement may further comprise one or more additional components. Additional components may be used for any desired purpose, such as a substantially biologically inert material added, for example, as a filler, or to provide a desired beneficial effect. For example, the feed supplement may include a carbonate (including a metal carbonate such as calcium carbonate); a trace mineral, such as, but not limited to, chloride, fluoride, iodide, chromium, copper, zinc, iron, magnesium, manganese, molybdenum, phosphorus, potassium, sodium, sulfur, selenium, or a combination thereof; a bulking agent; a micro tracer, such as iron particles coated with a dye; yeast; allicin; alliin; allinase; algae; a polyphenol or plant material comprising polyphenol; a carrier; a colorant; a taste enhancer; a preservative; an oil; a vitamin; a sorbic acid or a salt thereof; or a combination thereof. The yeast may be yeast culture, active yeast, a live yeast, a dead yeast, yeast extract, active dried yeast, brewers dried yeast, culture yeast, dried yeast, primary dried yeast, torula dried yeast, *candida* dried yeast, or a combination thereof. The preservative may be benzoic acid or a salt thereof, e.g. sodium benzoate; lactic acid or a salt thereof, e.g. sodium lactate, potassium lactate or calcium lactate; propionic acid or a salt thereof, e.g. sodium propionate; ascorbic acid or a salt thereof, e.g. sodium ascorbate; gallic acid or a salt thereof e.g. sodium gallate; sulfur dioxide and/or sulfites; nitrites; nitrates; choline, or a salt thereof, such as an anion salt of choline, e.g. choline halide, such as chloride, bromide, iodide, fluoride, or choline hydroxide; or any combination thereof. The oil may be mineral oil, corn oil, soybean oil, or a combination thereof. The sorbic acid or salt thereof may be potassium sorbate, sodium sorbate, ammonium sorbate, or a combination thereof. The vitamin may be vitamin A, vitamin B1, vitamin $B_2$, vitamin $B_3$, vitamin $B_5$, vitamin $B_6$, vitamin $B_{12}$, vitamin C, vitamin D, vitamin E, vitamin K, or a combination thereof.

Allicin (diallyl thiosulfate; 2-Propene-1-sulfinothioic acid S-2-propenyl ester) is a compound found in garlic, such as raw garlic. Allicin is typically produced from alliin ((2R)-2-amino-3-[(S)-prop-2-enylsulfinyl]propanoic acid) in damaged garlic cells by the action of the enzyme alliinase. Allicin, alliin, and/or alliinase may be provided as whole garlic cloves or bulbs; crushed, mashed, or chopped garlic; a garlic extract; and/or as a synthesized or isolated compound.

The polyphenol may be provided by a plant extract from a polyphenol-containing plant material. The plant material also may include non-polyphenol compounds, including polyphenol degradation products, such as gallic acid and trans-caftaric acid. Degradation can occur, for example, through oxidative and/or biological processes. Both the polyphenols and the non-polyphenol compounds may have biological activity. The plant extract may be prepared from a single plant material or from a combination of plant materials. Suitable plant materials from which a plant extract can be obtained include, but are not limited to, apples, blackberries, black chokeberries, black currants, black elderberries, blueberries, cherries, cranberries, grapes, green tea, hops, onions, *quillaja*, plums, pomegranates, raspberries, strawberries, and *yucca*.

In some embodiments, the plant extract is prepared from a pressed plant material, such as grape pomace, a dried plant material, such as tea, or a combination thereof. Pomace may be obtained substantially immediately post-pressing or as an ensiled product, i.e., pomace collected and stored for up to several months post-pressing. Suitable plants have a plurality of polyphenols and/or other non-polyphenolic compounds including, but not limited to, non-polyphenolic organic acids (such as gallic acid and/or trans-caftaric acid), flavanols, gallate esters, flavanodiols, phloroglucinol, pyrogallol, and catechol. In some embodiments, the plant extract is prepared from Pinot noir pomace, Pinot gris pomace, or green tea.

In some embodiments, pressed or dried plant material is ground to a fine powder prior to, or during, extraction. Pressed plant materials may be frozen to facilitate grinding. Polyphenols and other non-polyphenolic compounds may be extracted for administration. For example, polyphenols and other non-polyphenolic compounds may be extracted from the powder using a solution comprising a polar solvent, such as water, an alcohol, an ester, or a combination thereof. In some embodiments, the solution comprises a water-miscible alcohol, ester, or combination thereof, such as a lower alkyl alcohol, lower alkyl ester, or a combination thereof. In some embodiments, the solution is water or an aqueous solution comprising 25-99% solvent, such as 25-95% solvent, 30-80% solvent, or 50-75% solvent, and water. In certain embodiments, the solution is an aqueous solution comprising methanol, ethanol, isopropanol, ethyl acetate, or a combination thereof. The solution may be acidified by addition of an acid. The acid may prevent or minimize oxidative degradation of biologically-active polyphenols and other non-polyphenolic compounds in the extract. The acid may be any suitable acid, such as a mineral acid (e.g., hydrochloric acid), or an organic acid such as citric acid or acetic acid. In some embodiments, the solution comprises from 0.01% to 1% acid, such as 0.02-0.5%, 0.025-0.25%, or 0.05-0.15%. In some examples, the solution includes 0.1% hydrochloric acid.

Extraction may be performed at a temperature ranging from 0-100° C. In some embodiments, extraction is performed at a temperature ranging from 20-70° C., or at ambient temperature. Extraction may be performed for a duration ranging from several minutes to several days. To increase extraction efficiency, the plant material and solution may be mixed or agitated during extraction, such as by grinding the plant material during extraction, stirring the mixture, shaking the mixture, or homogenizing the mixture. In some embodiments, the extraction may be repeated one or more times with fresh solution to increase recovery of polyphenols and other non-polyphenolic compounds from the plant material. The liquid phases from each extraction cycle are then combined for further processing.

The liquid phase can be recovered, and the residual solids, or pulp, are discarded. Recovering the liquid phase may comprise decanting the liquid from the remaining solids and/or filtering the liquid phase to remove residual solids. The solvent (alcohol, ester, or combination thereof) can be removed from the liquid solution by any suitable means, such as evaporation (e.g., roto-evaporation), to produce an aqueous extract containing the biologically-active components in a mildly acidic solution.

In certain embodiments where the plant material includes a significant amount of oils, or lipids, an initial extraction of nonpolar components may be performed before extracting the polyphenols and other polar, non-polyphenolic compounds. Nonpolar components may be extracted by homogenizing the plant material in a nonpolar solvent, e.g., hexanes, heptanes, or a combination thereof. The solvent layer including the extracted nonpolar components is separated from the plant material and discarded.

The aqueous plant extract may be further purified by suitable means, e.g., extraction, chromatographic methods, distillation, etc., to remove non-polyphenolic compounds and/or to increase the concentration of polyphenols relative to other compounds in the extract.

The aqueous plant extract may be dried, for example by freeze-drying or other low-temperature drying methods, and ground to a powder to provide a dried plant extract. In some embodiments, the dried plant extract comprises 0.01 wt % to 25 wt % total polyphenols, such as 0.01 wt % to 10 wt %, 0.01 wt % to 5 wt %, 0.01 wt % to 2.5 wt %, 0.01 wt % to 1 wt %, 0.01 wt % to 0.5 wt %, 0.02 to 0.25 wt %, or 0.03-0.1 wt % total polyphenols. In certain embodiments, the dried plant extract further comprises non-polyphenolic compounds. For example, the dried plant extract may comprise 0.01-1 mg/g gallic acid, such as 0.05-0.5 mg/g or 0.09-0.25 mg/g gallic acid, and/or 0.001-0.1 mg/g trans-caftaric acid, such as 0.005-0.05 mg/g or 0.01-0.025 mg/g trans-caftaric acid.

The aqueous plant extract may be concentrated to a smaller volume, e.g., by evaporation, and used as an aqueous plant extract. In other embodiments, the aqueous plant extract is mixed with a carrier before drying and grinding. Suitable carriers include, for example, diatomaceous earth, silica, maltodextrin, ground grain (e.g., corn), meals (e.g., soybean or cottonseed meal) by-products (e.g., distiller's dried grains, rice hulls, wheat mill run), clays (e.g., bentonite), and combination thereof. The plant extract may be combined with a carrier in a ratio ranging from 10:1 to 1:10 by weight, such as from 5:1 to 1:5. For example, the plant extract may be mixed with diatomaceous earth in a ratio of 3:1 by weight.

Additionally, or alternatively, the additional components may comprise corn, soybean meal, wheat, wheat fiber, barley, rye, rice hulls, canola, limestone, salt, distillers dried grains with solubles (DDGS), dicalcium phosphate, sodium sesquicarbonate, methionine source, lysine source, L-threonine, biotin, folic acid, kelp, menadione dimethylpyrimidinol bisulfite, calcium aluminosilicate, or any combination thereof.

Additional information concerning feed supplement and/or additional components can be found in PCT application No. PCT/US2015/053439, and U.S. application Ser. Nos. 15/359,342, 14/699,740, 14/606,862, and 62/449,959 each of which is incorporated herein by reference in its entirety.

In some embodiments, the feed supplement does not comprise additional components. In other embodiments, the feed supplement comprises from greater than zero to 40% or more by weight additional components, such as from 0.1% to 40% by weight, or from 0.2% to 35% by weight additional components. In certain embodiments, the feed supplement comprises from 0.1% to 5% by weight additional components, such as from 0.2% to 3% by weight. In other embodiments, the feed supplement comprises from 5% to 20% by weight additional components, such as from 10% to 15% by weight. And in further embodiments, the feed supplement comprises from 20% to 40% by weight additional components, such as from 30% to 35% by weight additional components.

In some embodiments, the feed supplement comprises, consists essentially of, or consists of, silica, mineral clay, glucan, mannans, and endoglucanohydrolase; silica, mineral clay, glucan, mannans, endoglucanohydrolase, micro tracers and mineral oil; silica, mineral clay, glucan, mannans, endoglucanohydrolase, micro tracers, mineral oil, and vitamins; silica, mineral clay, glucan, mannans, endoglucanohydrolase, micro tracers, mineral oil, vitamins, and potassium sorbate; silica, mineral clay, glucan, mannans, endoglucanohydrolase, vitamins, and active yeast; silica, mineral clay, glucan, mannans, endoglucanohydrolase, micro tracers, mineral oil, and active yeast; silica, mineral clay, glucan, mannans, endoglucanohydrolase, and mineral oil; silica, mineral clay, glucan, mannans, endoglucanohydrolase, vitamins, and calcium carbonate; silica, mineral clay, glucan, mannans, endoglucanohydrolase, micro tracers, and wheat fiber; or silica, mineral clay, glucan, mannans, endoglucanohydrolase, and micro tracers. In any of these embodiments, the glucan and mannans may be provided by yeast, yeast cell wall, or yeast cell wall extract.

In some embodiments, the feed supplement does not comprise a peroxide compound. In some embodiments, the feed supplement does not comprise hydrogen peroxide. In some embodiments, the feed supplement does not comprise carbamide peroxide. In some embodiments, the feed supplement does not comprise urea. In some embodiments, the feed supplement does not comprise hydrogen peroxide and urea.

In certain embodiments, the feed supplement is a powdered supplement. In other embodiments, the feed supplement is a granulated supplement. The granulated feed supplement may comprise silica, mineral clay, glucan and/or mannans, and optionally endoglucanohydrolase as discussed above. The granulated feed supplement may have a bulk loose density of from 40 lb/ft$^3$ to 150 lb/ft$^3$. In some embodiments, each granule in the granular composition comprises silica, mineral clay, glucan and/or mannans, and optionally endoglucanohydrolase, in relative amounts substantially the same as a relative amount of each ingredient in the composition as whole. Each granule in the granular composition may comprise, consist essentially of, or consist of, silica, mineral clay, glucan, mannans and endoglucanohydrolase. Alternatively, or additionally, each granule may comprise a substantially homogenous blend of silica, mineral clay, glucan and mannans, and optionally endoglucanohydrolase. The composition may comprise greater than 40% by weight granules having at least one dimension between 0.149 mm (100 mesh, U.S. standard mesh size) and 4.76 mm (4 mesh), and in some embodiments, the composition comprises greater than 90% by weight granules having at least one dimension between 0.149 mm (100 mesh) and 2 mm (10 mesh). And/or the composition may comprise from greater than 0% to 100% granules by weight and from 0% to no more than 60%, such as no more than 10%, particles by weight, the granules having at least one dimension between 10 mesh (2.00 mm) and 100 mesh (0.149 mm), and the particles having at least one dimension of less than (i.e., smaller than) 100 mesh (0.149 mm). In any embodiments, the granular composition comprises plural granules, each granule comprising silica, mineral clay, glucan and mannans, the granules having a size that when administered to an animal increases expression of interleukin 10 receptor R (IL10RB) for a time period subsequent to administration, such as subsequent to the onset of administration, relative to an animal that does not receive the composition. In some embodiments the time period may be from the start of administration to from 28 days to at least 42 days. And/or the composition may have a mineral coefficient of variation of from 0% to 10%, or a proximate coefficient of variation of from 0% to 20%, or both. Additional information concerning the granular feed supplement can be found in U.S. application No. 62/449,959 which is incorporated herein by reference in its entirety.

In some embodiments, the feed supplement is administered daily to an animal at time intervals believed or determined to be effective for achieving a beneficial result. The feed supplement may be administered in a single dose daily or in divided doses throughout the day. The amount may be from greater than zero to 500 grams per animal per day, such as from 0.5 grams to 250 grams, from 5 grams to 200 grams, or from 10 grams to 70 grams per animal per day. Alternatively, the feed supplement may be fed or administered in an amount of from greater than zero to 1000 mgs or more per kilogram of the animal's body weight per day, such as from greater than zero to 500 mgs per kilogram body weight. In other embodiments, the feed supplement is fed or administered per weight of animal feed. The feed supplement may be fed or administered in an amount of from greater than zero to 150 kg per ton (2000 pounds) of feed, such as from 0.1 kg to 100 kg per ton of feed. Alternatively, the feed supplement may be fed or administered in an amount of from greater than zero to 20 grams per kilogram of feed, such as from greater than zero to 10 grams of feed.

In some embodiments, a composition and/or combination comprises a first composition comprising, consisting essentially of, or consisting of, *Bacillus coagulans, Bacillus subtilis, Bacillus licheniformis* and *Bacillus amyloliquefaciens*, and a second composition comprising, consisting essentially of, or consisting of, one or more of *yucca, quillaja*, silica, mineral clay, glucan, mannans, and endoglucanohydrolase. The second composition may comprise, consist essentially of, or consist of, *yucca* and *quillaja*, such as *Yucca schidigera* and *Quillaja saponaria*. In other embodiments, the second composition comprises, consists essentially of, or consists of, silica, mineral clay, glucan and mannans, and optionally endoglucanohydrolase.

3. Additional DFM(s)

The disclosed Bacilli combination can be administered to an animal in combination with one or more additional DFMs. The additional DFM(s) may be any DFM suitable for administration to the particular animal. In some embodiments, the animal is a poultry, particularly a chicken or a turkey, and the additional DFM is a DFM that provides a benefit to the poultry. The additional DFM may be, by way of example and without limitation, an additional *Bacillus* species, *Lactobacillus, Enterococcus, Bifidobacterium, Propionibacterium, Streptococcus, Pediococcus*, yeast, or a combination thereof.

Exemplary additional DFMs include, but are not limited to, *Bacillus alcalophilus, Bacillus alvei, Bacillus aminovorans, Bacillus aneurinolyticus, Bacillus anthracis, Bacillus aquaemaris, Bacillus atrophaeus, Bacillus boroniphilus, Bacillus brevis, Bacillus caldolyticus, Bacillus centrosporus, Bacillus cereus, Bacillus circulans, Bacillus firmus, Bacillus flavothermus, Bacillus fusiformis, Bacillus galliciensis, Bacillus globigii, Bacillus infernus, Bacillus larvae, Bacillus laterosporus, Bacillus lentus, Bacillus megaterium, Bacillus mesentericus, Bacillus mucilaginosus, Bacillus mycoides, Bacillus natto, Bacillus pantothenticus, Bacillus polymyxa, Bacillus pseudoanthracis, Bacillus pumilus, Bacillus schlegelii, Bacillus sphaericus, Bacillus sporothermodurans, Bacillus stearothermophilus, Bacillus thermoglucosidasius, Bacillus thuringiensis, Bacillus vulgatis, Bacillus weihenstephanensis, Lactobacillus acidophilis, Lactobacillus plantarum, Lactobacillus casei, Lactobacillus gallinarum, Lactobacillus lactis, Lactobacillus salivarius, Lactobacillus reuteri, Lactobacillus bulgaricus, Bifidobacterium pseudolongum, Bifidobacterium thermophilium, Bifidobacterium longum, Bifidobacterium lactis, Bifidobacterium animalis, Bifidobacterium bifidum, Bifidobacterium infantis, Streptococcus bovis, Streptococcus faecium, Enterococcus faecium, Enterococcus faecalis, Enterococcus diacetylactis, Saccharomyces cerevisiae, Saccharomyces boulardii Aspergillus oryzae, Aspergillus niger, Selenomonas ruminantium, Megasphaera elsdenii, Propionibacterium freudenreichii, Propionibacterium shermanii, Propionibacterium acidipropionici, Propionibacterium fensenii, Prevotella bryantii, Pediococcus acidilactici, Pediococcus cerevisiae*, or a combination thereof. In certain embodiments, *Bacillus pumilus* may be administered in combination with the Bacilli combination.

V. Beneficial Results from Administering the Bacilli Combination

Administering a Bacilli combination to an animal, such as poultry, has provided a substantial beneficial result when compared to administering each of the respective *Bacillus* species individually, or in combinations comprising only two species. These beneficial results are determined by considering, for example, feed conversion rate, average body weight, average body weight gain, body weight coefficient of variation, breast meat yield, bird mortality, lesion scores, necrotic enteritis incidence, *Salmonella/E. Coli/ Clostridium perfringens* (CP) incidence, and/or oocysts in fecal matter at various times during chick rearing. With reference to Example 1, these benefits can be determined by comparing feed conversion rate (FCR) for birds fed a basal diet and challenged with CP relative to birds that receive the Bacilli combination, such as *Bacillus coagulans, Bacillus subtilis* and *Bacillus licheniformis* in combination, or *Bacillus amyloliquefaciens, Bacillus subtilis* and *Bacillus licheniformis*, optionally with *Bacillus coagulans*.

Administration of a disclosed Bacilli combination to poultry may reduce *E. coli* in the poultry. The amount of *E. coli* reduction may be from greater than zero to 25% or more, such as a reduction of from 5% to 25%, or 10% to 22%, compared to an amount of *E. coli* present in poultry that are not administered the combination. The reduction may be identified at various times, such as at 21 and/or 42 days old for certain disclosed working embodiments.

Administration of a disclosed Bacilli combination to poultry may reduce Aerobic Plate Count (APC) in the poultry. The APC reduction may be from greater than zero to 20% or more, such as a reduction of from 5% to 20%, or 10% to 18%, compared to an amount of APC present in poultry that are not administered the combination. The reduction may be identified at various times, such as at 21 and/or 42 days old for certain disclosed working embodiments.

Administration of a disclosed Bacilli combination to poultry may reduce *Salmonella* in the poultry. The *Salmonella* reduction may be from greater than zero to 65% or more, such as a reduction of from 25% to 65%, 35% to 65%, or from 45 to 65%, compared to an amount of *Salmonella* present in poultry that are not administered the combination. The reduction may be identified at various times, such as at 21 and/or 42 days old for certain disclosed working embodiments.

Administration of a disclosed Bacilli combination to poultry may reduce *Clostridium perfringens* in the poultry. The *Clostridium perfringens* reduction may be from greater than zero to 30% or more, such as a reduction of from 5% to 30%, 10% to 30%, or from 15% to 30%, compared to an amount of *Clostridium perfringens* present in poultry that are not administered the combination. The reduction may be identified at various times, such as at 21 and/or 42 days old for certain disclosed working embodiments.

Administration of a disclosed Bacilli combination to poultry may reduce fecal oocysts in the poultry. The oocysts reduction may be from greater than zero to 90% or more, such as a reduction of from 50% to 90%, or 75% to 90%, compared to an amount of oocysts present in poultry that are not administered the combination. The reduction may be identified at various times, such as at 21 and/or 42 days old for certain disclosed working embodiments.

Administration of a disclosed Bacilli combination to poultry may result in an improved lesion score in the poultry. The lesion score may be improved (i.e. lowered) by from greater than zero to 75% or more, such as from 25% to 75%, or from 30% to 75%, compared to a lesion score of poultry that are not administered the combination. The improvement may be identified at various times, such as at 21 and/or 42 days old for certain disclosed working embodiments.

Administration of a disclosed Bacilli combination to poultry may result in an improved feed conversion rate in the poultry. The feed conversion rate may be improved (i.e. lowered) by from greater than zero to 10% or more, such as from 2% to 8%, or from 4% to 8%, compared to a feed conversion rate of poultry that are not administered the combination. The improvement may be identified at various times, such as poultry at 14, 21 and/or 42 days old.

Administration of a disclosed Bacilli combination to poultry may result in a reduced poultry mortality rate. The mortality rate may be reduced by from greater than zero to 95% or more, such as from 50% to 95%, from 75% to 95% or from 80% to 95%, compared to a mortality rate of poultry that are not administered the combination. The improvement may be identified at various times, such as when the poultry are 14, 21 and/or 42 days old.

Administration of a disclosed Bacilli combination to poultry may result in an improved average weight gain. The weight gain may be increased by from greater than zero to 20% or more, such as from 5% to 15%, from 7% to 15% or from 10% to 15%, compared to an average weight gain of poultry that are not administered the combination. The improvement may be identified at various times, such as when the poultry are 14, 21 and/or 42 days old.

VI. EXAMPLES

The following examples are provided to illustrate certain features of exemplary working embodiments. A person of ordinary skill in the art will appreciate that the scope of the invention is not limited to the particular features of these examples.

Example 1

This example concerns the results of a field study to compare the efficacy of various combinations of direct fed microbials that are administered in the feed to control necrotic enteritis caused by *Clostridium perfringens* in broiler chickens. The goal of this study is comparative evaluations of poultry performance in a challenge model after administration of different strains or combinations of direct fed microbials. The study is performed as a battery trial using a challenge model wherein the birds are challenged with coccidia and *Clostridium perfringens*.

The study consists of 56 cages starting with 8 chicks each. The treatments are replicated in 8 blocks of 7 cages each, as shown in Table 1.

TABLE 1

| Treatment | | Coccidial Challenge | *Clostridium perfringens* | Cages/Trt |
|---|---|---|---|---|
| T1 | Nonmedicated | DOT 15 | No | 8 |
| T2 | Nonmedicated | DOT 15 | DOT 20, 21, and 22 | 8 |
| T3 | Gallipro Max 10G, 10 g/t | DOT 15 | DOT 20, 21, and 22 | 8 |
| T4 | BC1, 7.5 g/t | DOT 15 | DOT 20, 21, and 22 | 8 |
| T5 | BL1, 113.5 g/t + BS1, 113.5 g/t | DOT 15 | DOT 20, 21, and 22 | 8 |
| T6 | BL1, 113.5 g/t + BS1, 113.5 g/t + BC1 6086, 7.5 g/t | DOT 15 | DOT 20, 21, and 22 | 8 |
| T7 | BL2 + BS2 200 g/t + BC2, 7.5 g/t | DOT 15 | DOT 20, 21, and 22 | 8 |

A. Materials and Methods

An un-medicated chicken starter compound is formulated, comprising feeds commonly used in the United States. The diet is representative of a local commercial formulation and calculated analyses meets or exceeds NRC broiler starter requirements. Experimental treatment feeds are prepared from this basal starter feed. Treatment feeds are mixed to assure a uniform distribution of respective test article. The mixer is flushed to prevent cross contamination. The feed is distributed among cages of the same treatment. This ration (in mash form) is fed during the study.

Day of hatch male broiler chicks are obtained from Cobb-Vantress, Cleveland, GA The strain is Cobb 500. Breeder flock information is recorded. At the hatchery, the birds are sexed and receive routine vaccinations. Only healthy appearing chicks are used in the study.

B. Procedures

The study begins when the birds are placed (day of hatch) (DOT 0) at which time they are allocated to experimental cages. No birds are replaced during the course of the study. All birds are weighed on DOT 0, 15, 22, and 28. Feed and water are given ad libitum. Feed is weighed in on DOT 0 and remaining feed is weighed on DOT 15, 22, and 28.

On DOT 15, all birds are orally inoculated with about 5,000 oocysts of *E. maxima*. Starting on DOT 20, all birds except Treatment 1 are given a broth culture of *C. perfringens* about $10^8$ CFU/ml. The birds are administered a fresh broth culture once daily for 3 days (on DOTs 20, 21, and 22). On DOT 22, three birds from each cage are selected, sacrificed, weighed, and examined for the degree of presence of Necrotic Enteritis lesions. The scoring is based on a 0 to 3 score, with 0 being normal and 3 being the most severe.

The cages are checked twice daily. Observations included are the availability of feed and water, temperature control, and any unusual conditions. The birds are watched closely for any abnormal reactions. When mortality birds are removed from cages, the cage number, date, weight of the bird, sex, and probable cause of death are recorded. Means for cage weight gain, feed consumption, feed conversion, lesion scores, and mortality are calculated.

C. Results

The study is expected to show that administration of the CSL combination provides an improved feed conversion rate and/or increased weight gain, compared to birds not administered any *Bacillus* DFMS, and compared to birds administered only one or two of the *Bacillus* species rather than the CSL combination.

Additionally, the results will demonstrate that birds that are administered the CVSL combination have reduced mortality when challenged with *C. perfringens*, compared to birds that are challenged but not administered the CSL combination, such as those not administered a *Bacillus* DFM and those administered only one or two *Bacillus* species.

Example 2

A field study is performed to compare the efficacy of various combinations of direct fed microbials that are administered in the feed to control necrotic enteritis caused by *Clostridium perfringens* in broiler chickens. The goal of this study is comparative evaluations of poultry performance in a challenge model after administration of different strains or combinations of direct fed microbials. The study is performed as a battery trial using a challenge model wherein the birds are challenged with coccidia and *Clostridium perfringens*.

The study consisted of 56 cages starting with 8 chicks each. The treatments are replicated in 8 blocks of 7 cages each, as shown in Table 2.

TABLE 2

| Treatment | | Coccidial Challenge | Clostridium perfringens | Cages/ Trt |
|---|---|---|---|---|
| T1 | Nonmedicated | DOT 14 | No | 8 |
| T2 | Nonmedicated | DOT 14 | DOT 19, 20, and 21 | 8 |
| T3 | BC1, 7.5 g/t | DOT 14 | DOT 19, 20, and 21 | 8 |
| T4 | BC2, 46.875 g/t | DOT 14 | DOT 19, 20, and 21 | 8 |
| T5 | BC2, 7.5 g/t | DOT 14 | DOT 19, 20, and 21 | 8 |
| T6 | BL1, 113.5 g/t BL1 + BS1, 113.5 g/t | DOT 14 | DOT 19, 20, and 21 | 8 |
| T7 | BL2 + BS2 (200 g/t | DOT 14 | DOT 19, 20, and 21 | 8 |

A. Materials and Methods

An un-medicated chicken starter compound is formulated with feeds commonly used in the United States. The diet is representative of a local commercial formulation and calculated analyses meets or exceeds NRC broiler starter requirements. Experimental treatment feeds are prepared from this basal starter feed. Treatment feeds are mixed to assure a uniform distribution of respective test article. The mixer is flushed to prevent cross contamination. This ration (in mash form) is fed during the study.

Day of hatch male broiler chicks are obtained from Cobb-Vantress, Cleveland, GA The strain is Cobb 500. Breeder flock information is recorded. At the hatchery, the birds are sexed and receive routine vaccinations. Only healthy appearing chicks are used in the study.

B. Procedures

The study begins when the birds are placed (day of hatch) (DOT 0) at which time they are allocated to experimental cages. No birds are replaced during the course of the study. All birds are weighed on DOT 0, 14, 21, and 28. Feed is weighed in on DOT 0 and remaining feed is weighed on DOT 14, 21, and 28. Feed and water are given ad libitum.

On DOT 14, all birds are orally inoculated with about 5,000 oocysts of *E. maxima*. Starting on DOT 19, all birds except Treatment 1 are given a broth culture of *C. perfringens* about $10^8$ CFU/ml. The birds are administered a fresh broth culture once daily for 3 days (on DOTs 19, 20, and 21).

On DOT 21, three birds from each cage are selected, sacrificed, weighed, and examined for the degree of presence of Necrotic Enteritis lesions. The scoring is based on a 0 to 3 score, with 0 being normal and 3 being the most severe.

The cages are checked twice daily. Observations included are the availability of feed and water, temperature control, and any unusual conditions. The birds are watched closely for any abnormal reactions. When mortality birds are removed from cages, the cage number, date, weight of the bird, sex, and probable cause of death are recorded. Means for cage weight gain, feed consumption, feed conversion, lesion scores, and mortality are calculated.

C. Results

The study is expected to show that administration of the CSL combination provides an improved feed conversion rate and/or increased weight gain, compared to birds not administered any *Bacillus* DFMS, and compared to birds administered only one or two of the *Bacillus* species rather than the CSL combination.

Additionally, the results will demonstrate that birds that are administered the CVSL combination have reduced mortality when challenged with *C. perfringens*, compared to birds that are challenged but not administered the CSL combination, such as those not administered a *Bacillus* DFM and those administered only one or two *Bacillus* species.

Example 3

A total of 4,992 chicks strain were housed at hatch (one day of age, or Trial Day 0) to begin the test feeding period. The chicks were fed as shown in Table 3.

TABLE 3

| Ration Number | TEST MATERIAL (additives)[1,2] |
|---|---|
| PHIBRO4-1 | Control 1 (Clean)-Basal diet + No challenge |
| PHIBRO4-2 | Control 2 (Challenged)-Basal diet + CP Challenge |
| PHIBRO4-3 | Provia 6086 + CP Challenge |
| PHIBRO4-4 | Osprey BL + BS + CP Challenge |
| PHIBRO4-5 | Osprey BL + BS + Pro via 6086 (recommended levels) + CP Challenge |
| PHIBRO4-6 | Osprey BL + BS + Pro via 6086 (@half the recommended levels) + CP Challenge |
| PHIBRO4-7 | Control 1 (Clean) + Osprey BL + BS + Pro via 6086 (recommended levels) + No Challenge |
| PHIBRO4-8 | Calsporin + CP Challenge |

[1]Each treatment was fed to 12 replicates of 52 mixed-sex broilers.
[2]A basal (with enough feed for the entire treatment) was mixed first and then each test material was added and remixed.
[4]Recommended levels:
Provia 6086 (full dose): 7.5 grams per ton of complete feed. Product contains 15 billion CFU of Bacillus coagulans per gram resulting in approximately $1.2 \times 10^5$ CFU per gram in final feed.
Osprey BL (full dose): 0.25 lbs per ton of complete feed. Product contains $2.4 \times 10^9$ CFU Bacillus subtilis per gram resulting in approximately $3 \times 10^5$ CFU per gram in final feed.

Osprey BS (full dose): 0.25 lbs per ton of complete feed. Product contains $2.4 \times 10^9$ CFU *Bacillus licheniformis* per gram resulting in approximately $3 \times 10^5$ CFU per gram in final feed.
CALSPORIN (N/C): 9.07 grams per ton of feed.
The results of this study are summarized in FIG. 1.

Example 4

This example concerns a field study. The protocol for this study was as shown in Table 4.

TABLE 4

| Ration Number[1] | Treatment Identification Code | Test Material (Provia 6086 @ 7.5 g/ton of feed)[2,3] | Test Material (Osprey BS &+ BL @ 113.4 g/ton of feed, each)[2,3] |
|---|---|---|---|
| PHIBRO7-1 | Treatment 1 (Control, No CP) | 0 | 0 |
| PHIBRO7-2 | Treatment 2 (Control, CP) | 0 | 0 |
| PHIBRO7-3 | Treatment 3 (BL&BS + BC, CP) | 100% | 100% |
| PHIBRO7-4 | Treatment 4 (BL&BS + BC, CP) | 75% | 100% |
| PHIBRO7-5 | Treatment 5 (BL&BS + BC, CP) | 100% | 75% |
| PHIBRO7-6 | Treatment 6 (BL&BS + BC, CP) | 100% | 50% |
| PHIBRO7-7 | Treatment 7 (BL&BS + BC, CP) | 75% | 50% |
| PHIBRO7-8 | Treatment 8 (BL&BS + BC, CP) | 75% | 75% |
| PHIBRO7-9 | Treatment 9 (Calsporin, CP) | 0 | 0 |
| PHIBRO7-10 | Product Y1-1 (182 g/ton), CP | 0 | 0 |
| PHIBRO7-11 | Product Y2-2 (182 g/ton), CP | 0 | 0 |

[1]Each treatment was fed to 12 replicates of 52 mixed-sex broilers.
[2]A basal feed (with enough feed for the entire treatment) was mixed first and then each test material was added and remixed.
[3]RECOMMENDED LEVELS:
Provia 6086: 7.5 grams per ton of complete feed. Product contains 15 billion CFU of Bacillus coagulans per gram resulting in approximately $1.2 \times 10^5$ CFU per gram in final feed.

Osprey BL (full dose): 0.25 lbs per ton of complete feed. Product contains $2.4 \times 10^9$ CFU Direct Fed Microbials per gram resulting in approximately $3 \times 10^5$ CFU per gram in final feed.

Osprey BS (full dose): Use 0.25 lbs per ton of complete feed. Product contains $2.4 \times 10^9$ CFU Direct Fed Microbials per gram resulting in approximately $3 \times 10^5$ CFU per gram in final feed.
CALSPORIN (N/C): 9.07 grams per ton of feed.
Product Y1-1 and Y2-2: 182 grams per ton of feed was administered for each of Treatments #10 and #11.
The results of this study are provided in FIGS. 2 and 3. With respect to FIGS. 2 and 3, "Significance (P<0.05)" indicates that averages within a row that are without a common superscript are significantly different (P<0.05) as determined by Least Significant Difference.

Example 5

This example concerns the results of a field study to compare the efficacy of various combinations of direct fed microbials that are administered in the feed to control necrotic enteritis caused by *Clostridium perfringens* in broiler chickens, and the effect of the direct fed microbials on feed conversion rates and weight gain in the chickens. The goal of this study is comparative evaluations of poultry performance in a challenge model after administration of different strains or combinations of direct fed microbials. The study is performed as a battery trial using a challenge model wherein the birds are challenged with coccidia and *Clostridium perfringens*.

The study consists of 56 cages starting with 8 chicks each. The treatments are replicated in 8 blocks of 7 cages each, as shown in Table 5.

TABLE 5

| Treatment | | Coccidial Challenge | *Clostridium perfringens* | Cages/Trt |
|---|---|---|---|---|
| T1 | Nonmedicated | DOT 15 | No | 8 |
| T2 | Nonmedicated | DOT 15 | DOT 20, 21, and 22 | 8 |
| T3 | BA | DOT 15 | DOT 20, 21, and 22 | 8 |
| T4 | BSBL | DOT 15 | DOT 20, 21, and 22 | 8 |
| T5 | 50%:50% BA:BSBL | DOT 15 | DOT 20, 21, and 22 | 8 |
| T6 | 25%:75% BA:BSBL | DOT 15 | DOT 20, 21, and 22 | 8 |
| T7 | 75%:25% BA:BSBL | DOT 15 | DOT 20, 21, and 22 | 8 |

BSBL: 1:1 mixture of *Bacillus subtilis* and *Bacillus licheniformis*.
BA: *Bacillus amyloliquefaciens*

A. Materials and Methods

An un-medicated chicken starter compound is formulated, comprising feeds commonly used in the United States. The diet is representative of a local commercial formulation and calculated analyses meets or exceeds NRC broiler starter requirements. Experimental treatment feeds are prepared from this basal starter feed. Treatment feeds are mixed to assure a uniform distribution of respective test article. The mixer is flushed to prevent cross contamination. The feed is distributed among cages of the same treatment. This ration (in mash form) is fed during the study.

Day of hatch male broiler chicks are obtained from Cobb-Vantress, Cleveland, GA The strain is Cobb 500. Breeder flock information is recorded. At the hatchery, the birds are sexed and receive routine vaccinations. Only healthy appearing chicks are used in the study.

B. Procedures

The study begins when the birds are placed (day of hatch) (DOT 0) at which time they are allocated to experimental cages. No birds are replaced during the course of the study. All birds are weighed on DOT 0, 15, 22, and 28. Feed and water are given ad libitum. Feed is weighed in on DOT 0 and remaining feed is weighed on DOT 15, 22, and 28.

On DOT 15, all birds are orally inoculated with about 5,000 oocysts of *E. maxima*. Starting on DOT 20, all birds except Treatment 1 are given a broth culture of *C. perfringens* about $10^8$ CFU/ml. The birds are administered a fresh broth culture once daily for 3 days (on DOTs 20, 21, and 22). On DOT 22, three birds from each cage are selected, sacrificed, weighed, and examined for the degree of presence of Necrotic Enteritis lesions. The scoring is based on a 0 to 3 score, with 0 being normal and 3 being the most severe.

The cages are checked twice daily. Observations included are the availability of feed and water, temperature control, and any unusual conditions. The birds are watched closely for any abnormal reactions. When mortality birds are removed from cages, the cage number, date, weight of the bird, sex, and probable cause of death are recorded. Means for cage weight gain, feed consumption, feed conversion, lesion scores, and mortality are calculated.

C. Results

The study is expected to show that administration of the combination of *Bacillus amyloliquefaciens, Bacillus subtilis* and *Bacillus licheniformis* provides an improved feed conversion rate and/or increased weight gain, compared to birds not administered any *Bacillus* DFMS, and compared to birds administered only one or two of the *Bacillus* species rather than the combination of the three Bacilli.

Additionally, the results will demonstrate that birds that are administered the combination have reduced mortality when challenged with *C. perfringens*, compared to birds that are challenged but not administered the combination of *Bacillus amyloliquefaciens, Bacillus subtilis* and *Bacillus licheniformis*, such as those not administered a *Bacillus* DFM and those administered only one or two *Bacillus* species.

Example 6

Study Overview

This study was conducted to determine the dose titration safety and efficacy of Magni-Phi® alone (fed at either 0 and 250 ppm) or in combination with a combination of *B. subtilis, B. amyloliquefaciens, B. coagulans* and *B. licheniformis* (administered as Provia Prime™) as well as other DFM test materials on broiler chicken live performance from hatch to 42 days of age. Provia Prime™ was fed one level at 0.25 pounds per ton. In particular, Provia Prime™ alone was tested to determine if maximum genetic potentials could be met or if feeding both Magni-Phi® at both levels plus Provia Prime™, as well as other single-strain candidates (*B. pumilus, B. subtilis, B. amyloliquefaciens, B. coagulans* or *B. licheniformis*) was beneficial.

The test period began on Trial Day 0 (day of hatch of chicks) and ended on Day 42. The chicks were fed a commercial-type mash feed. The chicks were randomly assigned to one of 15 test groups, which were either 11 rep groups (T1-T5) or 4 rep groups (T6-T15) of 52 mixed-sex broilers for each replication for a total number of 4,940 animals. Chicks were randomly assigned to treatments on Trial Day 0 (day of hatch) and were not replaced during the trial. The chicks were observed daily for signs of unusual grow-out patterns or health problems. Body weights and food consumption was measured on Trial Days 0, 14, 21, 35 and 42.

Objective, Introduction and Study Overview

1. When broilers are subjected to normal live performance stresses the major objective is to determine the effect of poultry-related product test sources from various sources on live performance and processing factors under typical coccidial-*clostridium* challenge model stress points, when broilers are reared from hatch to 42 days of age in floor pens. The coccidial-*clostridium* challenge model comprises *clostridium* bacteria and coccidiosis challenges, and was administered to all of the birds within the scope of this trial. The test materials were compared to both each other, and to a negative control (NC), which was without test material administration but included the challenges.

2. The major objective included comparing different combined poultry-related product test sources, using levels normally fed in the USA chicken industry, and determining the effects on broiler chicken market weight, mortality and feed conversion on live performance and other test parameters.

3. All birds in this trial were stress challenged by administering *Clostridium* and coccidia oocysts, along with other natural bacteria from build-up litter from a farm experiencing high mortality.

4. Intestinal bacteria were counted, including *Clostridium* perfringen, *E. coli* and APC (Aerobic Plate Count), and were measured in $Log_{10}$ counts.

5. Particular to this trial, *Salmonella* spp. incidence was tested on a statistically sound number of birds (2M and 2F at 21 days of age per 52-bird pen and 5M and 5F per replicate at 42 days of age per 52-bird pen) to simulate counts required by USDA/FSIS at processing.

6. Dry Yield (%) and Parts Yield (%), were tested following 42-day body weights and live performance measurement.

7. Another objective was to determine if a combination of *B. subtilis, B. amyloliquefaciens, B. coagulans* and *B. licheniformis* (administered as Provia Prime™), as well as other *Bacillus* products, provided an added benefit toward ROI (Return-on-Investment) beyond feeding Magni-Phi® alone.

Test System

The commercial-simulated test stress model employed in this study used broiler breed chicks (*Gallus domesticus*) reared on a normal poultry industry Starter diet (0-21 days of age), Grower diet (22-35 days of age) and Finisher diet (36-42 days of age) at a floor space requirement (minimum of 0.85 $ft^2$ per bird), reared in pens with raised wire floors. Ration formulations (Table 6) were conducted via computer-generated linear regression program that simulates formulations conducted during practical poultry production techniques. Broilers were fed ad libitum and continuously dosed with their experimental diets from time of placement 0 (day of hatch) to up to 42 days of age, as outlined in Table 7. Treatments T1-T15 were fed to 11 reps (T1-T5) and 4 reps (T6-T15) of 52 mixed-sex broilers. A basal diet (with enough feed for the entire treatment) was mixed first and then each test material was added and remixed. Each treatments provided a minimum of $5\times10^5$ CFU per gram final feed. All birds was stressed by administering *Clostridium* and coccidia oocysts, along with other natural bacteria from build-up litter from a farm experiencing high mortality.

TABLE 6

Feed Formulation Parameters:

| Nutrient | Starter 0-21 days | Grower 22-35 days | Finisher 36-42 days |
|---|---|---|---|
| Metabolizable Energy (kcal/kg) | 3,025 | 3,150 | 3,201 |
| Metabolizable Energy (kcal/#) | 1,372 | 1,429 | 1,452 |
| Protein (%) | 22 | 20 | 19 |
| Lysine (%) | 1.28 | 1.15 | 1.02 |
| Methionine (%) Min | 0.512 | 0.46 | 0.408 |
| Methionine + Cysteine (%) | 0.947 | 0.851 | 0.755 |
| Arginine (%) Min | 1.36 | 1.22 | 1.08 |
| Threonine (%) Min | 0.858 | 0.771 | 0.68 |
| Tryptophan (%) Min | 0.19 | 0.17 | 0.15 |
| Total Phosphorus (%) Min | 0.70 | 0.65 | 0.60 |
| Available Phosphorus (%) | 0.5 | 0.45 | 0.42 |
| Total Calcium (%) | 1.05 | 0.9 | 0.85 |
| Dietary Sodium (%) | 0.20 | 0.20 | 0.20 |
| Dietary Choline (%) | 1.35 | 1.15 | 0.95 |

TABLE 7

Experimental Diets

| Treatment Group | Magni-Phi ® TEST MATERIAL (additives) | TEST MATERIAL (additives) |
|---|---|---|
| T1 | POSITIVE CLEAN-LITTER CONTROL (PC, No additive, challenged) | NEGATIVE CONTROL (PC, No additive, challenged) |
| T2 | NEGATIVE CHALLENGED LITTER CONTROL (NC, No additive, challenged) | NEGATIVE CHALLENGED LITTER CONTROL (NC, No additive, challenged) |
| T3 | NC (Trt #2) + Magni-Phi ® 250 ppm (0.5 lbs. per ton) Alone | None |
| T4 | None | NC (Trt #2) + Provia Prime ™ (0.25 Lbs. per ton level). |
| T5 | NC (Trt #2) + Magni-Phi ® 250 ppm (0.5 lbs. per ton) Alone | NC (Trt #2) + Provia Prime ™. (0.25 Lbs. per ton level). |
| T6 | None | NC (Trt #2) + B. subtilis OSPREY (0.25 Lbs. per ton level). |
| T7 | NC (Trt #2) + Magni-Phi ® 250 ppm (0.5 lbs. per ton) Alone | NC (Trt #2) + B. subtilis OSPREY (0.25 Lbs. per ton level). |
| T8 | None | NC (Trt #2) + B. lichenformis OSPREY (0.25 Lbs. per ton level). |
| T9 | NC (Trt #2) + Magni-Phi ® 250 ppm (0.5 lbs. per ton) Alone. | NC (Trt #2) + B. lichenformis OSPREY (0.25 Lbs. per ton level). |
| T10 | None | NC (Trt #2) + B. coagulans OSPREY (0.25 Lbs. per ton level). |
| T11 | NC (Trt #2) + Magni-Phi ® 250 ppm (0.5 lbs. per ton) Alone. | NC (Trt #2) + B. coagulans OSPREY (0.25 Lbs. per ton level). |
| T12 | None | NC (Trt #2) + B. amyloliquefaciens OSPREY (0.25 Lbs. per ton level). |
| T13 | NC (Trt #2) + Magni-Phi ® 250 ppm (0.5 lbs. per ton) Alone. | NC (Trt #2) + B. amyloliquefaciens OSPREY (0.25 Lbs. per ton level). |
| T14 | None | NC (Trt #2) + B. pumilus; OSPREY (0.25 Lbs. per ton level). |
| T15 | NC (Trt #2) + Magni-Phi ® 250 ppm (0.5 lbs. per ton) Alone. | NC (Trt #2) + B. pumilus; OSPREY (0.25 Lbs. per ton level). |

Broiler chicks were randomized by individual weight on day of hatch and housed into each pen onto pens with raised wire floors. Each pen had sufficient floor, feeder and water space for each growout pen area for humane treatment of chickens up to 42 days of age. Following 42 days of growout, broilers were weighed, feed consumption determined, lesion score determined and feed conversion (feed consumed/body weight) calculated.

Materials and Methods

Test Material Description

Provia Prime™, a combination of B. subtilis, B. amyloliquefaciens, B. coagulans and B. licheniformis, and Magni-Phi®, which is a composition comprising from 10% to 20% Yucca schidigera and from 80% to 90% Quillaja saponaria, were each presented in a premix "powder form". These were fed at various levels, continuously from Trial Days 0-42, as defined in the experimental section of this report.

One objective was to compare different test materials, including Magni-Phi® and Provia Prime™ and other Bacillus species or combinations thereof, against a Negative Control (providing no other test material and with a stress challenge) on broiler live performance and lesion scores when broilers were subjected to a sub-clinical challenge (built-up litter and moderate stress conditions via bacterial and coccidia challenge, when administered). The objective was to determine if Provia Prime™ provided an added benefit toward ROI (Return-on-Investment) beyond feeding Magni-Phi® (250 ppm) or the individual Bacillus species alone.

Description of Bacteria Challenge ("Test Stress Model")

The birds were grown on built-up litter sources that contained Clostridium perfringens and other pathogenic bacteria, in a "coccidial-clostridium challenge model." Lay-out time among flocks was <11 days. Based on previous trials, these organisms were expected to be present in the present study. Each pen was top-dressed a minimum of 5-million total oocysts (or 100,000-150,000 per bird)+sterile water and not incorporated into the litter. Coccidia oocysts were predominate *E. acervulina* and *E. maxima*. Each pen was "walked with plastic boot covers designed to pick up litter" at a minimum of 3-times per day, for the purpose of spreading the litter from pen-to-pen and equalize the challenge.

Experimental Design

A total of 5,500 mixed sex broiler chicks (a sufficient number to ensure availability of at least 4,940 healthy mixed-sex chicks for the conduct of the study) were obtained from a commercial hatchery on Trial Day 0 (same as hatch date). These were immediately transported to the research pen units under temperature-controlled conditions to assure bird comfort. After arrival at the research facility, broilers were immediately randomized. There were 52 healthy/viable broiler mixed-sexes per pen with either 11 replicates (Treatments 1-5) or 4 replicates (Treatment 6-15) per test group. Broilers were fed ad libitum their respective treatment from day of hatch (termed in this study as Trial Day 0) to 42 days of age.

Broiler Chick Description

Broilers were evaluated upon receipt for signs of disease or other complications that may have affected the outcome of the study. Following examination, broilers were weighed. Broilers were allocated to each pen and to treatment groups using a randomized block design. Weight distribution across the treatment groups were assessed prior to feeding by comparing the individual test and reference group standard deviations of the mean against that of the control group. Differences between control and test or reference groups were within one standard deviation, and as such, weight distribution across treatment groups were considered acceptable for this study.

Broiler chickens (at hatch to 1-day of age, called Day 0) were collected in early am (day of placement or Day 0) and randomly assigned to each experimental pen within 12 hours of hatch. Weak birds were humanely sacrificed. Birds were not replaced during the study.

Housing and Daily Observations

Each experimental test unit of broiler mixed-sex chicken pens were housed in separated pens, located in a room containing forced air heaters with a cross-house ventilation system, precision controlled by the operation manager. Broilers were placed in 5 ft×10 ft pen floor area and space with a minimum of 0.85 ft$^2$ per bird (without feeder and waterer space) provided. At least two nipple drinkers per pen (via well water) provided water.

Two-chick trough feeders per pen were employed for the initial 0-7 days growout period and then larger trough feeders were employed for the remaining growout period.

Continuous (24 hr) use of incandescent lights (LED light system, that employs >10 fc) attraction around feeders/waterers for attraction to feeders/waterers), was used during the entire study. Full lighting of >10 fc (around waterers/feeders only) and >2 fc in remaining floor space was used the first week and then dimmed to <4 fc for the next two weeks of age.

Birds were observed at least three times daily for overall health, behavior and/or evidence of toxicity, and environmental conditions. Temperature was checked in the pen room three times daily. Drinking water and feed were provided ad libitum.

No type of medication (other than treatment group test material) was administered during the entire feeding period. Mortalities were recorded, refrigerated and, within an 8 hour period, were necropsy (both internal and external body mass) by examination examinations were performed on all broilers found dead or moribund.

Data and Observations

Live performance body weights and feed intakes were collected on Day 0 and 42 during the growing period. Weight gain, feed intake, feed:gain ratio (feed efficiency) were calculated for 0-42 days of age. Lesion Scores were collected at both 21 and 42 days of age. Differences between broilers fed control and test groups were statistically evaluated at $P<0.05$ in a typical ANOVA analysis of variance test model, employing Treatment×Replicate RCB (Randomized Complete Block). The control group was the NC CONTROL with no added test materials.

At the end of the study, all carcasses of necropsied broilers and all birds remaining at the end of the study were disposed of according to local regulations via on-farm composting techniques.

Diet Preparation

Diets were formulated to meet minimum nutrient requirements of a typical commercial broiler diet using formulations employed by qualified nutritionist with training in poultry feed formulations. Actual feed formulations are shown in Table 6, above.

Magni-Phi® and Provia Prime™ feed ingredient sources were added to each ration on an "as is" basis with first mixing small amount of feed with the basal and then adding the remaining test material to complete the mix formula. Dietary protein, lysine, methionine, methionine+cystine, arginine, threonine, tryptophan, total phosphorus, available phosphorus, total calcium, dietary sodium, and dietary choline were met by adjusting the concentrations of corn and soybean meal ingredients, as well as other minor ingredients commonly used in poultry production. Mixing equipment was flushed with ground corn prior to diet preparation. All diets were prepared using a paddle mixer. The mixer was cleaned between each diet using compressed air and vacuum; mixing equipment was flushed with ground corn between each treatment group and flush material was retained for disposal.

Diet and Water Administration

Diets were fed in three feed phases: Starter diet (0-21 days of age), Grower diet (22-35 days of age) and Finisher diet (36-42 days of age). All diets were offered ad libitum. Fresh well water (from the research facility deep well) was provided ad libitum.

TABLE 8

Test Criteria Performed

| Data/Sample Collected | When | Sample Size | Measurements |
|---|---|---|---|
| Feed Intake, BW, mortality & BW | Weekly | Individual weights (14, 21, 35 & 42 | Feed Intake, BW, BWG Adjusted FCR, mortality, BW coefficient of |

TABLE 8-continued

Test Criteria Performed

| Data/Sample Collected | When | Sample Size | Measurements |
|---|---|---|---|
| Uniformity | | days) | variation. |
| Lesion Score | Day 21 and 42 | Day 21 (4 birds) and 42 (10 birds per pen) | 21-day Lesion scores from individual birds (2M and 2F birds). 42-day Lesion scores from individual birds (10M and 10F birds). |
| Intestinal Bacteria | Days 21 and 42 | Day 21 (4 birds) and 42 (10 birds per pen) | Intestinal bacteria levels: Intestinal *E. coli*, APC (Aerobic Plate Count), *Clostridium perfringens* colonies were enumerated, and *Salmonella* Incidence determined. |
| Processing Data | Days 43 to 46 | Day 21 (4 birds) and 42 (10 birds per pen) | Processing Dry Yield (%) Dry Yield (%) Breast meat yield (%) Processing Parts Yield (%) Major Parts Yield (%) Breast Meat Yield (% of chilled and live weights) |

Results and Discussion

Chicks were randomly assigned to treatments on Trial Day 0 (or day of hatch). At 42 days of age, live performance (growth weight gain, mortality and feed conversion) and other criteria were determined. Also at 42 days of age, lesion scores were measured, and intestinal fecal samples taken for further laboratory analyses. At 43-46 days of age, processing data were measured.

Figure 15:
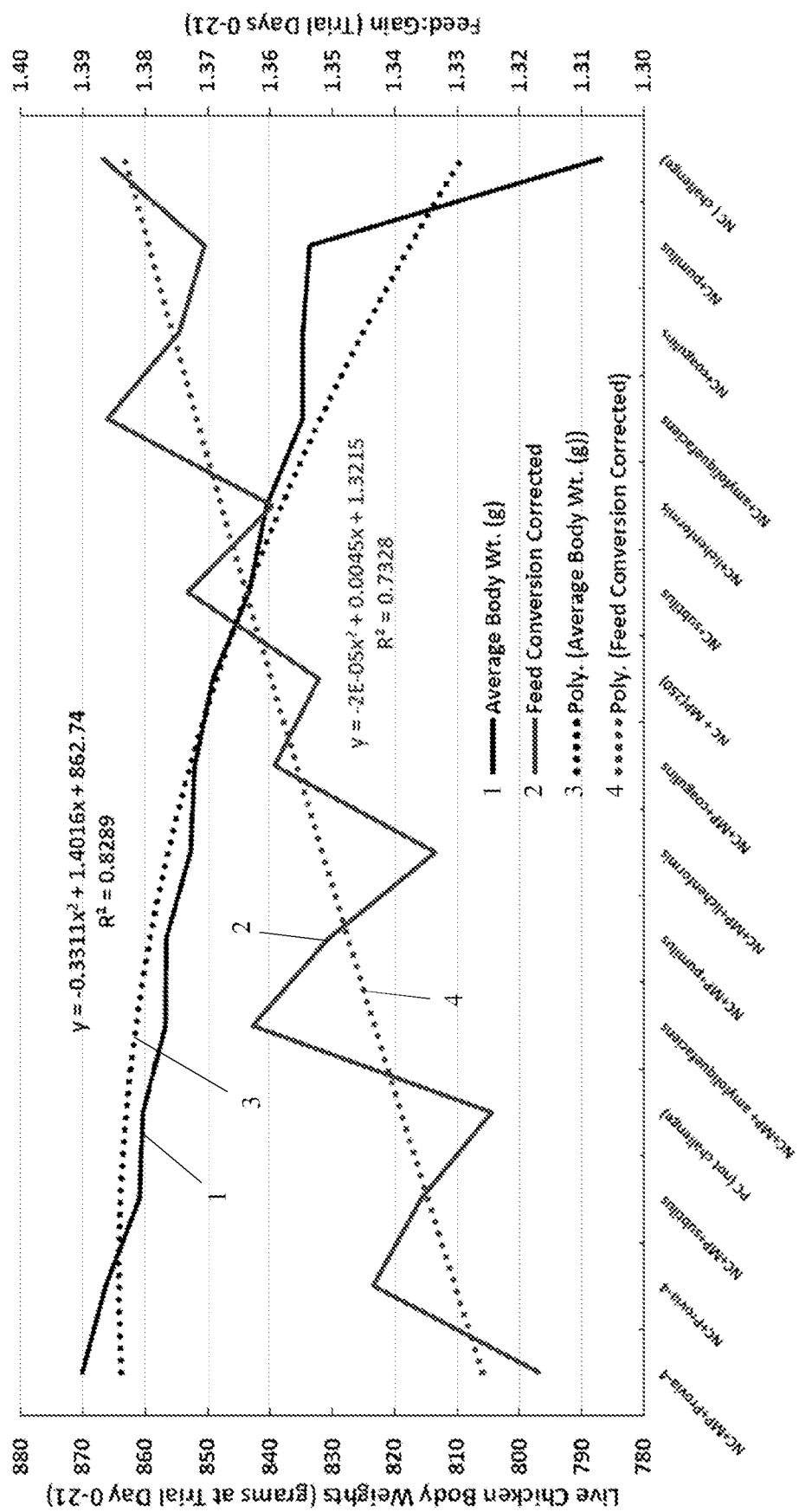
FIG. 15 is a graph of live chicken body weights and feed:gain ratio, illustrating the effect of Magni-Phi® (250 ppm) alone, various DMFs alone, and Magni-Phi®/DFM combinations on body weight gain (0-21 days) and feed conversion (Feed:Gain 0-21 days) from the study described in Example 6, with the dotted lines indicating the polynomial trend line for the respective graphs.
Figure 16:
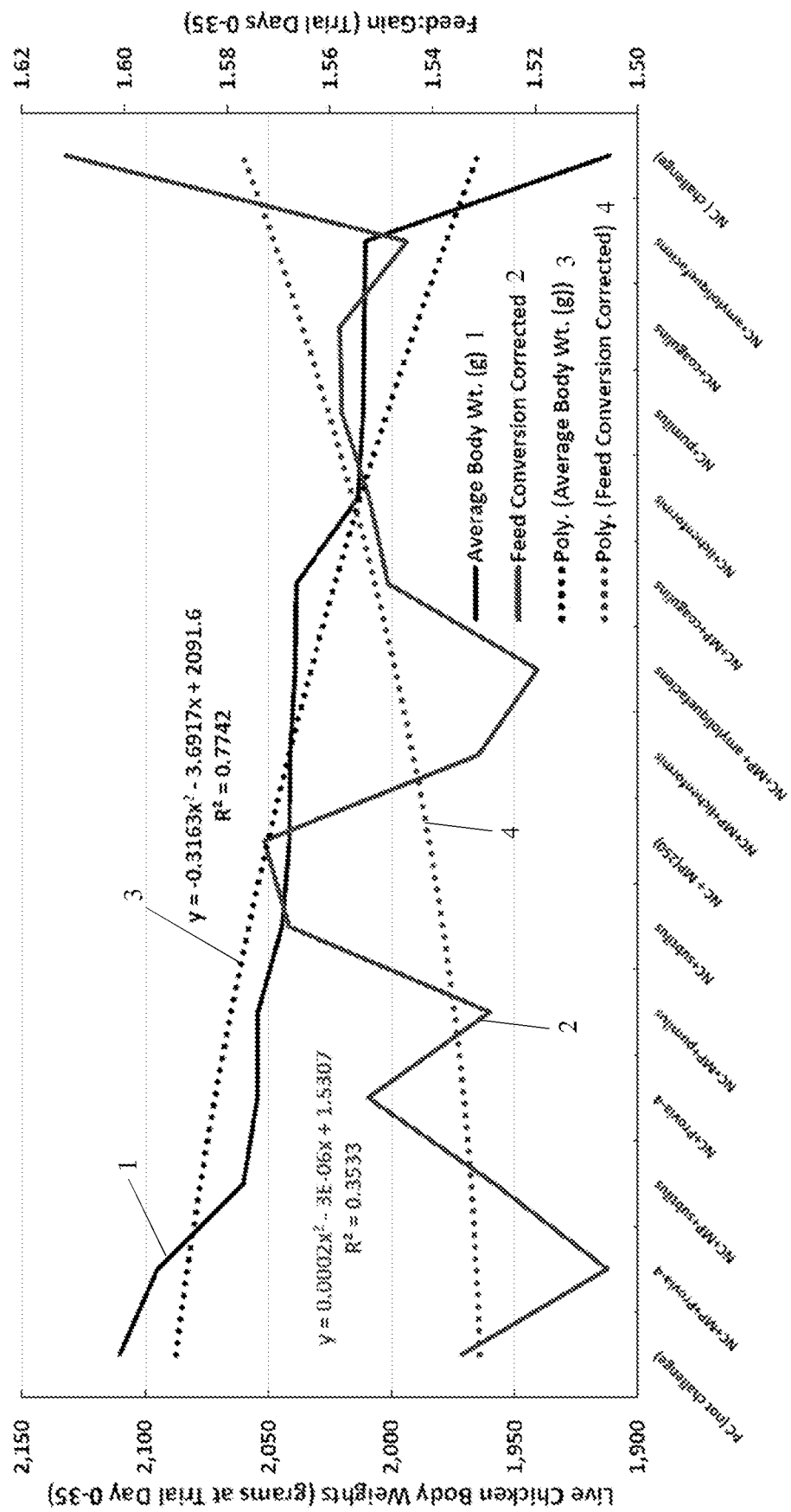
FIG. 16 is a graph of live chicken body weights and feed:gain ratio, illustrating the effect of Magni-Phi® (250 ppm) alone, various DMFs alone, and Magni-Phi®/DFM combinations on body weight gain (0-35 days) and feed conversion (Feed:Gain 0-35 days) from the study described in Example 6, with the dotted lines indicating the polynomial trend line for the respective graphs.
Figure 17:
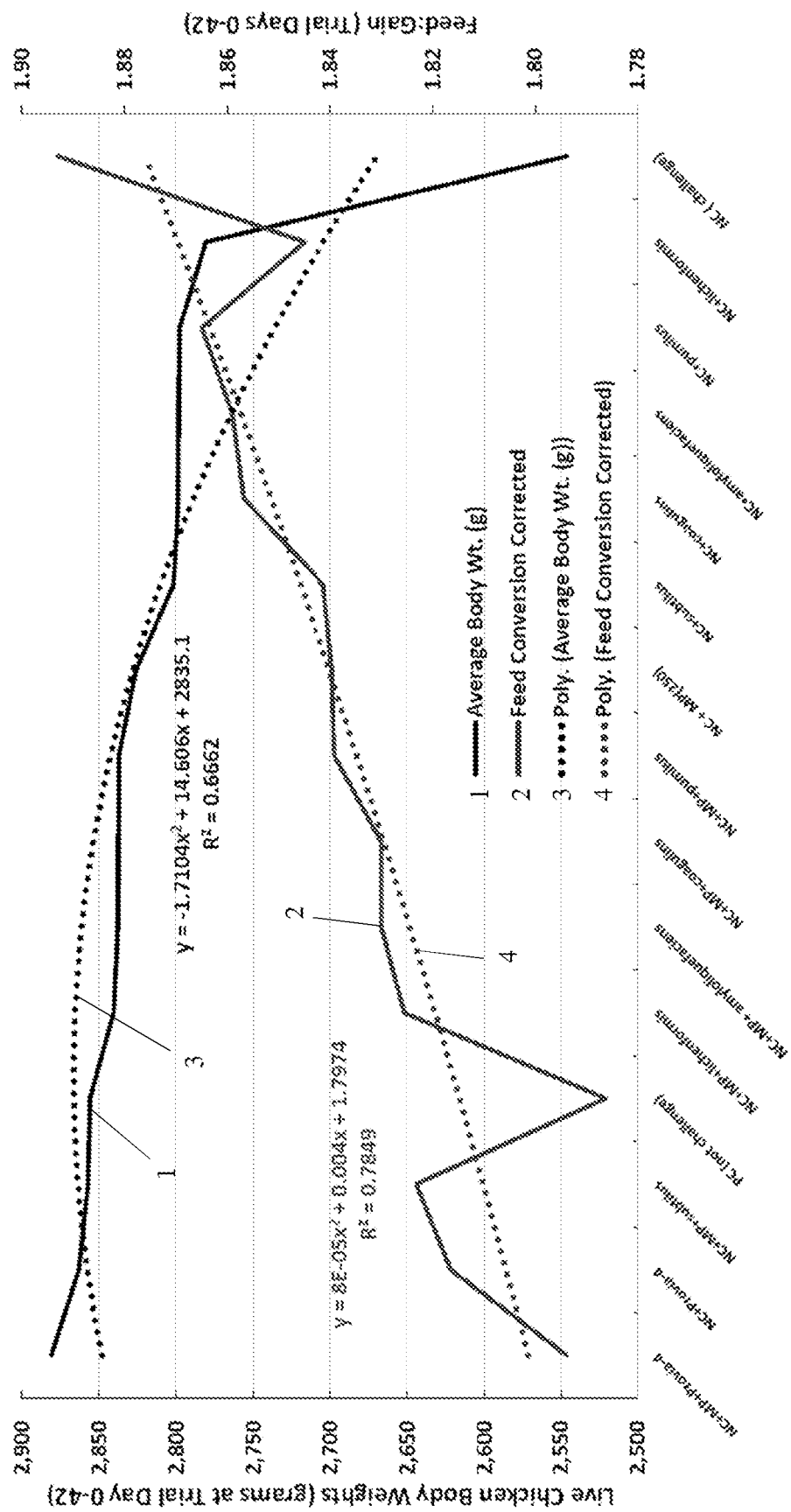
FIG. 17 is a graph of live chicken body weights and feed:gain ratio, illustrating the effect of Magni-Phi® (250 ppm) alone, various DMFs alone, and Magni-Phi®/DFM combinations on body weight gain (0-42 days) and feed conversion (Feed:Gain 0-42 days) from the study described in Example 6, with the dotted lines indicating the polynomial trend line for the respective graphs.

FIGS. 4-23 provide the data from the study. With respect to daily observations, each pen was closely monitored, at a minimum of three times per day, to determine overall health, bird behavior and/or evidence of toxicity, and environmental conditions. Temperature (both high and low temperature monitored each time period) was checked within the growing area employed for this study three times daily. Temperatures observed range from 86-91° F. (Trial Days 0-7), 84-88° F. (Days 8-14), 83-85° F. (Days 15-21), 78-83° F. (Days 22-28), 73-77° F. (Days 29-35), and 70-74° F. (Days 36-42).

Mortality in this study for the NC (challenged, no test materials added) ration was considered average to moderate for moderately bacteria built-up litter challenged, by strategy, and on the upper quadrant of the Poultry Industry mortality standards (>6% for the NC Negative Control, with an average mortality in USA is <5%) throughout the growing period to 42 days of age, especially for a mild to moderate disease challenge model, and caused by bacteria stress (as targeted). Normal poultry industry mortality is typically and usually <5% when birds are grown on built-up litter bedding floors, as compared to <9% for a high disease challenge model. These data indicate that the mild to moderate disease challenge model functioned as intended.

Significant (P>0.05) improvements in lower mortality rates (i.e., lower mortality) was found with all sources of Magni-Phi® and/or in combination with Provia Prime™, as well as other DFM sources. With the improvement in mortality with all Magni-Phi® (fed at 250 ppm), Provia Prime™ and the other DFM sources, these data indicate the safety of the product specifically for poultry and livability improvements that may be made. Furthermore, various significant differences (P>0.05) were observed in body weight, feed conversion, and body weight gain (for 0-42 days of age) with treatments containing Magni-Phi® (fed at 250 ppm), Provia Prime™ and other DFMs, as compared to the control with no added test material but with a stress challenge, that affected live performance and mortality.

At 42 days of age, body weights (FIGS. 4-23) were significantly (P>0.05) increased and 0-42 day feed conversion significantly (P>0.05) decreased with either Magni-Phi® up to the 250 ppm, as well as other DFMs and in combination of Magni-Phi® feed additive level. However, when Provia Prime™ was combined with Magni-Phi® at 250 ppm, the combination of the two products appeared to statistically (P<0.05) to maximize live performance further and beyond just feeding Magni-Phi® alone. In most live performance cases in this trial, and with all ages of birds, there were statistical (P<0.05) improvements in 250 ppm Magni-Phi® vs. NC Control, as well as, feeding the combination of both Magni-Phi® and DFMs test materials, as compared to the Negative Control group of broiler chickens (without either Magni-Phi® or Provia Prime™. Other single *Bacillus* DFMs showed a similar trend but were of less significance than with Provia Prime™

Intestinal bacteria levels (including Intestinal *E. coli*, APC or Aerobic Plate Count, *Clostridium perfringens* colonies were $\log_{10}$ enumerated and *Salmonella* Incidence (% of population) was determined at 21 and 42 days of age. Provia Prime™, in combination with Magni-Phi® fed at 250 ppm, appeared to statistically (P<0.05) maximize live performance, as well as, intestinal bacteria (*Clostridium perfringens, E. coli*, APC, *Salmonella* spp. levels) reductions levels at both 21 and 42 days of age. Additionally, breast meat (either hot carcass weights, chilled weights and compared as percentage of live weights) showed a similar trend statistical trend. Intestinal *E. coli, Clostridium perfringens* and *Salmonella* Incidence was significantly (P<0.05) reduced with increasing levels of Magni-Phi®, as well as, the added addition of Provia Prime™ to these Magni-Phi® levels. The combination of the two test materials of Magni-Phi® and Provia Prime™, statistically (P<0.05) decreased *E. coli* and *Salmonella* incidence at both 250 ppm Magni-Phi® and adding in combination the 1×level of Provia Prime™.

Similar to live performance data (i.e., body weight and feed conversion), intestinal lesion scores on Day 21 and 42 (FIGS. 10 and 11) were significantly (P>0.05) improved with the use of either 250 ppm Magni-Phi®, with or without Provia Prime™.

Similar to live performance data, Dry Yield (%) and Breast Meat Yield (% of chilled and live weights) was statistically (P<0.05) increased with both Magni-Phi® and Provia Prime™ with the combination of the two boosting improvements by about >4% for each criterion. Of less significance were changes associated with Processing Parts Yield (%) due to the additions of either or both Magni-Phi® and Provia Prime™. Other single *Bacillus* DFMs showed a similar trend but were of less significance than with Provia Prime™.

The combination of both Magni-Phi® and Provia Prime™ resulted in most criteria from 14-42 days of age being at least numerical, if not statistically significantly (P<0.05) superior to either Magni-Phi® or Provia Prime™ alone. Additionally, in most cases from 21-42 days of age, the combination of both Magni-Phi® and Provia Prime™ resulted in at least numerical, if not statistically significantly (P<0.05) superior to PC (non-challenged, non-treated Control). Either Magni-Phi® or Provia Prime™ alone could make this claim. Remarkably, no single-strain *Bacillus* source (including: *B. pumilus, B. subtilis*, B-*amyloliquefaciens*, B-*coagulans* or B-*licheniformis*) resulted in improvements over the PC Control ration.

The European Production Efficiency Factor (EPEF) can be sued to standardize technical results, such as weight gained per day, survival rate and feed conversion. The EPEF is calculates as follows:

EPEF=(Average grams gained/day×% survival rate)/(Feed Conversion×10).

The EPEF was found statistically (P<0.05) higher (or improved) with the combination 250 ppm Magni-Phi® and Provia Prime™, although closely behind individual treatment of either 250 ppm Magni-Phi® and Provia Prime™, with both appearing to be statistically (P<0.05) similar. In both Magni-Phi® addition levels of 250 ppm, Provia Prime™ further improved the genetic potential of the 3-criteria of live body weights, feed conversion and mortality, calculating EPEF, providing the best performance combination.

Growth and Feed Conversion graphs (FIGS. 16-23) for each test parameter and age group were used to determine potential most efficacious level, via the use of linear regression. In general, the following conclusions were made, based on these regression analyses curves and graph data:

1. When birds were reared to 21 days of age, maximum mean body weights were achieved with the combined use of 250 ppm Magni-Phi® and 1× Provia Prime™. The most efficient feed:gain values were found by feeding at least 250 ppm Magni-Phi® and Provia Prime™ in combination with 0.25 pounds per ton of Provia Prime™.
2. Remarkably, when birds were reared to 42 days of age, statistically (P<0.05) maximum mean body weights were achieved with the combined use of 250 ppm Magni-Phi® plus in combination with Provia Prime™ (at 0.25 pounds per ton), as compared to feeding either 250 ppm Magni-Phi® alone, Provia Prime™ alone or NC Control. However, either Magni-Phi® (at the 250 ppm Magni-Phi® level) or Provia Prime™ (at 0.25 pounds per ton) levels data were significantly (P<0.05) better than NC Control. In other words, the most efficient body weight and feed:gain values were found by feeding 250 ppm Magni-Phi® in combination with Provia Prime™ followed by 250 ppm Magni-Phi® alone, followed by Provia Prime™ alone.
3. With respect to % mortality during the entire trial, statistically (P<0.05) similar mean mortality improvements were achieved with the use of 250 ppm Magni-Phi® in combination with most all DFMs fed in the study (including: Provia Prime™ 4-way DFM combination, *B. pumilus, B. subtilis*, B-*amyloliquefaciens*, B-*coagulans* or B-*licheniformis*).
4. Both weight gains and feed efficiency values for 22-35 day of age period data were even more dramatically lower for the 250 ppm Magni-Phi® level plus Provia Prime™ level data than the NC Control but were relatively similar to the PC Control.
5. When birds were reared to 22-35 days or 36-42 days of age periods, higher mean market body weights were achieved with the use of the combination of Provia Prime™ and 250 ppm Magni-Phi®, as compared to either 250 ppm Magni-Phi® alone or in combinations with the other DFMs single strain doses.
6. Similar to both 22-35 and 36-42 days of age results, statistically (P<0.05) improved Body Weight Coefficient of Variation (or CV %) values were achieved by feeding Provia Prime™ in combination with 250 ppm Magni-Phi®.
7. Intestinal bacteria content *E. coli* and APC (Aerobic Plate Counts) were statistically (P<0.05) similar among all test feed articles; however, all treatments were superior to the Negative Control.
8. Intestinal *Clostridium perfringens* and *Salmonella* Incidence was significantly (P<0.05) reduced with the use of the combination of Magni-Phi® and Provia Prime™. The combination of the two test materials, statistically (P<0.05) decreased *Clostridium perfringens* and *Salmonella* Incidence levels at 250 ppm Magni-Phi® and were even more dramatically reduced by adding in combination the 0.25 pounds per ton Provia Prime™ level.
9. Dry Yield (%) and Breast Meat Yield (% of chilled and live weights) was statistically (P<0.05) increased when both Magni-Phi® and Provia Prime™ were added, with the combination of the two boosting improvements in processing values.

CONCLUSIONS

Magni-Phi® (fed at 250 ppm) alone or the combination of Provia Prime™ (fed at 0.25 pounds per ton level), appeared to improve (at various efficiency) body weight, feed conversion, mortality, dry yield, breast meat yield and intestinal bacteria levels at all feed additive addition levels and combinations, as compared to feeding no ABF feed additive or NEGATIVE CONTROL. The true test in defining essential usage levels is to define ROI (Return-on-investment) and to determine the "cost-effectiveness" of feeding the combination of products. It appeared that feeding the combination (as compared to feeding just up to 21 or 35 days of age) of all products throughout the entire life-cycle of the broiler chicken, to 42-days of age and at market age, appeared to improve live performance and other critical criteria data.

Provia Prime™, as well as all other DFM single strain products, appeared to play a role in aiding Magni-Phi® in improving statistically (P<0.05) maximum live performance, lesion scores and processing characteristics (especially breast meat yield). The most discernible effects of significant improvements (body weight, feed conversion, mortality, breast meat yield and lesion scores at P<0.05) were shown with the use of 250 ppm Magni-Phi® level in combination with Provia Prime™, where significance at the 5% level of probability was found over the Negative Control Ration (infected and without other test materials), feeding either product alone, as well as, in most cases including Positive or PC Control Ration (non-infected and without other test materials). Single strain DFMs also had an effect, especially when combined with Magni-Phi®.

Remarkably, Magni-Phi®, regardless of DFM usage, appeared to independently improve growth rate and feed efficiency, all the way to market age. Both Magni-Phi® and Provia Prime™ appeared to be feed ingredients beneficial to the broiler chicken live performance and processing characteristics, but ultimately achieving maximize genetic potential, as it may relate to cost effectiveness when compared to PC Control or NC Control groups. Provia Prime™ appeared to be an important component to achieve this very high standard marketing goal, with advantages over single-strain Bacillus sources ((including: B. pumilus, B. subtilis, B. amyloliquefaciens, B. coagulans or B. licheniformis).

VII. Exemplary Embodiments

The following numbered statements illustrate exemplary embodiments of the disclosed technology.

Statement 1. A Bacilli combination, consisting essentially of three or four Bacillus species selected from Bacillus coagulans, Bacillus subtilis, Bacillus licheniformis and Bacillus amyloliquefaciens.

Statement 2. A composition, consisting essentially of Bacillus subtilis, Bacillus licheniformis and Bacillus amyloliquefaciens.

Statement 3. The composition of statement 2, consisting of Bacillus subtilis, Bacillus licheniformis and Bacillus amyloliquefaciens.

Statement 4. A composition, consisting essentially of Bacillus subtilis, Bacillus licheniformis, Bacillus amyloliquefaciens and Bacillus coagulans.

Statement 5. A composition, consisting of Bacillus subtilis, Bacillus licheniformis, Bacillus amyloliquefaciens and Bacillus coagulans.

Statement 6. A composition, consisting essentially of Bacillus coagulans, Bacillus subtilis, and Bacillus licheniformis.

Statement 7. The composition of statement 6, consisting of Bacillus coagulans, Bacillus subtilis, and Bacillus licheniformis.

Statement 8. An admixed composition, comprising:
a Bacilli combination; and
an additional component.

Statement 9. The admixed composition of statement 8, wherein the additional component comprises a copper salt.

Statement 10. The composition of statement 9, wherein the copper salt is copper chloride, copper bromide, copper iodide, copper sulfate, copper sulfite, copper bisulfite, copper thiosulfate, copper phosphate, monobasic copper phosphate, dibasic copper phosphate, copper hypophosphite, copper dihydrogen pyrophosphate, copper tetraborate, copper borate, copper carbonate, copper bicarbonate, copper metasilicate, copper citrate, copper malate, copper methionate, copper succinate, copper lactate, copper formate, copper acetate, copper butyrate, copper propionate, copper benzoate, copper tartrate, copper ascorbate, copper gluconate, or a combination thereof.

Statement 11. The admixed composition of statement 8 wherein the additional component comprises a vitamin.

Statement 12. The admixed composition of any one of statements 5-6 where the composition further comprises a vitamin.

Statement 13. The composition of any one of statements 11-12, wherein the vitamin is vitamin A, vitamin B1, vitamin $B_2$, vitamin $B_3$, vitamin $B_5$, vitamin $B_6$, vitamin $B_{12}$, vitamin C, vitamin D, vitamin E, vitamin K, or a combination thereof.

Statement 14. The admixed composition of statement 8 wherein the additional component comprises an additional direct fed microbial, or statements 9-13 where the composition further comprises an additional direct fed microbial.

Statement 15. The admixed composition of any one of statements 8-14, wherein the Bacilli combination consists essentially of Bacillus amyloliquefaciens, Bacillus subtilis, and Bacillus licheniformis.

Statement 16. The admixed composition of any one of statements 8-14, wherein the Bacilli combination consists essentially of Bacillus amyloliquefaciens, Bacillus subtilis, Bacillus licheniformis and Bacillus coagulans.

Statement 17. A composition for administration to poultry, comprising:
a Bacilli combination; and
a poultry feed.

Statement 18. The composition of statement 17, wherein the Bacilli combination consists essentially of Bacillus amyloliquefaciens, Bacillus subtilis, and Bacillus licheniformis.

Statement 19. The composition of statement 17, wherein the Bacilli combination consists essentially of Bacillus amyloliquefaciens, Bacillus subtilis, Bacillus licheniformis and Bacillus coagulans.

Statement 20. The composition of statements 17-19, wherein the poultry feed comprises plant material, a carbonate, sulfate, lactate, oxide, propionate, stearate, phosphate, mineral, copper species, sugar, salt, animal protein product, forage product, grain product, plant protein product, processed grain product, roughage product, molasses product, or combinations thereof Statement 21. The composition of any one of statements 17-20, wherein the poultry feed comprises beet pulp, ground corn, corn syrup solids, plant fiber, rice hulls, soluble plant fiber, wheat middlings, microcrystalline cellulose, calcium carbonate, potassium carbonate, potassium sulfate, sodium sulfate, calcium lactate, calcium oxide, calcium propionate, calcium stearate, dicalcium phosphate dehydrate, monocalcium phosphate, sodium tripolyphosphate, tetra sodium pyrophosphate, dolomite, silicon dioxide, silica, limestone, vermiculite, bentonite, montmorillonite, kaolin, glucose, sucrose, dextrose, fructose, maltodextrin, sodium chloride, carrageenan, cellulose, guar gum, polyols, sodium alumino silicate, urea, biotin, folic acid, sodium sesquicarbonate, methionine source, lysine source, L-threonine, or combinations thereof.

Statement 22. The composition of any one of statements 17-21, wherein the poultry feed comprises copper sulfate.

Statement 23. The composition of any one of statements 17-22, wherein the composition comprises from $1.2 \times 10^5$ to $4 \times 10^5$ CFU Bacillus subtilis per gram of feed.

Statement 24. The composition of any one of statements 17-23, wherein the composition comprises from $1.2 \times 10^5$ to $4 \times 10^5$ CFU Bacillus lichemformis per gram of feed.

Statement 25. An admixture composition, comprising:
a first composition consisting essentially of Bacillus amyloliquefaciens, Bacillus subtilis, and Bacillus licheniformis; and a second composition comprising one or more of a feed, *yucca, quillaja, yucca* and *quillaja*, a silica, mineral clay, glucan and mannans mixture, or a combination thereof.

Statement 26. A composition, comprising *Bacillus amyloliquefaciens, Bacillus subtilis*, and *Bacillus licheniformis* and one or more of (a) *yucca, quillaja*, or *yucca* and *quillaja*, (b) silica, mineral clay, glucan, and mannans, or (c) a combination thereof.

Statement 27. A composition formulated for administration to poultry, comprising:

*Bacillus amyloliquefaciens, Bacillus subtilis*, and *Bacillus licheniformis*; and a feed supplement.

Statement 28. A package, comprising:

a composition consisting essentially of *Bacillus amyloliquefaciens, Bacillus subtilis*, and *Bacillus licheniformis*; or three separate package portions, one for each of *Bacillus amyloliquefaciens, Bacillus subtilis*, and *Bacillus licheniformis*.

Statement 29. A method, comprising administering a Bacilli combination to a subject.

Statement 30. The method according to statement 29 wherein the subject is livestock.

Statement 31. The method according to statement 24 wherein the Bacilli combination is administered as an admixture comprising a composition consisting essentially of *Bacillus amyloliquefaciens, Bacillus subtilis*, and *Bacillus licheniformis* and at least one additional component.

Statement 32. A method, comprising administering a composition comprising *Bacillus amyloliquefaciens, Bacillus subtilis*, and *Bacillus licheniformis* to poultry.

Statement 33. The method of statement 32, wherein the composition consists essentially of *Bacillus amyloliquefaciens, Bacillus subtilis*, and *Bacillus licheniformis*.

Statement 34. The method of statement 32, wherein the composition is a composition according to any one of statements 1-27.

Statement 35. A method, comprising:

providing *Bacillus amyloliquefaciens, Bacillus subtilis*, and *Bacillus licheniformis*; and forming a first composition comprising *Bacillus amyloliquefaciens, Bacillus subtilis*, and *Bacillus licheniformis* and a feed, a feed supplement, a direct fed microbial, a carrier, or a combination thereof.

Statement 36. The method of statement 35, wherein the feed supplement comprises:

*yucca;*

*quillaja;*

*yucca* and *quillaja;* silica, mineral clay, glucan, and mannans; or a combination thereof.

Statement 37. A composition made by the method of any one of statements 35-36.

Statement 38. A method of reducing bird mortality, lesion scores, *Salmonella/E. Coli/Clostridium* perfingens (CP) incidence, and/or oocysts in fecal matter, comprising administering to poultry an effective amount of a composition comprising *Bacillus amyloliquefaciens, Bacillus subtilis*, and *Bacillus licheniformis*.

Statement 39. The method according to statement 38, wherein the composition consists essentially of *Bacillus amyloliquefaciens, Bacillus subtilis*, and *Bacillus licheniformis*.

Statement 40. A composition for use in administration to poultry, comprising *Bacillus amyloliquefaciens, Bacillus subtilis*, and *Bacillus licheniformis*.

Statement 41. The composition of statement 40 for use in reducing bird mortality, lesion scores, *Salmonella/E. Coli/Clostridium* perfingens (CP) incidence, and/or oocysts in fecal matter.

Statement 42. The composition of any one of statements 40-41, for use in increasing breast meat yield.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A method, comprising administering to an animal a first composition consisting essentially of from 25% to 50% *Bacillus subtilis*, from 30% to 65% *Bacillus licheniformis*, from 5% to 30% *Bacillus amyloliquefaciens* and from greater than zero to 15% *Bacillus coagulans*, in amounts relative to each other, wherein the first composition does not include any additional direct fed microbial.

2. The method of claim 1, wherein one or more *bacillus* species in the first composition is dehydrated.

3. The method of claim 1, wherein the first composition consists essentially of from 30% to 45% *Bacillus subtilis*, from 40% to 60% *Bacillus licheniformis*, from 10% to 25% *Bacillus amyloliquefaciens* and from 1% to 12% *Bacillus coagulans*.

4. The method of claim 1, wherein the animal is livestock.

5. The method of claim 1, wherein the animal is poultry.

6. The method of claim 1, wherein administration of the composition increases breast meat yield, increases weight gain, improves a feed conversion ratio, reduces bird mortality, reduces lesion scores, reduces *Salmonella/E. Coli/Clostridium* perfingens (CP) incidence, reduces oocysts in fecal matter, or a combination thereof.

7. The method of claim 1, wherein the first composition further includes a carrier.

8. The method of claim 1, wherein the method further comprises administering an additional component.

9. The method of claim 8, wherein the additional component is administered simultaneously with the first composition.

10. The method of claim 8, wherein the additional component comprises *yucca*, quillaja, silica, mineral clay, glucan, mannans, endoglucanohydrolase, a copper salt, a vitamin, or a combination thereof.

11. The method of claim 8, wherein the additional component comprises *Yucca schidigera, Quillaja saponaria*, or a combination thereof.

12. The method of claim 8, wherein the additional component comprises a second composition comprising silica, mineral clay, glucan, mannans and endoglucanohydrolase.

13. The method of claim 8, wherein administering the first composition comprises administering a feed composition comprising the first composition and an animal feed.

14. The method of claim 13, wherein the animal feed is a poultry feed.

15. The method of claim 13, wherein the feed composition comprises from $1.2 \times 10^5$ to $4 \times 10^5$ CFU *Bacillus subtilis* per gram of animal feed.

16. The method of claim 13, wherein the feed composition comprises from $1.2 \times 10^5$ to $4 \times 10^5$ CFU *Bacillus licheniformis* per gram of animal feed.

17. The method of claim 13, wherein the feed composition comprises from 0.1 pound to 1 pound of the first composition per ton of animal feed.

18. The method of claim 13, wherein the feed composition further comprises from 100 ppm to 500 ppm of a second composition comprising *Yucca schidigera* and *Quillaja saponaria*, per ton of animal feed.

19. A method of reducing bird mortality, lesion scores, *Salmonella/E. Coli/Clostridium* perfingens (CP) incidence, and/or oocysts in fecal matter, comprising administering to poultry an effective amount of a composition consisting essentially of from 25% to 50% *Bacillus subtilis*, from 30% to 65% *Bacillus licheniformis*, from 5% to 30% *Bacillus amyloliquefaciens* and from greater than zero to 15% *Bacillus coagulans*, in amounts relative to each other, wherein the composition does not include any additional direct fed microbial.

20. The method of claim 19, wherein the method further comprises administering *Yucca schidigera* and *Quillaja saponaria* to the poultry.

* * * * *